(12) United States Patent
Ishibe

(10) Patent No.: US 7,768,542 B2
(45) Date of Patent: Aug. 3, 2010

(54) MULTI-BEAM OPTICAL SCANNING DEVICE AND IMAGE FORMING APPARATUS USING THE SAME

(75) Inventor: Yoshihiro Ishibe, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 109 days.

(21) Appl. No.: 12/147,244

(22) Filed: Jun. 26, 2008

(65) Prior Publication Data

US 2009/0002474 A1 Jan. 1, 2009

(30) Foreign Application Priority Data

Jun. 28, 2007 (JP) ............................. 2007-170252

(51) Int. Cl.
*G02B 26/10* (2006.01)
*B41J 2/447* (2006.01)

(52) U.S. Cl. ..................................................... 347/244

(58) Field of Classification Search ................. 347/233, 347/241, 243, 244
See application file for complete search history.

(56) References Cited

U.S. PATENT DOCUMENTS

| | | | | |
|---|---|---|---|---|
| 5,805,199 | A | 9/1998 | Aoki | 347/256 |
| 5,914,800 | A | 6/1999 | Akatsu | 359/206 |
| 6,046,835 | A * | 4/2000 | Yamawaki et al. | 359/205.1 |
| 6,256,132 | B1 | 7/2001 | Ishibe | 359/204 |
| 6,317,244 | B1 | 11/2001 | Ishibe | 359/204 |
| 6,362,470 | B1 | 3/2002 | Yoshida et al. | 250/235 |
| 6,731,418 | B2 | 5/2004 | Ishibe | 359/204 |
| 6,914,620 | B2 | 7/2005 | Yoshida et al. | 347/235 |
| 6,943,927 | B1 * | 9/2005 | Ishihara | 359/207.1 |
| 6,989,855 | B2 | 1/2006 | Ishibe | 347/244 |

(Continued)

FOREIGN PATENT DOCUMENTS

EP  851262  7/1998

(Continued)

OTHER PUBLICATIONS

European Search Report dated Oct. 10, 2008 from corresponding European Application No. 08011506.6.

(Continued)

*Primary Examiner*—Huan H Tran
(74) *Attorney, Agent, or Firm*—Fitzpatrick, Cella, Harper & Scinto

(57) ABSTRACT

A multi-beam optical scanning device which enables uniform scan line pitch and high precision image, includes a light source having plural light emitting members, a rotary polygonal mirror having a deflecting surface, a first optical system for imaging a light beam on the deflecting surface and a second optical system for imaging the light beam on a scan surface to be scanned, wherein the optical axis of the first optical system is disposed at a particular angle in a sub-scan section with respect to a plane perpendicular to the deflection axis of the deflecting surface, and wherein, with respect to the imaging magnification in the sub-scan section of the second optical system on the optical axis and between the deflecting surface and the scan surface, the imaging magnification at a scan start side is made large while the imaging magnification at the scan end side is made small or, alternatively, the imaging magnification at a scan start side is made small while the imaging magnification at the scan end side is made large.

10 Claims, 25 Drawing Sheets

U.S. PATENT DOCUMENTS

| | | | |
|---|---|---|---|
| 7,034,859 B2 | 4/2006 | Ishihara et al. | 347/244 |
| 7,119,824 B2 | 10/2006 | Ishibe | 347/235 |
| 7,136,208 B2 * | 11/2006 | Yoshida et al. | 359/207.7 |
| 7,145,591 B2 | 12/2006 | Ishibe | 347/244 |
| 7,149,019 B2 | 12/2006 | Ishibe | 359/207 |
| 7,304,777 B2 | 12/2007 | Ishibe | 359/205 |
| 2007/0024696 A1 | 2/2007 | Ishibe | 347/241 |
| 2008/0278566 A1 * | 11/2008 | Towner et al. | 347/243 |
| 2009/0009841 A1 | 1/2009 | Ishibe | 359/207 |

FOREIGN PATENT DOCUMENTS

| | | |
|---|---|---|
| EP | 1096290 | 5/2001 |
| JP | 9-21972 | 1/1997 |
| JP | 2001-242403 | 9/2001 |
| JP | 2004-070108 | 3/2004 |
| JP | 2004-302062 | 10/2004 |
| WO | 2007/050086 | 5/2007 |

OTHER PUBLICATIONS

Chinese Office Action dated Nov. 13, 2009, and English language translation thereof from corresponding Chinese Application No. 200810127449.9.

* cited by examiner

MULTI-BEAM OPTICAL SCANNING DEVICE AND IMAGE FORMING APPARATUS USING THE SAME

FIELD OF THE INVENTION AND RELATED ART

This invention relates to a multi-beam optical scanning device and image forming apparatus using the same. The present invention is suitably usable in an image forming apparatus such as a laser beam printer (LBP), a digital copying machine or a multifunction printer, for example, having an electrophotographic process. More particularly, the present invention relates to a multi-beam optical scanning device which uses a plurality of light sources (light emitting members) as light source means so as to achieve a higher speed and higher recording density, as well as an image forming apparatus having such optical scanning device.

Several proposals have been made in regard to a multi-beam optical scanning device using a plurality of light sources (light emitting members) as light source means (see Patent Documents 1 and 2).

FIG. 45 is a sectional view in the main-scan direction (main-scan sectional view) of a main portion of such multi-beam optical scanning device.

Denoted in the drawing at 1 is light source means (multi-beam light source) which comprises a monolithic multi-beam semiconductor laser having a plurality of light emitting members (light emission points) which are two in FIG. 45, i.e., light emitting member A and light emitting member B.

Each of the light beams emitted from the light emitting members A and B is transformed into a parallel light beam by means of a collimator lens 2. Then, it is converged by a cylindrical lens 4 only in the sub-scan direction and, subsequently, it is shaped by an aperture stop 3. The light beam shaped by the aperture stop 3 is imaged into a focal-line shape extending in the main-scan direction, upon a deflecting surface 5a of a polygon mirror 5 which is a rotary polygonal mirror.

The elements of collimator lens 2 and cylindrical lens 4 described above are components of an input optical system LA.

Each of the light beams scanningly deflected by the polygon mirror 5 which is rotating at a constant angular speed in the direction of an arrow 5c in the drawing, is collected into a spot shape on a scan surface 7 (photosensitive drum) to be scanned, by means of an imaging optical system (fθ lens system) 6. The light scans the scan surface at a constant speed in the direction of an arrow 7b in the drawing.

Here, the fθ lens system 6 is comprised of two pieces of first fθ lens 6a and second fθ lens 6b.

In such multi-beam optical scanning device, if a plurality of light emitting members A and B are arrayed vertically along the sub-scan direction as shown in FIG. 46, the spacing (pitch) of scanning lines on the scan surface in the sub-scan direction becomes wider than the recording density.

In consideration of this, generally, a plurality of light emitting members A and B are disposed diagonally as shown in FIG. 47 and, by adjusting the oblique angle δ, the spacing of scanning lines on the scan surface 7 in the sub-scan direction is adjusted to precisely match the recording density.

[Patent Documents]

1. Japanese Laid-Open Patent Application No. 2004-302062
2. Japanese Laid-Open Patent Application No. 2004-070108

In image forming apparatuses such as a color LBP or a digital color copying machine, a multi-beam optical scanning device such as described above is frequently used to meet the requirement of higher speed.

Furthermore, in order to meet the requirement of reduction in size, a plurality of scan surfaces are scanned by a single rotary polygonal mirror as proposed by the patent document No. 2 and, to this end, for example, such structure that a light beam is incident on a surface being perpendicular to the rotational axis of the deflecting surface of the rotary polygonal mirror, obliquely in the sub-scan direction (hereinafter, this will be referred to as "oblique incidence scanning optical system").

In the multi-beam optical scanning device as described above, it is important that the imaging magnification of the fθ lens system in the sub-scan section (sub-scan direction), between the deflecting surface of the rotary polygonal mirror and the scan surface, becomes uniform throughout the whole effective image region.

This is because, if the imaging magnification of the fθ lens system in the sub-scan section is not uniform, the scanning line pitch of plural beams on the scan surface in the sub-scan direction can not be even within the effective image region.

However, if in an oblique incidence scanning optical system a multi-beam light source such as described above is used and if the imaging magnification of the fθ lens system in the sub-scan section is made constant throughout the whole effective scan region, the following problem arises. Namely, if the imaging magnification is made constant, the scanning line pitch of plural beams in the sub-scan direction upon the scan surface becomes different between the scan start side and the scan end side.

This will be explained below in greater detail, with reference to drawings.

FIG. 48 is a sectional view (main-scan sectional view) in the main-scan direction of a main portion of a multi-beam optical scanning device which is comprised of an oblique incidence scanning optical system having a multi-beam light source.

Denoted in FIG. 48 at 1 is light source means which comprises a multi-semiconductor laser (multi-beam light source) having two light emitting members (light sources) 1a and 1b.

In FIG. 48, the main-scan direction is called a y axis, and the direction in which light rays emitted from the light source means 1 advance (i.e., the direction in which light ray advance in parallel to the optical axis of the collimator lens) is called an x axis. The sub-scan direction which is perpendicular to the x axis and y axis is called a z axis. When viewed from the direction of an arrow O, the two light emitting members 1a and 1b are such as shown in FIG. 49. Here, the two light emitting members 1a and 1b are disposed diagonally and, by adjusting the diagonal angle δ, the scan line spacing on the scan surface 7 in the sub-scan direction is adjusted to precisely match the recording density.

Two light beams emitted from the two light emitting members 1a and 1b (only one light beam is illustrated in FIG. 48 for simplicity) is transformed into parallel light beams by the collimator lens 2, and then they are converged only in the sub-scan direction by the cylindrical lens 4. The two light beams having been converged only in the sub-scan direction by the cylindrical lens 4 pass through an aperture stop 3 by which the sectional shape of them is adjusted. Then, these light beams are imaged into a focal line shape elongating in the main-scan direction on the deflecting surface 5a of the rotary polygonal mirror (polygon mirror) 5 which is deflecting means.

The elements of collimator lens 2 and cylindrical lens 4 described above are components of an input optical system LA.

Furthermore, two light beams scanningly deflected by the deflecting surface 5a of the rotary polygonal mirror 5 which is rotating at a constant angular speed in the direction of an arrow 5c in the drawing, are collected into spot-like shapes, respectively, on the surface (photosensitive drum surface) 7 by means of an imaging optical system 6 having two pieces of lenses 61 and 62. Then, the scan surface is scanned by the two light beams focused thereon, in the direction of an arrow 7b in the drawing and at a constant speed.

Hereinafter, the imaging optical system 6 will be referred to as "fθ lens system 6", the lens 61 will be referred to as "first fθ lens", and the lens 62 will be referred to as "second fθ lens".

Denoted at 8 is a dustproof glass which is provided to prevent dust particles or toner particle from entering into the optical scanning device.

Here, within the main-scan section, the fθ lens system 6 functions to image the parallel light beam upon the scan surface 7. Furthermore, within the sub-scan section, the fθ lens system 6 functions to place the scan surface 7 and the imaging position (focal line position) imaged on the deflecting surface 5a in the sub-scan direction by the cylindrical lens 4, in a conjugate relationship with each other, thereby to provide a so-called tilt correction optical system.

FIG. 50 and FIG. 51 are a sectional view (sub-scan sectional view) in the sub-scan direction of a main portion of an oblique incidence scanning optical system having a multi-beam light source. FIG. 50 is a sub-scan sectional view of an imaging optical system 6, from the deflecting surface 5a to the scan surface 7. FIG. 51 is a sub-scan sectional view of an input optical system LA, from two light emitting members 1a and 1b to the deflecting surface 5a.

The input optical system LA from the two light emitting members 1a and 1b to the deflecting surface 5a is disposed obliquely below the plane (depicted by a broken line in FIG. 51) perpendicular to the pivotal axis of the deflecting surface 5a, while defining an angle of 2.5 degrees relative to that plane. The two light beams emitted from the two light emitting members 1a and 1b are incident from obliquely below relative to the plane perpendicular to the pivotal axis of the deflecting surface 5a, while defining an angle of 2.5 degrees relative to that plane.

The two light beams scanningly deflected by the deflecting surface 5a are being reflected obliquely upwardly relative to the plane (depicted by a broken line in FIG. 50) perpendicular to the pivotal axis of the deflecting surface 5a, while defining an angle of 2.5 degrees relative to that plane. Then, these light beams are collected into spot-like shapes on the scan surface 7 by means of the fθ lens system 6.

Here, if the two light emitting members 1a and 1b are disposed diagonally as shown in FIG. 49, the two light beams incident on the deflecting surface 5a are different in the angle in the main-scan direction. Therefore, the two light beams reflected by the deflecting surface 5a as well are different in the reflection angle. This leads to that light spots are imaged on the scan surface 7 at positions which are spaced apart from each other in the main-scan direction.

In order to avoid this, in the optical scanning device of the structure described above, the image data is supplied at the timing shifted by a predetermined time δT such that, with the position where the light beam emitted from one (reference light emitting member) of the light emitting members is imaged, the imaging position of the light beam emitted from the other light emitting member is registered.

It should be noted here that generally the light beam emitted from the reference light emitting member is the light beam emitted from the light emitting member which precedes with respect to the scanning direction. In FIG. 49, the light beam emitted from the light emitting member 1a corresponds to this.

FIG. 52 is a sectional view (main-scan sectional view) of a main portion in the main-scan direction, illustrating how the principal rays of the two light beams are reflected by the deflecting surface 5a when in FIG. 48 the scan start side (upper side as viewed in FIG. 48) is being scanned.

Initially, the light beam a emitted from the light emitting member 1a (not shown) is reflected by the deflecting surface 5a (shown by a solid line) in the direction toward a1, and it is imaged on the scan surface 7 by the fθ lens system 6 (not shown) which is disposed in the rightward direction of FIG. 52.

At the same timing, the light beam b emitted from the light emitting member 1b (not shown) is reflected by the deflecting surface 5a (shown by the solid line) in the direction toward b1, and it is imaged on the scan surface 7 by the fθ lens system 6 (not shown) which is disposed in the rightward direction of FIG. 52.

The two light beams a and b after being reflected by the deflecting surface 5a (shown by the solid line) at the same timing are reflected in the different directions toward a1 and b1, respectively. Thus, the two light beams a and b emitted from the two light emitting members 1a and 1b will be imaged on the scan surface 7 as spots at positions which are spaced apart from each other in the main-scan direction.

In consideration of this, the image data is supplied at the timing shifted by a predetermined time δT (the deflecting surface at that moment being depicted at 5b by a broken line) such that, with the position where the light beam a which is preceding in the main-scan direction is imaged, the imaging position of the subsequent light beam b is registered.

Here, the light beam b emitted from the light emitting member 1b and reflected by the deflecting surface 5b is reflected in the direction toward b1' (the same direction as a1), and it is imaged on the scan surface 7 at the same position in main-scan direction as the preceding light beam a.

FIG. 53 is a sectional view (sub-scan sectional view) of a main portion in the sub-scan direction, illustrating how the principal rays of the two light beams a and b are reflected by the deflecting surface 5a when in FIG. 48 the scan start side (upper side as viewed in FIG. 48) is being scanned.

Here, as viewed in FIG. 53, the reflecting point of the light beam b from the light emitting member 1b as reflected by the deflecting surface 5b (shown by a broken line) when the timing is shifted by a predetermined time δT, will be as follows. Namely, it is seen that the reflection point of the light beam b is deviated from the reflection point where the light beam a from the light emitting member 1a is reflected by the deflection surface 5a (shown by a solid line), in the direction spaced apart from the fθ lens system 6.

In FIG. 53, the two light beams a and b emitted from the two light emitting members 1a and 1b intersect with each other within the sub-scan section, at the aperture stop 3, and they are imaged on the deflecting surface 5a in a focal line shape, at positions spaced apart from each other in the sub-scan direction by a predetermined spacing.

Then, the two light beam a and b reflected at the same timing by the deflecting surface 5a (shown by the solid line) are imaged by the fθ lens system 6 on the scan surface 7, at positions 7a and 7b which are spaced apart from each other by a predetermined spacing.

Here, the scan surface 7 is being moved in the direction of an arrow A from below to above in FIG. 53, and the scan surface 7 is first scanned along a line by the preceding light beam a and, thereafter, a zone of the scan surface just below the line scanned by the preceding light beam a is scanned along a line by the subsequent light beam b.

With regard to the spacing between the positions 7a and 7b on the scan surface 7, if the resolution in the sub-scan direction is 600 DPI, generally the spacing will be $$25.4/600=0.04233 \text{ mm}=42.33 \text{ }\mu\text{m}$$

This is determined by the resolution in the sub-scan direction.

However, if the timing is shifted by a predetermined time $\delta T$ so that the imaging position of the subsequent light beam b is registered with the position where the light beam a which is preceding in the main-scan direction is imaged on the scan surface 7, the light beam b reflected by the deflecting surface 5b (shown by the broken line) at that time will be as follows. Namely, since the deflecting surface 5b at that time is deviated in the direction away from the fθ lens system 6, the light beam b is reflected at a position on the deflecting surface 5a which position is deviated upwardly in the sub-scan direction, and it is reflected in the direction toward b1'.

As a result, on the scan surface 7, the light beam b is imaged at a position 7b' which is deviated downwardly in sub-scan direction relative to the position 7b. Hence, it is seen that the spacing of scan lines on the scan surface 7 becomes wider than the spacing as determined by the resolution.

FIG. 54 is a main-scan sectional view illustrating how the principal rays of the two light beams a and b are reflected by the deflecting surface 5a when in FIG. 48 the scan end side (lower side as viewed in FIG. 48) is being scanned.

Initially, the light beam a emitted from the light emitting member 1a (not shown) is reflected by the deflecting surface 5a (shown by a solid line) in the direction toward a1, and it is imaged on the scan surface 7 by the fθ lens system 6 (not shown) which is disposed in the rightward direction of FIG. 54.

At the same timing, the light beam b emitted from the light emitting member 1b (not shown) is reflected by the deflecting surface 5a (shown by the solid line) in the direction toward b1, and it is imaged on the scan surface 7 by the fθ lens system 6 (not shown) which is disposed in the rightward direction of FIG. 54.

The two light beams a and b after being reflected by the deflecting surface 5a (shown by the solid line) at the same timing are reflected in the different directions toward a1 and b1, respectively. Thus, the two light beams a and b emitted from the two light emitting members 1a and 1b will be imaged on the scan surface 7 as spots at positions which are spaced apart from each other in the main-scan direction.

In consideration of this, the image data is supplied at the timing shifted by a predetermined time $\delta T$ (the deflecting surface at that moment being depicted at 5b by a broken line) such that, with the position where the light beam a which is preceding in the main-scan direction is imaged, the imaging position of the subsequent light beam b is registered.

Here, the light beam b emitted from the light emitting member 1b and reflected by the deflecting surface 5b is reflected in the direction toward b1' (the same direction as a1), and it is imaged on the scan surface 7 at the same position in main-scan direction as the preceding light beam a.

FIG. 55 is a sub-scan sectional view illustrating how the principal rays of the two light beams a and b are reflected by the deflecting surface 5a when in FIG. 48 the scan end side (lower side as viewed in FIG. 48) is being scanned.

Here, as viewed in FIG. 55, the reflecting point of the light beam b from the light emitting member 1b as reflected by the deflecting surface 5b (shown by a broken line) when the timing is shifted by a predetermined time $\delta T$, will be as follows. Namely, it is seen that the reflection point of the light beam b is deviated from the reflection point where the light beam a from the light emitting member 1a is reflected by the deflection surface 5a (shown by a solid line), in the direction approaching the fθ lens system 6.

In FIG. 55, the two light beams a and b emitted from the two light emitting members 1a and 1b intersect with each other within the sub-scan section, at the aperture stop 3, and they are imaged on the deflecting surface 5a in a focal line shape, at positions spaced apart from each other in the sub-scan direction by a predetermined spacing.

Then, the two light beam a and b reflected at the same timing by the deflecting surface 5a (shown by the solid line) are imaged by the fθ lens system 6 on the scan surface 7, at positions 7a and 7b which are spaced apart from each other by a predetermined spacing.

Here, the scan surface 7 is being moved in the direction of an arrow A from below to above in FIG. 55, and the scan surface 7 is first scanned along a line by the preceding light beam a and, thereafter, a zone of the scan surface just below the line scanned by the preceding light beam a is scanned along a line by the subsequent light beam b.

With regard to the spacing between the positions 7a and 7b on the scan surface 7, if the resolution in the sub-scan direction is 600 DPI, generally the spacing will be $$25.4/600=0.04233 \text{ mm}=42.33 \text{ }\mu\text{m}$$

This is determined by the resolution in the sub-scan direction.

However, if the timing is shifted by a predetermined time $\delta T$ so that the imaging position of the subsequent light beam b is registered with the position where the light beam a which is preceding in the main-scan direction is imaged on the scan surface 7, the light beam b reflected by the deflecting surface 5b (shown by the broken line) at that time will be as follows. Namely, since the deflecting surface 5b at that time is deviated in the direction approaching the fθ lens system 6, the light beam b is reflected at a position on the deflecting surface 5a which position is deviated downwardly in the sub-scan direction, and it is reflected in the direction toward b1'.

As a result, on the scan surface 7, the light beam b is imaged at a position 7b' which is deviated upwardly in sub-scan direction relative to the position 7b. Hence, it is seen that the spacing of scan lines on the scan surface 7 becomes narrower than the spacing as determined by the resolution.

As a result of this, as shown in FIG. 56, the spacing of the scanning lines on the scan surface 7 defined by the two light beam a and b emitted from the two light emitting members 1a and 1b becomes wider than the predetermined spacing at the scan start side, whereas it becomes narrower at the scan end side, thus causing pitch unevenness.

It is to be noted that in FIG. 56 the scan surface 7 moves in the direction of an arrow A, from below to above.

As described above, if the multi-beam light source is disposed and used in the manner shown in FIG. 49, it leads to that: if the imaging magnification of the fθ lens system 6 in the sub-scan section is made constant throughout the whole effective scan region, the scanning line pitch of plural light beams on the scan surface in the sub-scan direction becomes different between the scan start side and the scan end side. Particularly, there is an inconvenience that the pitch unevenness is serious in the end portions at the scan start side and the scan end side.

SUMMARY OF THE INVENTION

The present invention provides a multi-beam optical scanning device by which the scanning line pitch is uniformed and high precision image is obtainable, and an image forming apparatus using such optical scanning device.

In accordance with an aspect of the present invention, there is provided a multi-beam optical scanning device, comprising: a light source device including a plurality of light emitting members having a spacing in a main-scan direction; a rotary polygonal mirror configured to scanningly deflect a plurality of light beams emitted from said light emitting members; a first optical system configured to image, in a sub-scan section, the plurality of light beams from said plurality of light emitting members on a deflecting surface of said rotary polygonal mirror; and a second optical system configured to image the plurality of light beams scanningly deflected by the deflecting surface of said rotary polygonal mirror on a scan surface to be scanned; wherein, in the sub-scan section the deflecting surface of said rotary polygonal mirror and the scan surface are in a conjugate relationship with each other, wherein each of the plurality of light beams incident on the deflecting surface of said rotary polygonal mirror is incident from an oblique direction in the sub-scan section, relative to a plane perpendicular to a rotational axis of the deflecting surface of said rotary polygonal mirror, and wherein said multi-beam optical scanning device satisfies one of (i) a condition that an imaging magnification in the sub-scan section of said second optical system on an optical axis and between the deflecting surface of said rotary polygonal mirror and the scan surface is larger than an imaging magnification in the sub-scan section of said second optical system between the deflecting surface of said rotary polygonal mirror and the scan surface in an end portion at a scan start side of the light beam scanning the scan surface, and is smaller than an imaging magnification in the sub-scan section of said second optical system between the deflecting surface of said rotary polygonal mirror and the scan surface in an end portion at a scan end side of the light beam scanning the scan surface, and (ii) a condition that the imaging magnification in the sub-scan section of said second optical system on the optical axis and between the deflecting surface of said rotary polygonal mirror and the scan surface is smaller than the imaging magnification in the sub-scan section of said second optical system between the deflecting surface of said rotary polygonal mirror and the scan surface in the end portion at the scan start side of the light beam scanning the scan surface, and is larger than the imaging magnification in the sub-scan section of said second optical system between the deflecting surface of said rotary polygonal mirror and the scan surface in the end portion at the scan end side of the light beam scanning the scan surface.

In one preferred form of this aspect of the present invention, the light source device comprises a monolithic multi-beam semiconductor laser having a plurality of light emitting members formed on the same base member.

The light source device may comprise a plurality of light source units each having one or more light emitting members, wherein said first optical system includes a beam combining member configured to direct one or more light beams emitted from said plurality of light source units in the same direction.

When a direction toward a downstream side in a movement direction of the scan surface is defined as a plus direction in the sub-scan direction while a direction toward an upstream side in the movement direction of the scan surface is defined as a minus direction in the sub-scan direction, each of the plurality of light beams incident on the deflecting surface of said rotary polygonal mirror may be incident from an oblique minus direction in the sub-scan direction relative to a plane perpendicular to the rotational axis of the deflecting surface of said rotary polygonal mirror, wherein, under the above condition, the imaging magnification in the sub-scan section of said second optical system on the optical axis and between the deflecting surface of said rotary polygonal mirror and the scan surface may be smaller than the imaging magnification in the sub-scan section of said second optical system between the deflecting surface of said rotary polygonal mirror and the scan surface in the end portion at the scan start side of the light beam scanning the scan surface, and may be larger than the imaging magnification in the sub-scan section of said second optical system between the deflecting surface of said rotary polygonal mirror and the scan surface in the end portion at the scan end side of the light beam scanning the scan surface.

When a direction toward an upstream side in a movement direction of the scan surface is defined as a plus direction in the sub-scan direction while a direction toward a downstream side in the movement direction of the scan surface is defined as a minus direction in the sub-scan direction, each of the plurality of light beams incident on the deflecting surface of said rotary polygonal mirror may be incident from an oblique minus direction in the sub-scan direction relative to a plane perpendicular to the rotational axis of the deflecting surface of said rotary polygonal mirror, wherein, under the above condition, the imaging magnification in the sub-scan section of said second optical system on the optical axis and between the deflecting surface of said rotary polygonal mirror and the scan surface may be larger than the imaging magnification in the sub-scan section of said second optical system between the deflecting surface of said rotary polygonal mirror and the scan surface in the end portion at the scan start side of the light beam scanning the scan surface, and may be smaller than the imaging magnification in the sub-scan section of said second optical system between the deflecting surface of said rotary polygonal mirror and the scan surface in the end portion at the scan end side of the light beam scanning the scan surface.

In accordance with another aspect of the present invention, there is provided an image forming apparatus, comprising: a multi-beam optical scanning device as recited above; a photosensitive member disposed at the scan surface; a developing device for developing an electrostatic latent image formed on said photosensitive member with a light beam scanningly deflected by said optical scanning device, to produce a toner image; a transferring device for transferring the developed toner image onto a transfer material; and a fixing device for fixing the transferred toner image, on the transfer material.

In accordance with a further aspect of the present invention, there is provided an image forming apparatus, comprising: a multi-beam optical scanning device as recited above; and a printer controller for converting code data supplied from an outside machine into an imagewise signal and for inputting the imagewise signal into said optical scanning device.

In accordance with a yet further aspect of the present invention, there is provided a color image forming apparatus, comprising: a multi-beam optical scanning device as recited above; and a plurality of image bearing members each being disposed at the scan surface of said multi-beam optical scanning device, for forming images of different colors.

The color image forming apparatus may further comprise a printer controller for converting a color signal supplied from an outside machine into imagewise data of different colors and for inputting the imagewise data into corresponding optical scanning devices.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

Embodiment 1

Figure 1:
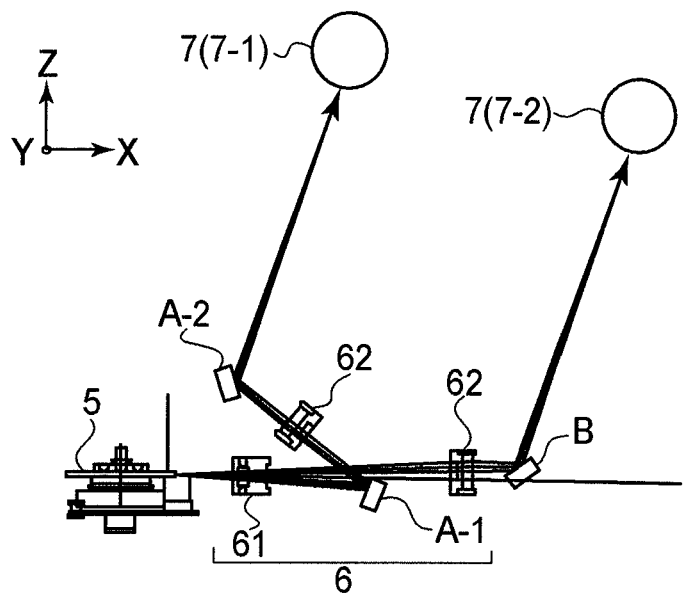
FIG. 1 is a sectional view in the sub-scan direction of a main portion of a multi-beam optical scanning device according to a first embodiment of the present invention.

FIG. 1 is a sectional view (sub-scan sectional view) in the sub-scan direction of a main portion of a multi-beam optical scanning device according to a first embodiment of the present invention.

Figure 2:
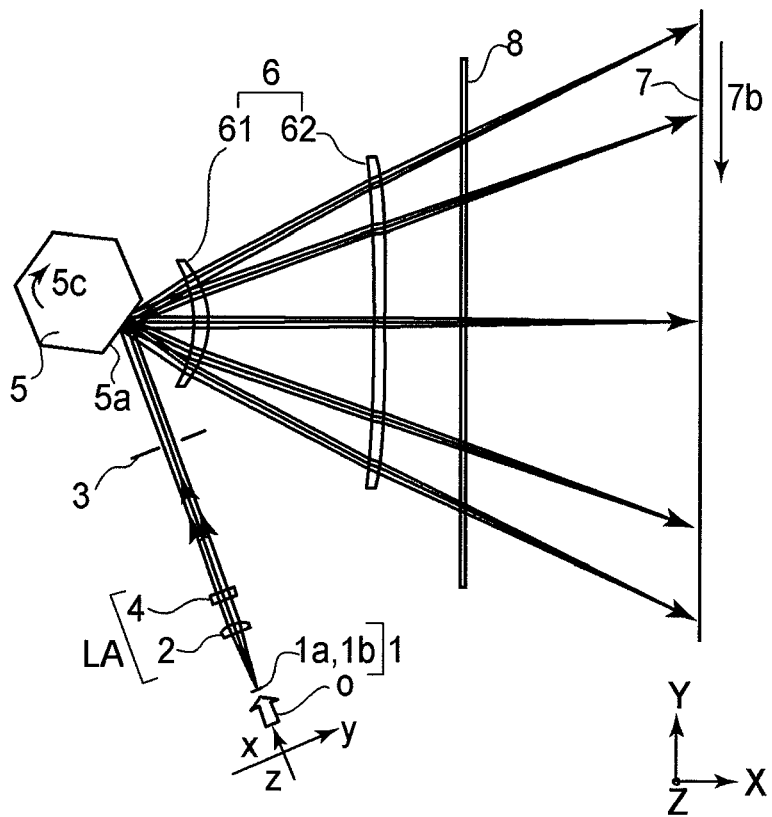
FIG. 2 is a sectional view in the main-scan direction of a main portion of the optical system of FIG. 1.

FIG. 2 is a sectional view (main-scan sectional view) in the main-scan direction of a main portion of an optical system through which a light beam obliquely upwardly reflected by a deflecting surface 5a of a rotary polygonal mirror in FIG. 1 passes (in FIG. 2, the optical system through which the light beam reflected by a reflection mirror B of FIG. 1 passes).

Figure 3:
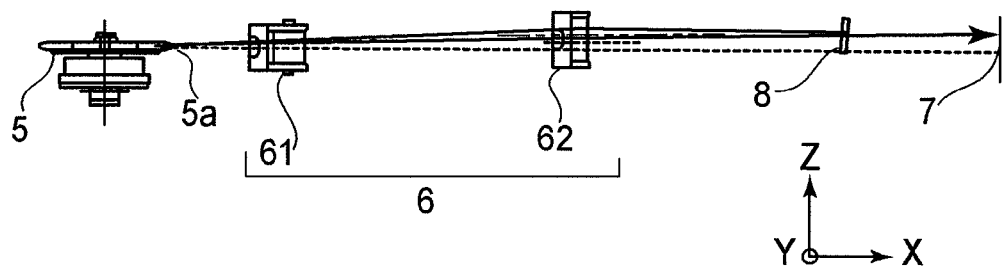
FIG. 3 is a sectional view in the sub-scan direction of a main portion of the first embodiment of the present invention.
Figure 4:
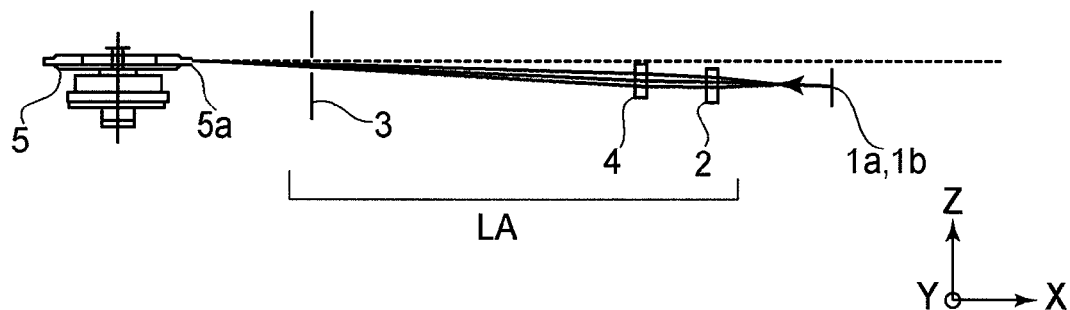
FIG. 4 is a section view in the sub-scan direction of the first embodiment of the present invention.

FIG. 3 and FIG. 4 are a sectional view (sub-scan sectional view) in the sub-scan direction of a main portion of FIG. 2. Specifically, FIG. 3 is a sub-scan sectional view of an imaging optical system 6, from the deflecting surface 5a of the rotary polygonal mirror 5 to the scan surface 7, wherein deflection by the reflecting mirror B is omitted in illustration.

FIG. 4 is a sub-scan sectional view of an input optical system LA, from the two light emitting members (light emission points) 1a and 1b to the deflecting surface 5a, and it illustrates that two light beams emitted from the two light emitting members 1a and 1b are incident on the deflecting surface 5a of the rotary polygonal mirror 5 in the sub-scan direction from obliquely below.

In the following description, the main-scan direction (y direction) refers to a direction in which a light beam is scanningly deflected by the deflecting means. The sub-scan direction (z direction) refers to a direction which is parallel to the rotational axis of the deflecting means.

The main-scan section refers to a plane having a normal thereto extending in the sub-scan direction (z direction). The sub-scan section refers to a plane having a normal thereto extending in the main-scan direction (y direction).

In FIGS. 1-4, the light source means 1 is comprised of a monolithic multi-beam semiconductor laser (multi-beam light source) in which a plurality of light emitting members 1a and 1b (two in the present embodiment) having a spacing in the main-scan direction are formed on the base plate.

Figure 5:
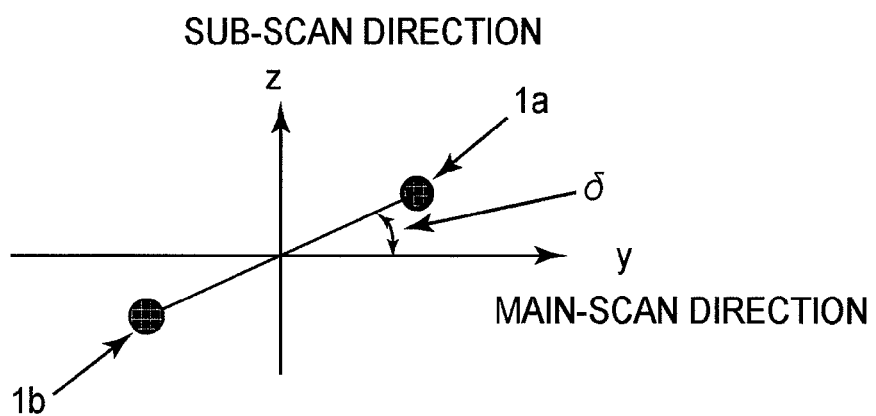
FIG. 5 is a diagram illustrating the disposition of two light emitting members in the first embodiment of the present invention.

In FIG. 2, the main-scan direction is called a y axis, and the direction in which light rays from the light source means 1 advance (the direction in which the light rays advance in parallel to the optical axis of the collimator lens) is called an x axis. The sub-scan direction which is orthogonal to the x axis and y axis is called a z axis. The two light emitting members 1a and 1b when viewed from the direction of an arrow O are such as shown in FIG. 5. Here, these two light emitting members 1a and 1b are disposed diagonally and, by adjusting the diagonal angle δ, the spacing (pitch) of the scanning lines on the scan surface 7 in the sub-scan direction is adjusted precisely to match the recording density.

Two divergent light beams emitted from the light source means 1 (only one light beam being illustrated in the drawing for simplicity of illustration) are converted into parallel light beams by a collimator lens 2 which is a first optical element. Thereafter, the light beams are converged by a cylindrical lens 4 which is a second optical element, only in the sub-scan direction.

Although the first optical element 2 in the present embodiment converts the state of light beam into parallel light beam, the present invention is not limited to this. It may convert the divergent light beam into a divergent light beam having slower divergence or a convergent light beam.

The two light beams having been converged only in the sub-scan direction by the cylindrical lens 4 pass through an aperture stop 3 by which the sectional shape of them is adjusted. Then, these light beams are imaged into a focal line shape elongating in the main-scan direction on the deflecting surface 5a of the rotary polygonal mirror (polygon mirror) 5 which is deflecting means.

The elements of collimator lens 2 and cylindrical lens 4 described above are components of an input optical system LA as the first optical system.

It should be noted that the optical axis of the input optical system LA is disposed to have a predetermined angle (2.5 deg. in the present embodiment) which is not zero, within the sub-scan section, relative to a plane perpendicular to the deflection axis of the deflecting surface 5a of the rotary polygonal mirror 5, this being a structure so-called an oblique incidence scanning optical system.

In other words, each of the plurality of light beams incident on the deflecting surface of the rotary polygonal mirror 5 is being incident from an oblique direction relative to a plane perpendicular to the rotational axis of the deflecting surface of the rotary polygonal mirror 5 within the sub-scan section.

Furthermore, two light beams scanningly deflected by the deflecting surface 5a of the rotary polygonal mirror 5 which is rotating at a constant angular speed in the direction of an arrow 5c in the drawing, are collected into spot-like shapes, respectively, on the scan surface (photosensitive drum surface) 7 by means of an imaging optical system 6 (second optical system) having two pieces of lenses 61 and 62. Then, the scan surface is scanned by the two light beams in the direction of an arrow 7b in the drawing and at a constant speed.

The imaging optical system 6 functions to place the deflecting surface 5a of the rotary polygonal mirror 5 and the scan surface 7 in a conjugate relationship with each other within the sub-scan section and to image the two light beams scanningly deflected by the deflecting surface 5a of the rotary polygonal mirror 5 on the scan surface 7.

As already described, the imaging optical system 6 will be referred to as "fθ lens system 6", the lens 61 will be referred to as "first fθ lens", and the lens 62 will be referred to as "second fθ lens".

Denoted at 8 is a dustproof glass which is provided to prevent dust particles or toner particle from entering into the optical scanning device.

Here, within the main-scan section, the fθ lens system 6 functions to image the parallel light beam into a spot shape on the scan surface 7. Furthermore, within the sub-scan section, the fθ lens system 6 functions to bring the scan surface 7 and the imaging position (focal line position) imaged on the deflecting surface 5a in the sub-scan direction by the cylindrical lens 4, into a conjugate relationship with each other, thereby to provide a so-called tilt correction optical system.

The present embodiment uses such structure that a plurality of light beams are incident on a single rotary polygonal mirror 5 and a plurality of scan surfaces (photosensitive drum surfaces) 7-1 and 7-2 are optically scanned simultaneously.

The light beam from a first fθ lens 61 and directed toward the scan surface 7-1 is reflected by a reflecting mirror A-1 and enters a second fθ lens 62. Then the light beam is reflected by a reflecting mirror A-2 and scans the scan surface 7-1.

On the other hand, the light beam from the first fθ lens 61 and directed toward the scan surface 7-2 is directly incident on a second fθ lens 62 of the same shape but mounted separately. Then, the light beam is reflected by a reflecting mirror B and scans the scan surface 7-2.

It should be noted that both of the two light beams deflected by the deflecting surface 5a pass through the first fθ lens 61.

When two multi-beam optical scanning devices of the present embodiment are disposed in parallel laterally, a color image forming apparatus can be accomplished.

The present embodiment concerns such structure that two light beams emitted from two light emitting members 1a and 1b shown in FIG. 3 and FIG. 4 are incident on the deflecting surface 5a of a rotary polygonal mirror 5, obliquely from the below in the sub-scan direction, and that these light beams are reflected obliquely upwardly by the deflecting surface 5a.

Table 1 and Table 2 show the characteristics of the optical system of the multi-beam optical scanning device in the present embodiment.

If the point of intersection of each lens surface with the optical axis is taken as an origin, the optical axis direction is taken as an X axis, an axis orthogonal to the optical axis within the main-scan section is taken as a Y axis, and an axis orthogonal to the optical axis within the sub-scan section is taken as a Z axis, the shape in the main-scan section of the lens surfaces of the first and second fθ lenses 61 and 62, constituting the fθ lens system 6, is an aspherical surface shape that can be expressed by the following equation:

$$x = \frac{y^2/R}{1+(1-(1+k)(y/R)^2)^{1/2}} + \sum_{i=4}^{16} B_i y^i$$

where R is the curvature radius, k is the eccentricity, and $B_4$ to $B_{16}$ are aspherical coefficients.

If the coefficient is different between the plus side of Y (upper side in FIG. 2) and the minus side thereof (lower side in FIG. 2), a subscript u is attached to the coefficient of plus side while a subscript l is attached to the coefficient of minus side.

The shape of the second fθ lens 62 at the rotary polygonal mirror 5 side, in the main-scan section, is an arcuate shape. Furthermore, the shape of both of the lens surfaces of the first fθ lens 61 and the surface of the second fθ lens 62 at the rotary polygonal mirror 5 side, in the sub-scan section, is an arcuate shape having a curvature radius r in the sub-scan section.

With regard to the shape in the sub-scan section of the lens surface of the second fθ lens 62 at the scan surface 7 side, the curvature radius r' in the sub-scan section changes continuously with the Y-coordinate of the lens surface, and it has a shape that can be expressed by:

$$r' = r \times \left(1 + \sum_{j=2}^{10} D_j y^j\right)$$

where r is the curvature radius on the optical axis in the sub-scan section, and $D_2$ to $D_{10}$ are coefficients of variation of the curvature radius in the sub-scan section.

If the coefficient is different between the plus side of Y (upper side in FIG. 2) and the minus side thereof (lower side in FIG. 2), a subscript u is attached to the coefficient of plus side while a subscript l is attached to the coefficient of minus side.

TABLE 1

| Used Reference Wavelength | λ | nm | 790 |
|---|---|---|---|
| No. of Light Emission Points | n | | 2 |
| Semiconductor Laser Cover Glass Thickness | dcg | mm | 0.25000 |
| Semiconductor Laser Cover Glass Refractive Index | n0 | | 1.51052 |
| Light Emission Point to Collimator Lens 1st Surface | d0 | mm | 23.35000 |
| Collimator Lens 1st Surface Curvature Radius | R1 | mm | infinite |
| Collimator Lens Thickness | d1 | mm | 3.00000 |
| Collimator Lens Refractive Index | n1 | | 1.76167 |
| Collimator Lens 2nd Surface Curvature Radius | R2 | mm | −19.04573 |
| Collimator Lens 1st Surface to Cylindrical Lens 1st Surface | d2 | mm | 11.00000 |
| Sub-Scan Direction Curvature Radius of Cylindrical Lens 1st Surface | Rs3 | mm | 85.51720 |
| Main-Scan Direction Curvature Radius of Cylindrical Lens 1st Surface | Rm3 | mm | infinite |
| Cylindrical Lens Thickness | d3 | mm | 3.00000 |
| Cylindrical Lens Refractive Index | n3 | | 1.52397 |

TABLE 1-continued

| | | | |
|---|---|---|---|
| Cylindrical Lens 2nd Surface Curvature Radius | R4 | mm | infinite |
| Cylindrial Lens 2nd Surface to Aperture Stop | d4 | mm | 59.37142 |
| Apertuer Stop to Polygon Deflecting Reflection Surface | d5 | mm | 50.04736 |
| Polygon Deflecting Reflection Surface to 1st f-theta Lens 1st Surface | d6 | mm | 26.00000 |
| 1st f-theta Lens Thickness | d7 | mm | 6.00000 |
| 1st f-theta Lens Refractive Index | n7 | | 1.52397 |
| 1st f-theta Lens 2nd Surface to 2nd f-theta Lens 1st Surface | d8 | mm | 63.00000 |
| 2nd f-theta Lens Thickness | d9 | mm | 4.00000 |
| 2nd f-theta Lens Refractive Index | n9 | | 1.52397 |
| 2nd f-theta Lens 2nd Surface to Scan Surface | d10 | mm | 121.00000 |
| Dust-Proof Glass Thickness | t | mm | 2.00000 |
| Dust-Proof Glass Refractive Index | n10 | | 1.51052 |
| Input Optical System Polygon Incidence Angle | γ | deg | 70.00000 |
| Largest Effective Light Ray Scan Angle | η | deg | 35.04795 |
| Polygon Circumscribed Circle Radius | r | mm | 20.00000 |
| No. of Polygon Surfaces | men | | 6 |
| Stop Diameter | φM × φS(ellpitical) | mm | 4.3 × 1.16 |

TABLE 2 f-theta Lens Shape

| 1st Surface | | 2nd Surface | |
|---|---|---|---|
| 1st f-theta Lens | | | |
| R | −47.89033 | R | −32.03126 |
| k | −1.40869E+01 | k | −2.06203E−01 |
| B4 | −1.45094E−05 | B4u | 1.48566E−06 |
| B6 | 4.13425E−08 | B6u | 2.98074E−09 |
| B8 | −5.75181E−11 | B8u | 1.63489E−11 |
| B10 | 2.14165E−14 | B10u | −2.82411E−14 |
| | | B4l | 1.51135E−06 |
| | | B6l | 2.82892E−09 |
| | | B8l | 1.68326E−11 |
| | | B10l | −2.88270E−14 |
| r | 1000.00000 | r | 1000.00000 |
| 2nd f-theta Lens | | | |
| R | −752.43160 | R | 936.11332 |
| k | 0.00000E+00 | k | 1.77995E+02 |
| B4 | 0.00000E+00 | B4 | −4.95606E−07 |
| B6 | 0.00000E+00 | B6 | 4.65009E−11 |
| B8 | 0.00000E+00 | B8 | −2.23326E−15 |
| B10 | 0.00000E+00 | B10 | −3.44755E−19 |
| r | 125.20300 | r | −35.75160 |
| | | D2u | 1.16376E−04 |
| | | D4u | −2.11588E−08 |
| | | D6u | 3.86864E−12 |
| | | D8u | −2.83684E−16 |
| | | D10u | 3.03055E−21 |
| | | S2l | 1.10660E−04 |
| | | D4l | −2.10720E−08 |
| | | D6l | 4.31506E−12 |
| | | D8l | −6.46782E−16 |
| | | D10l | 7.58347E−20 |

Next, the scanning method according to the present embodiment will be explained specifically.

Figure 6:
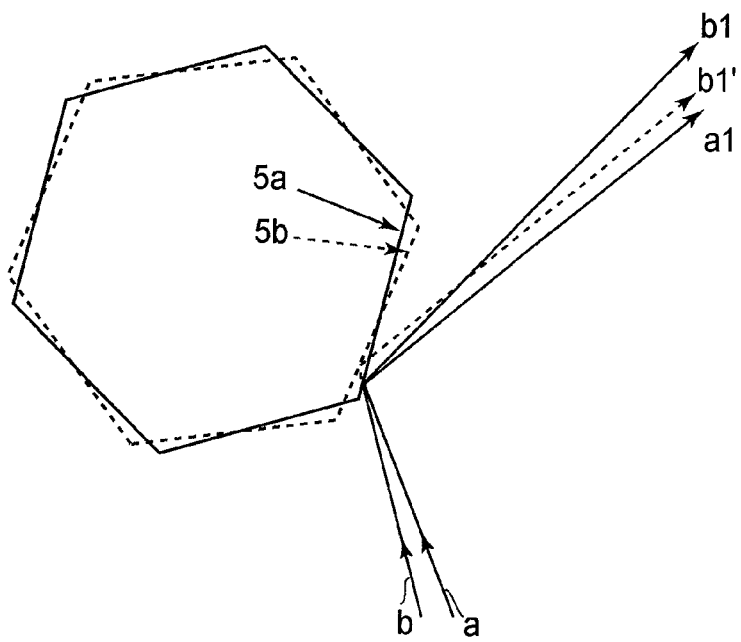
FIG. 6 is a main-scan sectional view illustrating how two light beams are reflected by the deflecting surface in the first embodiment of the present invention.

FIG. 6 is a main-scan sectional view illustrating how the principal rays of two light beams are reflected by the deflecting surface 5a when in FIG. 2 the scan start side (upper side as viewed in FIG. 2) is being scanned.

Initially, the light beam a emitted from the light emitting member 1a (not shown) is reflected by the deflecting surface 5a (shown by a solid line) in the direction toward a1, and it is imaged on the scan surface 7 by the fθ lens system 6 (not shown) which is disposed in the rightward direction of FIG. 6.

At the same timing, the light beam b emitted from the light emitting member 1b (not shown) is reflected by the deflecting surface 5a (shown by the solid line) in the direction toward b1, and it is imaged on the scan surface 7 by the fθ lens system 6 (not shown) which is disposed in the rightward direction of FIG. 6.

The two light beams a and b after being reflected by the deflecting surface 5a (shown by the solid line) at the same timing are reflected in different directions toward a1 and b1, respectively. Thus, the two light beams a and b emitted from the two light emitting members 1a and 1b will be imaged on the scan surface 7 as spots at positions which are spaced apart from each other in the main-scan direction.

In consideration of this, the image data is supplied at the timing shifted by a predetermined time δT (the deflecting surface at that moment being depicted at 5b by a broken line) such that, with the position where the light beam a which is preceding in the main-scan direction is imaged, the imaging position of the subsequent light beam b is registered.

Here, the light beam b emitted from the light emitting member 1b and reflected by the deflecting surface 5b is reflected in the direction toward b1' (the same direction as a1), and it is imaged on the scan surface 7 at the same position in main-scan direction as the preceding light beam a.

Figure 7:
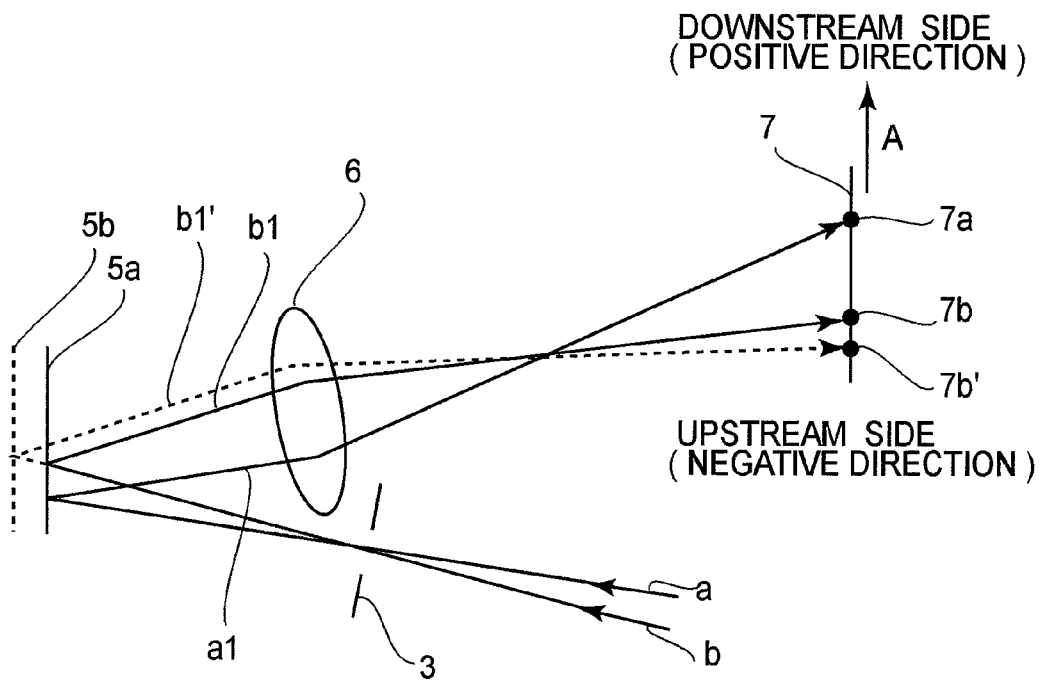
FIG. 7 is a sub-scan sectional view illustrating how two light beams are reflected by the deflecting surface in the first embodiment of the present invention.

FIG. 7 is a sub-scan sectional view illustrating how the principal rays of the two light beams a and b are reflected by the deflecting surface 5a when in FIG. 2 the scan start side (upper side as viewed in FIG. 2) is being scanned.

Here, as viewed in FIG. 7, the reflecting point of the light beam b from the light emitting member 1b as reflected by the deflecting surface 5b (shown by a broken line) when the timing is shifted by a predetermined time δT, will be as follows. Namely, it is seen that the reflection point of the light beam b is deviated from the reflection point where the light beam a from the light emitting member 1a is reflected by the deflection surface 5a (shown by a solid line), in the direction spaced apart from the fθ lens system 6.

In FIG. 7, the two light beams a and b emitted from the two light emitting members 1a and 1b intersect with each other within the sub-scan section, at the aperture stop 3, and they are imaged on the deflecting surface 5a in a focal line shape, at positions spaced apart from each other in the sub-scan direction by a predetermined spacing.

Then, the two light beam a and b reflected at the same timing by the deflecting surface 5a (shown by the solid line)

are imaged by the fθ lens system 6 on the scan surface 7, at positions 7a and 7b which are spaced apart from each other by a predetermined spacing.

Here, the scan surface 7 is being moved in the direction of an arrow A from below to above in FIG. 7, and the scan surface 7 is first scanned along a line by the preceding light beam a and, thereafter, a zone of the scan surface just below the line scanned by the preceding light beam a is scanned along a line by the subsequent light beam b.

In FIG. 7, the downward direction in the drawing is defined as a minus direction (upstream side in the movement direction of the scan surface 7) in the sub-scan direction, while the upward direction in the drawing is defined as a plus direction (downstream side in the movement direction of the scan surface 7) in the sub-scan direction.

With regard to the spacing between the imaging positions 7a and 7b on the scan surface 7, if the resolution in the sub-scan direction is 600 DPI, for example, generally the spacing will be $$25.4/600=0.04233 \text{ mm}=42.33 \text{ μm}$$

This is determined by the resolution in the sub-scan direction.

However, if the timing is shifted by a predetermined time δT so that the imaging position of the subsequent light beam b is registered with the position where the light beam a which is preceding in the main-scan direction is imaged on the scan surface 7, the light beam b reflected by the deflecting surface 5b (shown by the broken line) at that time will be as follows. Namely, since the deflecting surface 5b at that time is deviated in the direction away from the fθ lens system 6, the light beam b is reflected at a position on the deflecting surface 5a which position is deviated upwardly in the sub-scan direction, and it is reflected in the direction toward b1'.

As a result, on the scan surface 7, the light beam is imaged at a position 7b' which is deviated downwardly in sub-scan direction relative to the position 7b.

Figure 8:
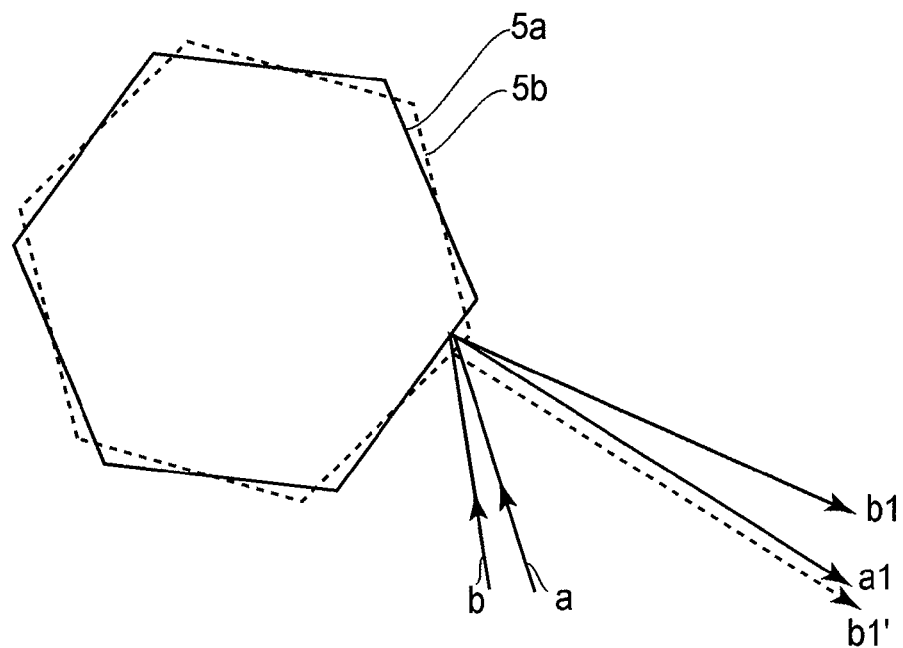
FIG. 8 is a main-scan sectional view illustrating how two light beams are reflected by the deflecting surface in the first embodiment of the present invention.

FIG. 8 is a main-scan sectional view illustrating how the principal rays of the two light beams a and b are reflected by the deflecting surface 5a when in FIG. 2 the scan end side (lower side as viewed in FIG. 2) is being scanned.

Initially, the light beam a emitted from the light emitting member 1a (not shown) is reflected by the deflecting surface 5a (shown by a solid line) in the direction toward a1, and it is imaged on the scan surface 7 by the fθ lens system 6 (not shown) which is disposed in the rightward direction of FIG. 8.

At the same timing, the light beam b emitted from the light emitting member 1b (not shown) is reflected by the deflecting surface 5a (shown by the solid line) in the direction toward b1, and it is imaged on the scan surface 7 by the fθ lens system 6 (not shown) which is disposed in the rightward direction of FIG. 8.

The two light beams a and b after being reflected by the deflecting surface 5a (shown by the solid line) at the same timing are reflected in the different directions toward a1 and b1, respectively. Thus, the two light beams a and b emitted from the two light emitting members 1a and 1b will be imaged on the scan surface 7 as spots at positions which are spaced apart from each other in the main-scan direction.

In consideration of this, the image data is supplied at the timing shifted by a predetermined time δT (the deflecting surface at that moment being depicted at 5b by a broken line) such that, with the position where the light beam a which is preceding in the main-scan direction is imaged, the imaging position of the subsequent light beam b is registered.

Here, the light beam b emitted from the light emitting member 1b and reflected by the deflecting surface 5b is reflected in the direction toward b1' (the same direction as a1), and it is imaged on the scan surface 7 at the same position in main-scan direction as the preceding light beam a.

Figure 9:
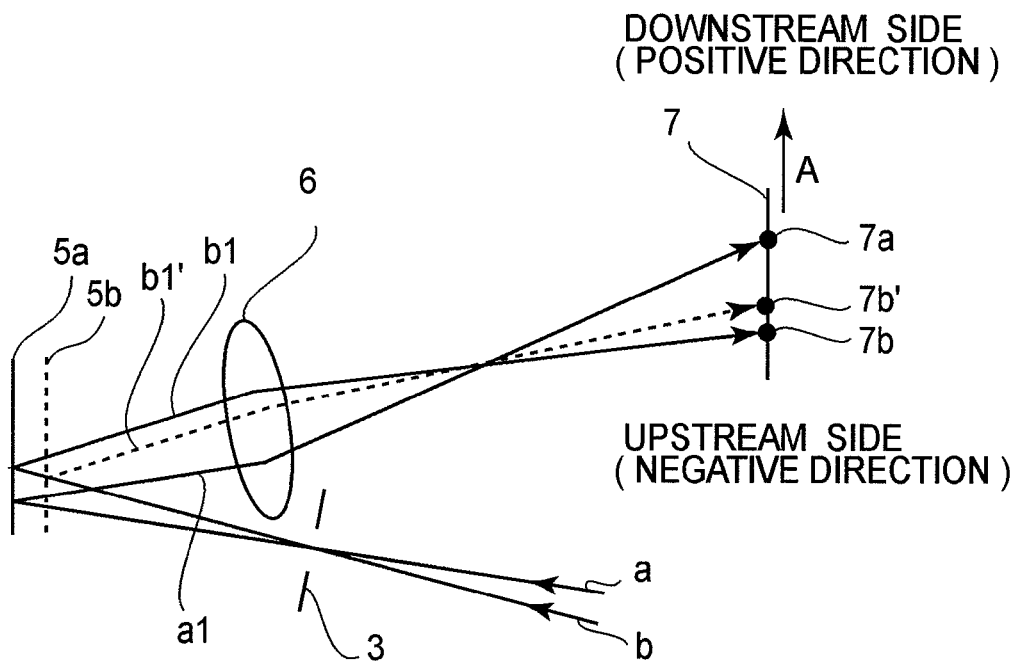
FIG. 9 is a sub-scan sectional view illustrating how two light beams are reflected by the deflecting surface in the first embodiment of the present invention.

FIG. 9 is a sub-scan sectional view illustrating how the principal rays of the two light beams a and b are reflected by the deflecting surface 5a when in FIG. 2 the scan end side (lower side as viewed in FIG. 2) is being scanned.

Here, as viewed in FIG. 9, the reflecting point of the light beam b from the light emitting member 1b as reflected by the deflecting surface 5b (shown by a broken line) when the timing is shifted by a predetermined time δT, will be as follows. Namely, it is seen that the reflection point of the light beam b is deviated from the reflection point where the light beam a from the light emitting member 1a is reflected by the deflection surface 5a (shown by a solid line), in the direction approaching the fθ lens system 6.

In FIG. 9, the two light beams a and b emitted from the two light emitting members 1a and 1b intersect with each other within the sub-scan section, at the aperture stop 3, and they are imaged on the deflecting surface 5a in a focal line shape, at positions spaced apart from each other in the sub-scan direction by a predetermined spacing.

Then, the two light beam a and b reflected at the same timing by the deflecting surface 5a (shown by the solid line) are imaged by the fθ lens system 6 on the scan surface 7, at positions 7a and 7b which are spaced apart from each other by a predetermined spacing.

Here, the scan surface 7 is being moved in the direction of an arrow A from below to above in FIG. 9, and the scan surface 7 is first scanned along a line by the preceding light beam a and, thereafter, a zone of the scan surface just below the line scanned by the preceding light beam a is scanned along a line by the subsequent light beam b.

In FIG. 9, the downward direction in the drawing is defined as a minus direction (upstream side in the movement direction of the scan surface 7) in the sub-scan direction, while the upward direction in the drawing is defined as a plus direction (downstream side in the movement direction of the scan surface 7) in the sub-scan direction.

With regard to the spacing between the imaging positions 7a and 7b on the scan surface 7, if the resolution in the sub-scan direction is 600 DPI, generally the spacing will be $$25.4/600=0.04233 \text{ mm}=42.33 \text{ μm}$$

This is determined by the resolution in the sub-scan direction.

However, if the timing is shifted by a predetermined time δT so that the imaging position of the subsequent light beam b is registered with the position where the light beam a which is preceding in the main-scan direction is imaged on the scan surface 7, the light beam b reflected by the deflecting surface 5b (shown by the broken line) at that time will be as follows. Namely, since the deflecting surface 5b at that time is deviated in the direction approaching the fθ lens system 6, the light beam b is reflected at a position on the deflecting surface 5a which position is deviated downwardly in the sub-scan direction, and it is reflected in the direction toward b1'.

As a result, on the scan surface 7, the light beam b is imaged at a position 7b' which is deviated upwardly in sub-scan direction relative to the position 7b.

Figure 10:
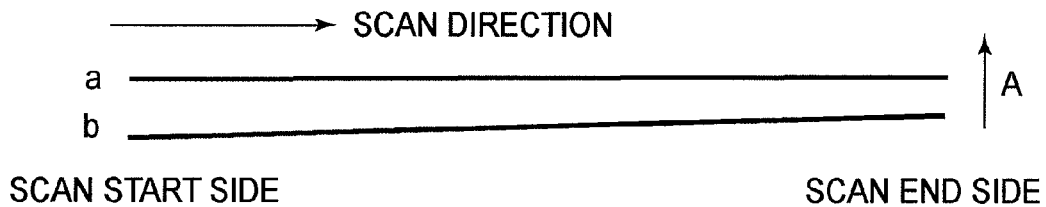
FIG. 10 is a diagram showing a change of spacing of the two scanning lines on the scan surface, in the first embodiment of the present invention.

This leads to that, if the imaging magnification in the sub-scan section of the fθ lens system 6 is constant throughout the whole effective scan region, pitch irregularity occurs as shown in FIG. 10. Namely, the spacing of the scanning lines on the scan surface 7 defined by the two light beam a and b emitted from the two light emitting members 1a and 1b becomes wider than the predetermined spacing at the scan start side, whereas it becomes narrower at the scan end side, thus causing pitch unevenness.

As compared therewith, in the present embodiment, the imaging magnification of the fθ lens system 6 in the sub-scan section is not held constant throughout the whole effective scan region, but rather the sub-scan magnification βs of the fθ lens system 6 in the abaxial region at the scan start side (scan start side end portion) of the light beam scanning the scan surface is made small.

To the contrary, the sub-scan magnification βe of the fθ lens system 6 in the abaxial region at the scan end side (scan end side end portion) of the light beam scanning the scan surface is made large.

Namely, in the present embodiment, there is a relation βs<βe.

In FIG. 10, the scan surface 7 moves in the direction of an arrow A from below to above as viewed in the drawing.

Figure 11:
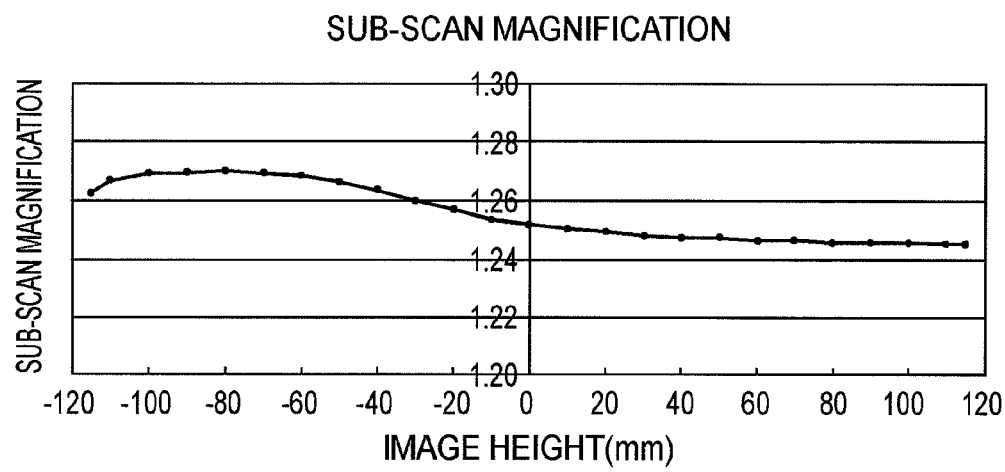
FIG. 11 is a graph showing the sub-scan magnification in the first embodiment of the present invention.

FIG. 11 shows the imaging magnification (sub-scan magnification) in the sub-scan section of the fθ lens system 6, between the deflecting surface 5a and the scan surface 7 in the present embodiment.

In FIG. 11, the axis of abscissas denotes the scan image height (mm) on the scan surface 7. The plus side of the image height corresponds to the scan start side (upper side of FIG. 2 and the scan start side in FIG. 10), while the minus side of the image height corresponds to the scan end side (lower side of FIG. 2 and the scan end side in FIG. 10).

As seen from FIG. 11, relative to the sub-scan magnification βc at the scan central portion, the sub-scan magnification βs at the scan start side (plus side of the image height) is made small, whereas the sub-scan magnification βe at the scan end side (minus side of the image height) is made large. Namely, in present embodiment, there is a relation βs<βc<βe.

Figure 12:
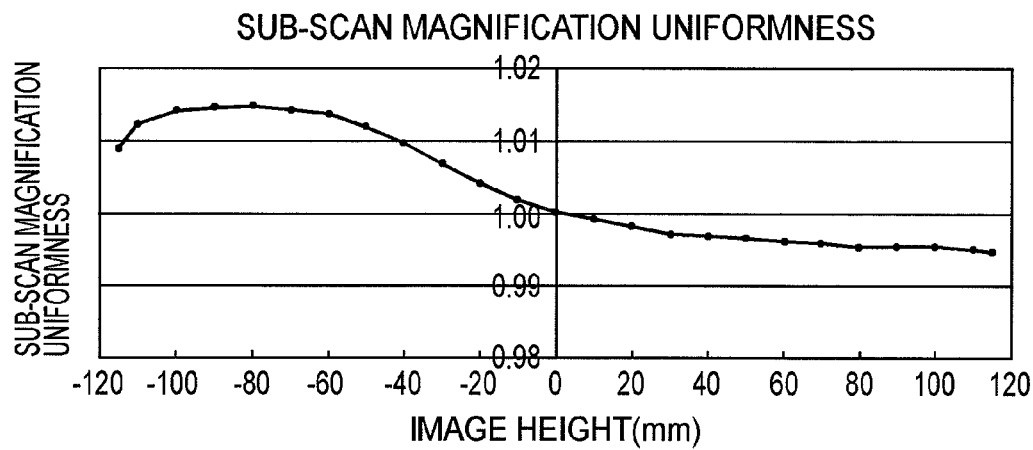
FIG. 12 is a graph showing uniformity of the sub-scan magnification in the first embodiment of the present invention.

FIG. 12 illustrates the uniformity of the sub-scan magnification, with the sub-scan magnification βc on the optical axis (scan central portion) in FIG. 11 normalized to 1.

It is seen from FIG. 12 that, relative to the sub-scan magnification βc on the optical axis (scan central portion), the sub-scan magnification is not made uniform throughout the whole scan region.

Specifically, the uniformity of the sub-scan magnification is so pulled down that the sub-scan magnification βs at the scan start side (plus side of the image height) is made small and, on the contrary, the sub-scan magnification βe at the scan end side (minus side of the image height) is made large.

Figure 13:
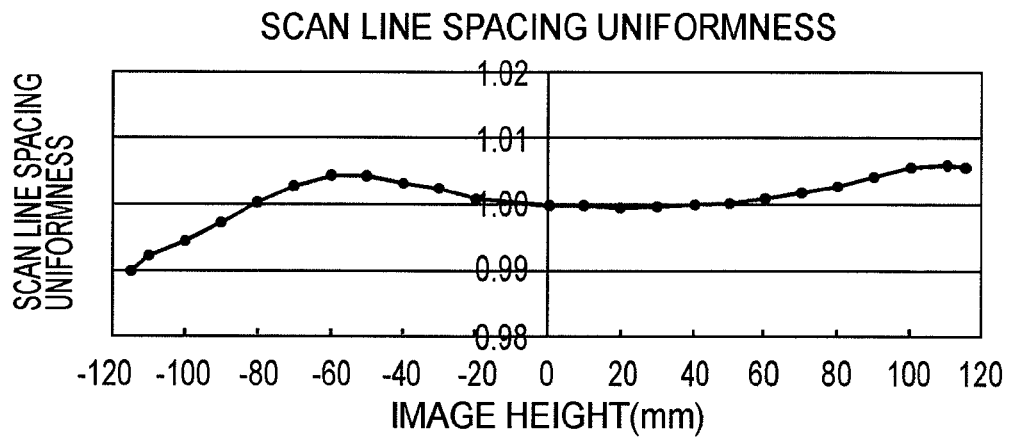
FIG. 13 is a graph showing uniformity of the scanning line spacing in the sub-scan direction, in the first embodiment of the present invention.

FIG. 13 shows the uniformity of the scanning line spacing in the sub-scan direction.

In the present embodiment, the timing is shifted by a predetermined time δT so that the imaging position of the light beam b emitted from the light emitting member 1b is registered with the position where the light beam emitted from the light emitting member 1a is imaged on the photosensitive drum surface 7. FIG. 13 shows the uniformity of the scanning line spacing in the sub-scan direction as the light beam a emitted from the light emitting member 1a and the light beam b emitted from the light emitting member 1b are imaged on the photosensitive drum surface 7 at that time (i.e., when the sub-scan magnification is made constant).

Here, the image resolution in the sub-scan direction was 600 DPI, aiming at 42.33 μm in the scan central portion, and 42.33 μm was normalized to 1.

Figure 14:
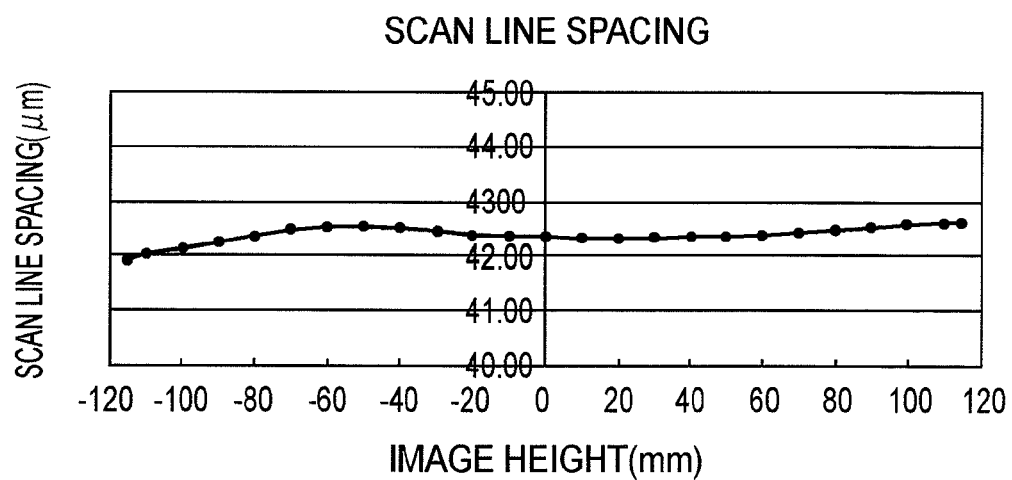
FIG. 14 is a graph showing the practical scanning line spacing in the sub-scan direction, in the first embodiment of the present invention.

FIG. 14 shows the practical scanning line spacing in the sub-scan direction of the present embodiment.

It is seen that, as compared with FIG. 13, the uniformity of the scanning line spacing in the sub-scan direction is better.

Specifically, the dispersion of scanning line spacing is from 41.91 μm to 42.59 μm, which is relatively small dispersion with reference to 42.33 μm of the image resolution 600 DPI. Thus, it is seen that good performance is accomplished.

In a multi-beam optical scanning device which uses a structure of oblique incidence scanning optical system of the present embodiment, if a multi-beam light source is used and the imaging magnification of the fθ lens system 6 in the sub-scan section is made constant through the whole effective scan region, the following problem arises. Namely, the scanning line pitch in the sub-scan direction of plural beams on the scan surface 7 becomes different between the scan start side and the scan end side.

In consideration of this, in the present embodiment, the sub-scan magnification of the fθ lens system 6 within the effective scan region is intentionally made non-uniform as shown in FIG. 11, and specifically the sub-scan magnification βs in the abaxial region at the scan start side (scan start side end portion) of the light beam scanning the scan surface is made small. To the contrary, the sub-scan magnification βe of the fθ lens system 6 in the abaxial region at the scan end side (scan end side end portion) of the light beam scanning the scan surface is made large.

By doing so, the scanning line spacing on the scan surface 7 in the sub-scan direction is assuredly made constant.

Stating this more exactly, as shown in FIG. 7 and FIG. 9, the direction toward the downstream side in the movement direction of the scan surface 7 is defined as a plus direction in the sub-scan direction, while the direction toward the upstream side is defined as a minus direction in the sub-scan direction. In that case, the input optical system LA is so disposed to define a particular angle, not zero, with the minus direction in the sub-scan section, relative to a plane perpendicular to the deflection axis of the deflecting surface.

Furthermore, in that case, the imaging magnification β of the fθ lens system 6 in the sub-scan section is made as follows. That is, the imaging magnification βs at the scan start side end portion is made small as compared with the imaging magnification βc on the optical axis of the fθ lens system 6, while the imaging magnification βe at the scan end side end portion is made large.

By doing so, the scanning line spacing on the scan surface 7 in the sub-scan direction is assuredly made constant.

Namely, in the present embodiment, there is a relation βs<βc<βe.

Hence, for a multi-beam scanning device having a structure of oblique incidence scanning optical system, provision of a multi-beam scanning device which enables uniform scanning line pitch and high precision image output is accomplished. Furthermore, the provision of a compact color LBP or digital color copying machine which enables high speed and high precision image output is accomplished.

Here, a comparative example to the present embodiment where, in a multi-beam optical scanning device using a structure of oblique incidence scanning optical system, the imaging magnification of the fθ lens system 6 in the sub-scan section is made constant throughout the whole effective scan region, will be described.

Table 3 and Table 4 show the characteristics of the optical system of the multi-beam optical scanning device in the comparative example.

TABLE 3

| | | | |
|---|---|---|---|
| Used Reference Wavelength | λ | nm | 790 |
| No. of Light Emission Points | n | | 2 |
| Semiconductor Laser Cover Glass Thickness | dcg | mm | 0.25000 |
| Semiconductor Laser Cover Glass Refractive Index | n0 | | 1.51052 |
| Light Emission Point to Collimator Lens 1st Surface | d0 | mm | 23.35000 |
| Collimator Lens 1st Surface Curvature Radius | R1 | mm | infinite |
| Collimator Lens Thickness | d1 | mm | 3.00000 |
| Collimator Lens Refractive Index | n1 | | 1.76167 |
| Collimator Lens 2nd Surface Curvature Radius | R2 | mm | −19.04573 |
| Collimator Lens 1st Surface to Cylindrical Lens 1st Surface | d2 | mm | 11.00000 |
| Sub-Scan Direction Curvature Radius of Cylindrical Lens 1st Surface | Rs3 | mm | 85.51720 |
| Main-Scan Direction Curvature Radius of Cylindrical Lens 1st Surface | Rm3 | mm | infinite |
| Cylindrical Lens Thickness | d3 | mm | 3.00000 |
| Cylindrical Lens Refractive Index | n3 | | 1.52397 |
| Cylindrical Lens 2nd Surface Curvature Radius | R4 | mm | infinite |
| Cylindrial Lens 2nd Surface to Aperture Stop | d4 | mm | 59.37142 |
| Apertuer Stop to Polygon Deflecting Reflection Surface | d5 | mm | 50.04736 |
| Polygon Deflecting Reflection Surface to 1st f-theta Lens 1st Surface | d6 | mm | 26.00000 |
| 1st f-theta Lens Thickness | d7 | mm | 6.00000 |
| 1st f-theta Lens Refractive Index | n7 | | 1.52397 |
| 1st f-theta Lens 2nd Surface to 2nd f-theta Lens 1st Surface | d8 | mm | 63.00000 |
| 2nd f-theta Lens Thickness | d9 | mm | 4.00000 |
| 2nd f-theta Lens Refractive Index | n9 | | 1.52397 |
| 2nd f-theta Lens 2nd Surface to Scan Surface | d10 | mm | 121.00000 |
| Dust-Proof Glass Thickness | t | mm | 2.00000 |
| Dust-Proof Glass Refractive Index | n10 | | 1.51052 |
| Input Optical System Polygon Incidence Angle | γ | deg | 70.00000 |
| Largest Effective Light Ray Scan Angle | η | deg | 35.04795 |
| Polygon Circumscribed Circle Radius | r | mm | 20.00000 |
| No. of Polygon Surfaces | men | | 6 |
| Stop Diameter | φM × φS(ellpitical) | mm | 4.3 × 1.16 |

TABLE 4 f-theta Lens Shape

| 1st Surface | | 2nd Surface | |
|---|---|---|---|
| 1st f-theta Lens | | | |
| R | −46.80512 | R | −31.56080 |
| k | −1.34744E+01 | k | −1.64469E−01 |
| B4 | −1.48339E−05 | B4u | 1.68445E−06 |
| B6 | 4.12140E−08 | B6u | 2.79391E−09 |
| B8 | −5.75512E−11 | B8u | 1.66183E−11 |
| B10 | 2.12016E−14 | B10u | −2.83587E−14 |
| | | B4l | 1.69318E−06 |
| | | B6l | 2.70936E−09 |
| | | B8l | 1.70296E−11 |
| | | B10l | −2.89644E−14 |
| r | 1000.00000 | r | 1000.00000 |
| 2nd f-theta Lens | | | |
| R | −707.80044 | R | 966.60036 |
| k | 0.00000E+00 | k | 1.89336E+02 |
| B4 | 0.00000E+00 | B4 | −4.98843E−07 |
| B6 | 0.00000E+00 | B6 | 4.67046E−11 |
| B8 | 0.00000E+00 | B8 | −2.22312E−15 |
| B10 | 0.00000E+00 | B10 | −3.43926E−19 |
| r | 188.04800 | r | −32.75990 |
| | | D2u | 1.07209E−04 |
| | | D4u | −2.15605E−08 |
| | | D6u | 3.87858E−12 |
| | | D8u | −2.94439E−16 |
| | | D10u | 0.00000E+00 |

TABLE 4-continued f-theta Lens Shape

| 1st Surface | | 2nd Surface | |
|---|---|---|---|
| | | S2l | 1.07290E−04 |
| | | D4l | −2.41989E−08 |
| | | D6l | 4.52974E−12 |
| | | D8l | −3.33971E−16 |
| | | D10l | 0.00000E+00 |

In the comparative example, the equations which specify the shapes of the lens surfaces of the first and second fθ lenses 61 and 62, constituting the fθ lens system 6, in the main-scan section as well as the equation which specifies the shape of the lens surface of the second fθ lens 62 at the scan surface 7 side in the sub-scan section, are the same as those having been described with reference to the first embodiment of the present invention.

It is to be noted that the sectional views of the comparative example in the main-scan direction and the sub-scan direction show similar disposition as those of the sectional views of the first embodiment illustrated in FIGS. 1-4, and the two light emitting members 1*a* and 1*b* have similar disposition of the first embodiment shown in FIG. 5.

Figure 15:
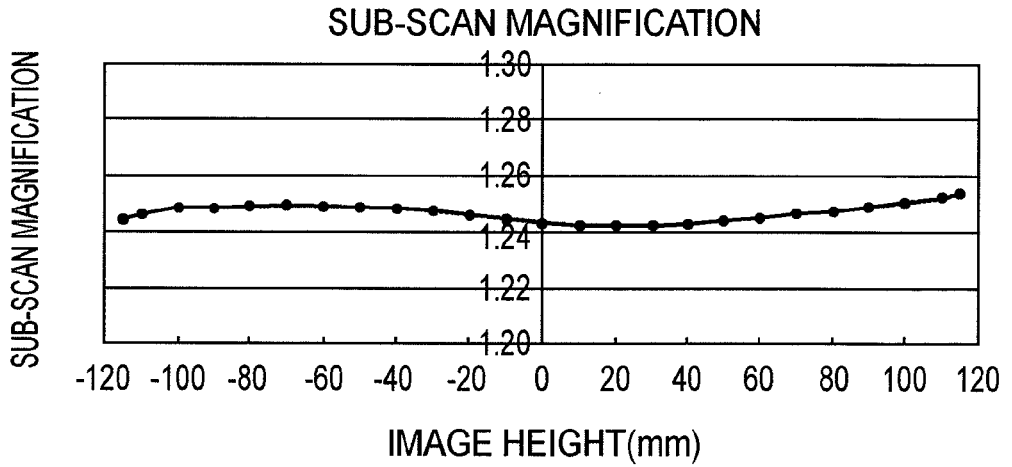
FIG. 15 is a graph showing the sub-scan magnification of the fθ lens between the deflecting surface and the scan surface in a comparative example.

FIG. 15 shows the sub-scan magnification of the fθ lens system 6, between the deflecting surface 5*a* and the scan surface 7 in this comparative example.

In FIG. 15, the axis of abscissas denotes the scan image height (mm) on the scan surface 7. The plus side of the image height corresponds to the scan start side (upper side of FIG. 2 and the scan start side in FIG. 10), while the minus side of the image height corresponds to the scan end side (lower side of FIG. 2 and the scan end side in FIG. 10).

It is seen from FIG. 15 that, as compared with FIG. 11, the sub-scan magnification is designed uniformly in the effective scan region.

Figure 16:
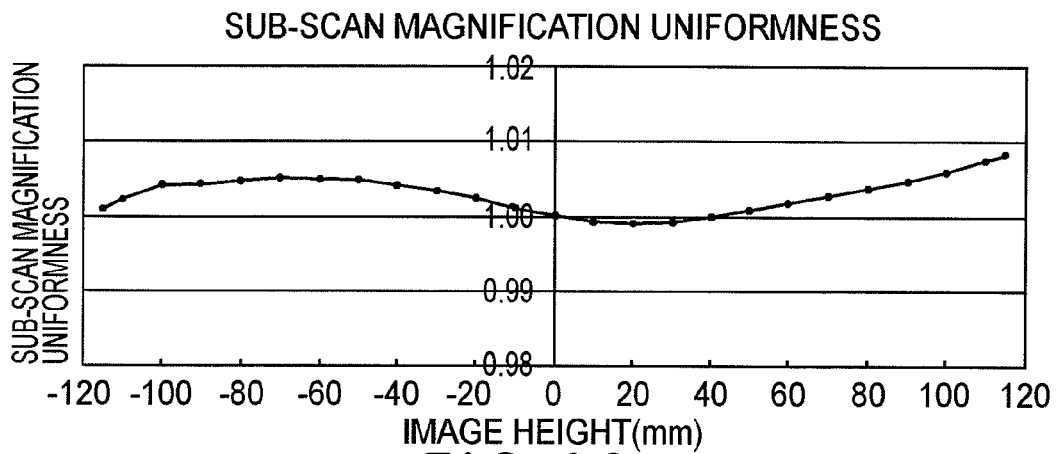
FIG. 16 is a graph showing uniformity of the sub-scan magnification in FIG. 15.

FIG. 16 illustrates the uniformity of the sub-scan magnification, with the sub-scan magnification $\beta c$ at the scan central portion in FIG. 15 normalized to 1.

It is seen from FIG. 16 that, as compared with FIG. 12, good uniformity of sub-scan magnification is assured in the effective scan region.

Figure 17:
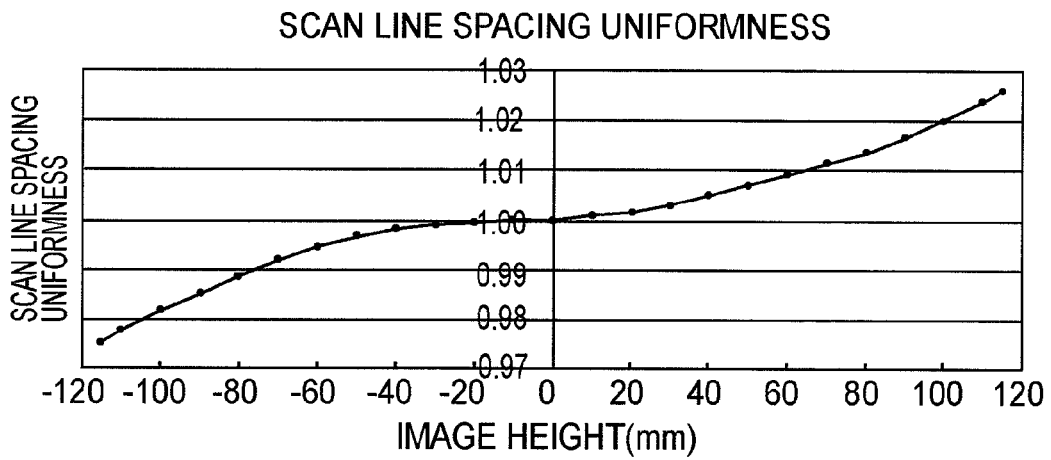
FIG. 17 is a graph showing the uniformity of the scanning line spacing in the sub-scan direction, in the comparative example.

FIG. 17 shows the uniformity of the scanning line spacing in the sub-scan direction, in this comparative example.

In the comparative example, the timing is shifted by a predetermined time $\delta T$ so that the imaging position of the light beam b emitted from the light emitting member $1b$ is registered with the position where the light beam a emitted from the light emitting member $1a$ is imaged on the photosensitive drum surface 7. FIG. 17 shows the uniformity of the scanning line spacing in the sub-scan direction as the light beam a emitted from the light emitting member $1a$ and the light beam b emitted from the light emitting member $1b$ are imaged on the photosensitive drum surface at that time.

Here, the image resolution in the sub-scan direction was 600 DPI, aiming at 42.33 µm in the scan central portion, and 42.33 µm was normalized to 1.

It is seen that, as compared with the uniformity of the sub-scan magnification in FIG. 16, the uniformity of the scanning line spacing in the sub-scan direction in FIG. 17 is pulled down largely.

Figure 18:
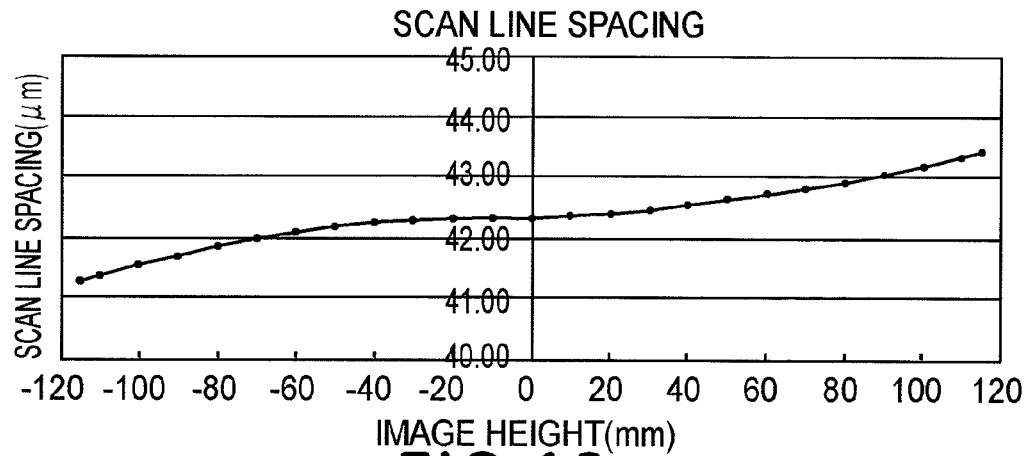
FIG. 18 is a graph showing the practical scanning line spacing in the sub-scan direction, in the comparative example.

FIG. 18 shows the practical scanning line spacing in the sub-scan direction of the comparative example.

The specific dispersion of the scanning line spacing was from 41.27 µm to 43.42 µm, i.e., a large dispersion with reference to 42.33 µm of the image resolution 600 DPI.

In the first embodiment of the present invention described hereinbefore, the dispersion was only P-P0.68 µm, varying from 41.91 µm to 42.59 µm. Thus, it is seen that the dispersion was increased around 3 times.

From this comparative example, it is seen that, if in an oblique incidence scanning optical system a multi-beam light source is used and if the imaging magnification of the fθ lens system in the sub-scan section is designed to be constant throughout the whole effective scan region, the following problem arises. Namely, the scanning line pitch of plural beams in the sub-scan direction upon the scan surface becomes different between the scan start side and the scan end side.

Thus, if a multi-beam light source is used as in the present embodiment, the sub-scan magnification of the fθ lens system should be intentionally made non-uniform in the effective scan region as shown in FIG. 11, and specifically the sub-scan magnification As at the scan start side end portion should be made small while the sub-scan magnification $\beta e$ at the scan end side end portion should be made large. It is seen that, by doing so, a significantly large advantageous result of making constant the scanning line spacing on the scan surface 7 in the sub-scan direction is obtainable.

It should be noted that, although the present embodiment has been described with reference to an example which uses a monolithic multi-beam semiconductor laser comprised of a plurality of light emitting members (specifically, two light emitting members), the number of light emitting members is not limited to 2. Similar advantageous results are obtainable with the use of two or more light emitting members.

Furthermore, although the present embodiment has been described with reference to an example which uses a monolithic multi-beam semiconductor laser comprised of a plurality of light emitting members (specifically, two light emitting members), the present invention is not limited to this. A plurality of single-beam semiconductor lasers each having one light emitting member may be used, and the beams may be combined by using any known beam combining means. When the light beams are emitted in the same direction, similar advantageous results can be obtained, as a matter of course.

Furthermore, a plurality of monolithic multi-beam semiconductor lasers (light source members) each being comprised of a plurality of light emitting members may be used, and the light beams may be synthesized by using any known beam combining means. When the light beams are emitted in the same direction, similar advantageous results can be obtained.

Embodiment 2

A second embodiment of the present invention will be explained below.

This embodiment differs from the first embodiment described hereinbefore in that the movement direction of the scan surface 7 is set in a reverse direction to the first embodiment. The structure and optical function of the remaining portion are similar to those of the first embodiment, and similar advantageous results are obtained.

In the second embodiment as well, the light beam being incident on the deflecting surface of the rotary polygonal mirror 5 are incident from an oblique direction in the sub-scan section relative to a plane perpendicular to the rotational axis of the deflecting surface of the rotary polygonal mirror 5.

It is to be noted that the sectional views of the present embodiment in the main-scan direction and the sub-scan direction show similar disposition as those of the sectional views of the first embodiment illustrated in FIGS. 1-4.

Figure 19:
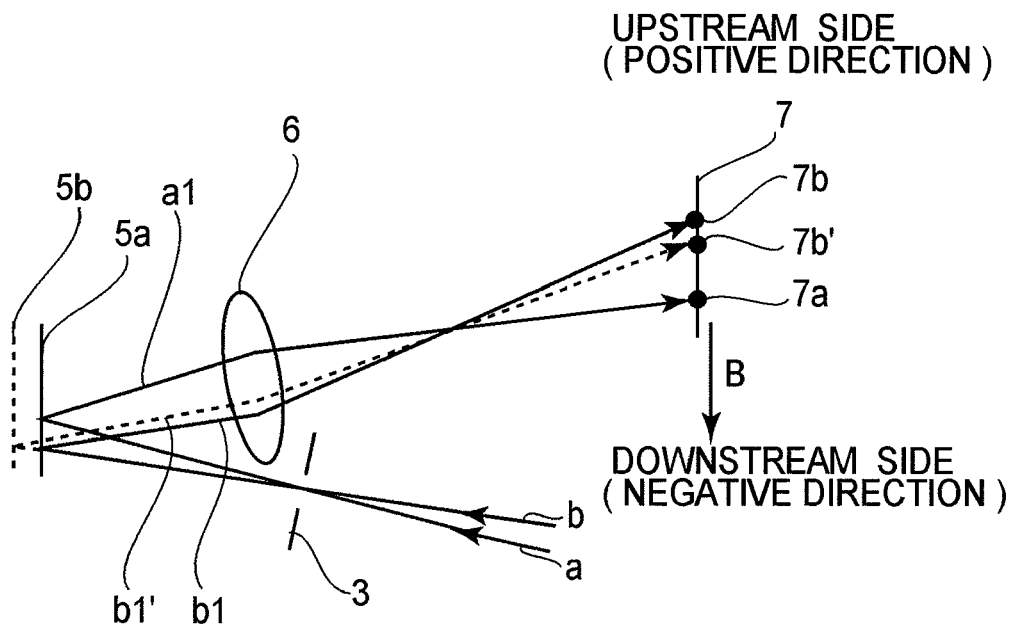
FIG. 19 is a sub-scan sectional view illustrating how two light beams are reflected by the deflecting surface, in a second embodiment of the present invention.

FIG. 19 is a sub-scan sectional view illustrating how the principal rays of the two light beams a and b are reflected by the deflecting surface $5a$ when the scan start side of the second embodiment (upper side as viewed in FIG. 2) is being scanned. In FIG. 19, the components corresponding to those of FIG. 7 are denoted by similar reference numerals.

Here, the scan surface 7 is being moved in the direction of an arrow B from the above to below in FIG. 19, which is opposite to that in the first embodiment, and the scan surface 7 is first scanned along a line by the preceding light beam a and, thereafter, a zone of the scan surface just above the line scanned by the preceding light beam a is scanned along a line by the subsequent light beam b.

Hence, the vertical relationship of the two light beams a and b in the sub-scan direction emitted from the two light emitting members $1a$ and $1b$ is set reversely to the first embodiment.

In FIG. 19, the direction toward the upstream side of the movement direction (upward in FIG. 2) is the plus direction, while the direction toward the downstream side of the movement direction (downward in FIG. 2) is the minus direction.

With regard to the spacing between the imaging positions $7a$ and $7b$ on the scan surface 7, if the resolution in the sub-scan direction is 600 DPI, generally the spacing will be $$25.4/600=0.04233 \text{ mm}=42.33 \text{ µm}$$

This is determined by the resolution in the sub-scan direction.

However, if the timing is shifted by a predetermined time δT so that the imaging position of the subsequent light beam b is registered with the position where the light beam a which is preceding in the main-scan direction is imaged on the scan surface 7, the light beam b reflected by the deflecting surface 5b (shown by the broken line) at that time will be as follows. Namely, since the deflecting surface 5b at that time is deviated in the direction away from the fθ lens system 6, the light beam b is reflected at a position on the deflecting surface 5a which position is deviated upwardly in the sub-scan direction, and it is reflected in the direction toward b1'.

As a result, on the scan surface 7, the light beam b is imaged at a position 7b' which is deviated downwardly in sub-scan direction relative to the position 7b.

Figure 20:
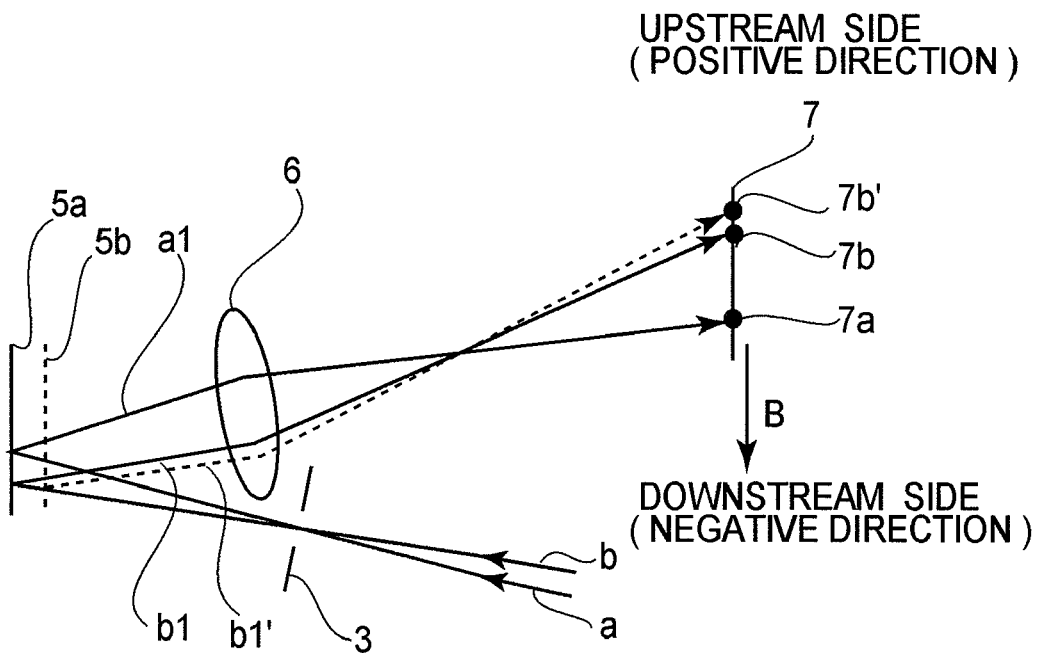
FIG. 20 is a sub-scan sectional view illustrating how two light beams are reflected by the deflecting surface, in a second embodiment of the present invention.

FIG. 20 is a sub-scan sectional view illustrating how the principal rays of the two light beams a and b are reflected by the deflecting surface 5a when the scan end side (lower side as viewed in FIG. 2) is being scanned in the second embodiment. In FIG. 20, the components corresponding to those of FIG. 9 are denoted by similar reference numerals.

In FIG. 20, like FIG. 19, the scan surface 7 is being moved in the direction of an arrow B from the above to below in FIG. 20, and the scan surface 7 is first scanned along a line by the preceding light beam a and, thereafter, a zone of the scan surface just above the line scanned by the preceding light beam a is scanned along a line by the subsequent light beam b.

Hence, the vertical relationship of the two light beams a and b in the sub-scan direction emitted from the two light emitting members 1a and 1b is set reversely to the first embodiment.

In FIG. 20, the direction toward the upstream side of the movement direction (upward in FIG. 2) is the plus direction, while the direction toward the downstream side of the movement direction (downward in FIG. 2) is the minus direction.

With regard to the spacing between the imaging positions 7a and 7b on the scan surface 7, if the resolution in the sub-scan direction is 600 DPI, generally the spacing will be 25.4/600=0.04233 mm=42.33 μm This is determined by the resolution in the sub-scan direction.

However, if the timing is shifted by a predetermined time δT so that the imaging position of the subsequent light beam b is registered with the position where the light beam a which is preceding in the main-scan direction is imaged on the scan surface 7, the light beam b reflected by the deflecting surface 5b (shown by the broken line) at that time will be as follows. Namely, since the deflecting surface 5b at that time is deviated in the direction approaching the fθ lens system 6, the light beam b is reflected at a position on the deflecting surface 5a which position is deviated downwardly in the sub-scan direction, and it is reflected in the direction toward b1'.

As a result, on the scan surface 7, the light beam b is imaged at a position 7b' which is deviated upwardly in sub-scan direction relative to the position 7b.

Figure 21:
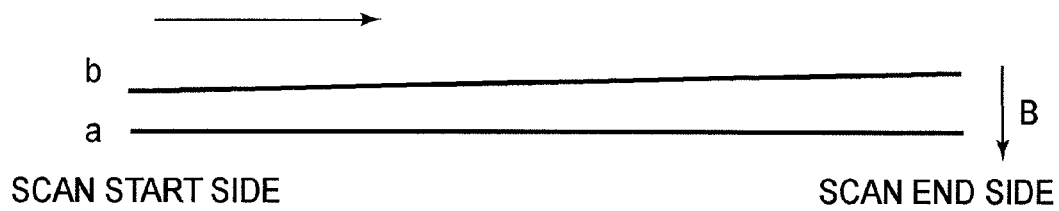
FIG. 21 is a diagram showing a change of spacing of the two scanning lines on the scan surface, in the second embodiment of the present invention.

This leads to that, if the imaging magnification in the sub-scan section of the fθ lens system 6 is constant throughout the whole effective scan region, pitch irregularity occurs as shown in FIG. 21. Namely, the spacing of the scanning lines on the scan surface 7 defined by the two light beam a and b emitted from the two light emitting members 1a and 1b becomes narrower than the predetermined spacing at the scan start side, whereas it becomes wider at the scan end side, thus causing pitch unevenness.

As compared therewith, in the present embodiment, the imaging magnification of the fθ lens system 6 in the sub-scan section is not held constant throughout the whole effective scan region, but rather the sub-scan magnification βs at the scan start side end portion is made large and, to the contrary, the sub-scan magnification βe at the scan end side end portion is made small.

Namely, in the present embodiment, there is a relation βe<βs.

In FIG. 21, the scan surface 7 moves in the direction of an arrow B from the above to below as viewed in the drawing.

Table 5 and Table 6 show the characteristics of the optical system of the multi-beam optical scanning device in the second embodiment of the present invention.

TABLE 5

| Used Reference Wavelength | λ | nm | 790 |
|---|---|---|---|
| No. of Light Emission Points | n | | 2 |
| Semiconductor Laser Cover Glass Thickness | dcg | mm | 0.25000 |
| Semiconductor Laser Cover Glass Refractive Index | n0 | | 1.51052 |
| Light Emission Point to Collimator Lens 1st Surface | d0 | mm | 23.35000 |
| Collimator Lens 1st Surface Curvature Radius | R1 | mm | infinite |
| Collimator Lens Thickness | d1 | mm | 3.00000 |
| Collimator Lens Refractive Index | n1 | | 1.76167 |
| Collimator Lens 2nd Surface Curvature Radius | R2 | mm | −19.04573 |
| Collimator Lens 1st Surface to Cylindrical Lens 1st Surface | d2 | mm | 11.00000 |
| Sub-Scan Direction Curvature Radius of Cylindrical Lens 1st Surface | Rs3 | mm | 85.51720 |
| Main-Scan Direction Curvature Radius of Cylindrical Lens 1st Surface | Rm3 | mm | infinite |
| Cylindrical Lens Thickness | d3 | mm | 3.00000 |
| Cylindrical Lens Refractive Index | n3 | | 1.52397 |
| Cylindrical Lens 2nd Surface Curvature Radius | R4 | mm | infinite |
| Cylindrial Lens 2nd Surface to Aperture Stop | d4 | mm | 59.37142 |
| Apertuer Stop to Polygon Deflecting Reflection Surface | d5 | mm | 50.04736 |
| Polygon Deflecting Reflection Surface to 1st f-theta Lens 1st Surface | d6 | mm | 26.00000 |
| 1st f-theta Lens Thickness | d7 | mm | 6.00000 |

TABLE 5-continued

| | | | |
|---|---|---|---|
| 1st f-theta Lens Refractive Index | n7 | | 1.52397 |
| 1st f-theta Lens 2nd Surface to 2nd f-theta Lens 1st Surface | d8 | mm | 63.00000 |
| 2nd f-theta Lens Thickness | d9 | mm | 4.00000 |
| 2nd f-theta Lens Refractive Index | n9 | | 1.52397 |
| 2nd f-theta Lens 2nd Surface to Scan Surface | d10 | mm | 121.00000 |
| Dust-Proof Glass Thickness | t | mm | 2.00000 |
| Dust-Proof Glass Refractive Index | n10 | | 1.51052 |
| Input Optical System Polygon Incidence Angle | γ | deg | 70.00000 |
| Largest Effective Light Ray Scan Angle | η | deg | 35.04795 |
| Polygon Circumscribed Circle Radius | r | mm | 20.00000 |
| No. of Polygon Surfaces | men | | 6 |
| Stop Diameter | φM × φS(ellpitical) | mm | 4.3 × 1.16 |

TABLE 6 f-theta Lens Shape

| 1st Surface | | 2nd Surface | |
|---|---|---|---|
| 1st f-theta Lens | | | |
| R | −46.80512 | R | −31.56080 |
| k | −1.34744E+01 | k | −1.64469E−01 |
| B4 | −1.48339E−05 | B4u | 1.68445E−06 |
| B6 | 4.12140E−08 | B6u | 2.79391E−09 |
| B8 | −5.75512E−11 | B8u | 1.66183E−11 |
| B10 | 2.12016E−14 | B10u | −2.83587E−14 |
| | | B4l | 1.69318E−06 |
| | | B6l | 2.70936E−09 |
| | | B8l | 1.70296E−11 |
| | | B10l | −2.89644E−14 |
| r | 1000.00000 | r | 1000.00000 |
| 2nd f-theta Lens | | | |
| R | −707.80044 | R | 966.60036 |
| k | 0.00000E+00 | k | 1.89336E+02 |
| B4 | 0.00000E+00 | B4 | −4.98843E−07 |
| B6 | 0.00000E+00 | B6 | 4.67046E−11 |
| B8 | 0.00000E+00 | B8 | −2.22312E−15 |
| B10 | 0.00000E+00 | B10 | −3.43926E−19 |
| r | 188.04800 | r | −32.75990 |
| D2u | −2.82417E−04 | D2u | 1.51299E−04 |
| D4u | 1.74144E−08 | D4u | −2.56514E−09 |
| D6u | 2.96864E−12 | D6u | 6.96742E−12 |
| D8u | −2.85049E−19 | D8u | 1.54686E−15 |
| D10u | 0.00000E+00 | D10u | 0.00000E+00 |
| S2l | 1.03801E−03 | S2l | −5.38022E−05 |
| D4l | 5.58173E−07 | D4l | 4.69657E−08 |
| D6l | 1.37295E−10 | D6l | −1.40147E−11 |
| D8l | 3.08732E−20 | D8l | 1.61074E−15 |
| D10l | 0.00000E+00 | D10l | 0.00000E+00 |

It is to be noted here that the equations which specify the shapes of the lens surfaces of the first and second fθ lenses 61 and 62, constituting the fθ lens system 6, in the main-scan section as well as the equation which specifies the shape of the lens surface of the second fθ lens 62 at the scan surface 7 side in the sub-scan section, are the same as those having been described with reference to the first embodiment of the present invention.

Figure 22:
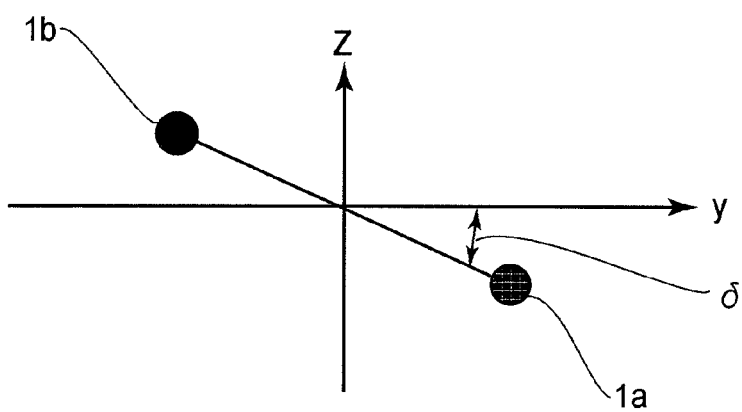
FIG. 22 is a diagram illustrating the disposition of two light emitting members in the second embodiment of the present invention.

Furthermore, the disposition of the two light emitting members 1a and 1b is reversed upside down in the sub-scan direction relative to first embodiment described hereinbefore, and FIG. 22 shows the disposition.

Figure 23:
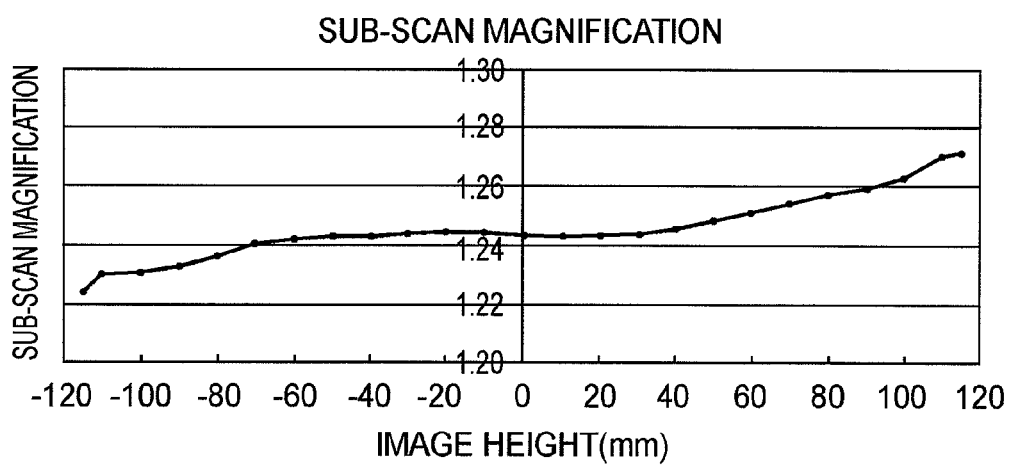
FIG. 23 is a graph showing the sub-scan magnification of the fθ lens between the deflecting surface and the scan surface in the second embodiment of the present invention.

FIG. 23 shows the sub-scan magnification of the fθ lens system 6, between the deflecting surface 5a and the scan surface 7 in the second embodiment of the present invention.

In FIG. 23, the axis of abscissas denotes the scan image height (mm) on the scan surface 7. The plus side of the image height corresponds to the scan start side (upper side of FIG. 2 and the scan start side in FIG. 21), while the minus side of the image height corresponds to the scan end side (lower side of FIG. 2 and the scan end side in FIG. 21).

As seen from FIG. 23, relative to the sub-scan magnification βc at the scan central portion, the sub-scan magnification βs at the scan start side end portion (plus side of the image height) is made large, whereas the sub-scan magnification βe at the scan end side end portion (minus side of the image height) is made small.

Namely, in present embodiment, there is a relation βe<βc<βs.

Figure 24:
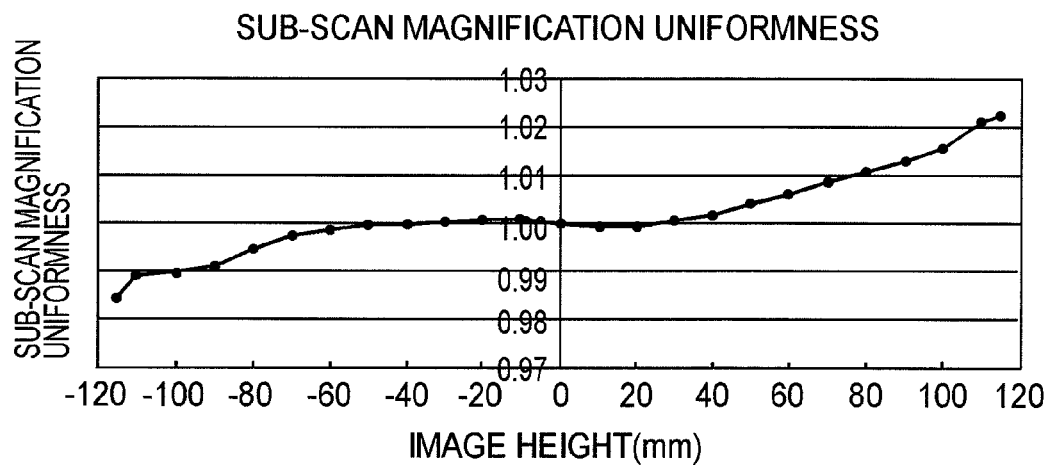
FIG. 24 is a graph showing uniformity of the sub-scan magnification in FIG. 23.

FIG. 24 illustrates the uniformity of the sub-scan magnification, with the sub-scan magnification at the scan central portion in FIG. 23 normalized to 1.

It is seen from FIG. 24 that, relative to the sub-scan magnification βc at the scan central portion, the sub-scan magnification is not made uniform throughout the whole scan region. Specifically, the uniformity of the sub-scan magnification is so pulled down that the sub-scan magnification βs at the scan start side (plus side of the image height) is made large and, on the contrary, the sub-scan magnification βe at the scan end side (minus side of the image height) is made small.

Figure 25:
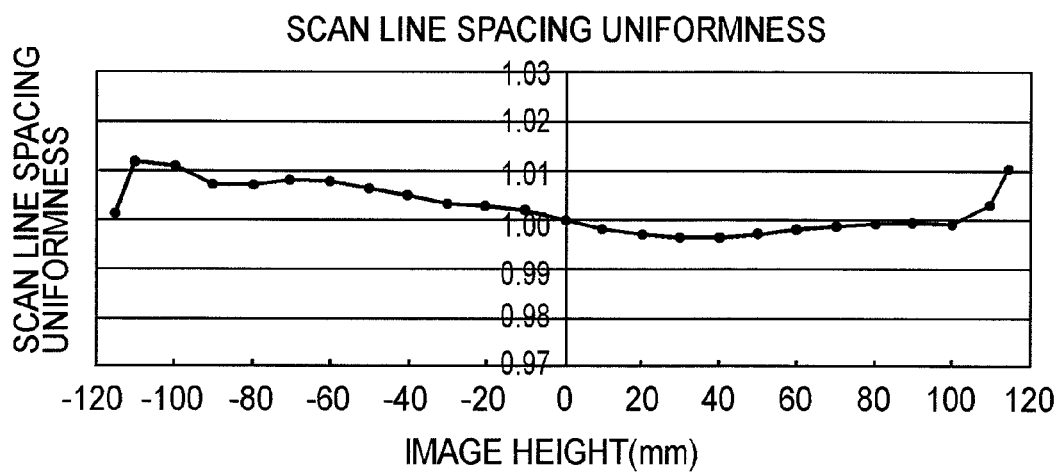
FIG. 25 is a graph showing the uniformity of the scanning line spacing in the sub-scan direction, in the second embodiment of the present invention.

FIG. 25 shows the uniformity of the scanning line spacing in the sub-scan direction.

In the present embodiment, the timing is shifted by a predetermined time δT so that the imaging position of the light beam b emitted from the light emitting member 1b is registered with the position where the light beam emitted from the light emitting member 1a is imaged on the photosensitive drum surface 7. FIG. 25 shows the uniformity of the scanning line spacing in the sub-scan direction as the light beam a emitted from the light emitting member 1a and the light beam b emitted from the light emitting member 1b are imaged on the photosensitive drum surface 7 at that time (i.e., when the sub-scan magnification is made constant).

Here, the image resolution in the sub-scan direction was 600 DPI, aiming at 42.33 μm in the scan central portion, and 42.33 μm was normalized to 1.

It is seen that, as compared with FIG. 24, the uniformity of the scanning line spacing in the sub-scan direction in FIG. 25 is better.

Figure 26:
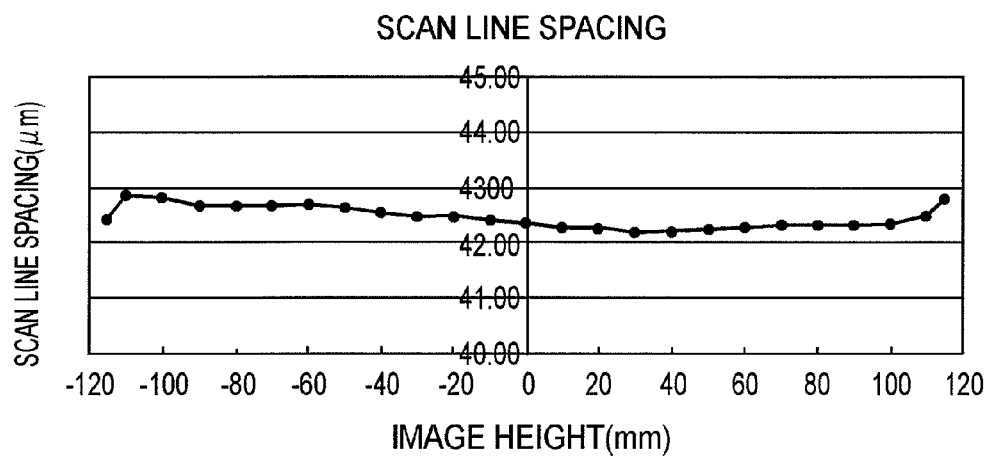
FIG. 26 is a graph showing the practical scanning line spacing in the sub-scan direction, in the second embodiment of the present invention.

FIG. 26 shows the practical scanning line spacing in the sub-scan direction of the present embodiment.

Specifically, the dispersion of scanning line spacing is from 42.20 μm to 42.85 μm, which is relatively small dispersion with reference to 42.33 μm of the image resolution 600 DPI. Thus, it is seen that good optical performance is accomplished.

In a multi-beam optical scanning device which uses a structure of oblique incidence scanning optical system of the present embodiment, if the imaging magnification of the fθ lens system 6 in the sub-scan section is made constant through the whole effective scan region, the following problem arises. Namely, the scanning line pitch in the sub-scan direction of plural beams on the scan surface 7 becomes different between the scan start side and the scan end side.

In consideration of this, in the present embodiment, the sub-scan magnification of the fθ lens system 6 within the effective scan region is intentionally made non-uniform as shown in FIG. 23, and specifically the sub-scan magnification βs at the scan start side end portion is made large while the sub-scan magnification βe at the scan end side end portion is made small. By doing so, the scanning line spacing on the scan surface 7 in the sub-scan direction is assuredly made constant.

Stating this more exactly, as shown in FIG. 19 and FIG. 20, the direction toward the upstream side in the movement direction of the scan surface 7 is defined as a plus direction in the sub-scan direction, while the direction toward the downstream side is defined as a minus direction in the sub-scan direction.

In that case, the input optical system LA is so disposed to define a particular angle, not zero, with the minus direction in the sub-scan section, relative to a plane perpendicular to the deflection axis of the deflecting surface.

Furthermore, in that case, the imaging magnification β of the fθ lens system 6 in the sub-scan section, between the deflecting surface of the rotary polygonal mirror 5 and the scan surface 7, is made as follows. That is, the imaging magnification βs at the scan start side end portion is made large as compared with the imaging magnification βc on the optical axis of the fθ lens system 6, while the imaging magnification βe at the scan end side end portion is made small.

By doing so, the scanning line spacing on the scan surface 7 in the sub-scan direction is assuredly made constant.

Namely, in the present embodiment, there is a relation βe<βc<βs.

Hence, for a multi-beam scanning device having a structure of oblique incidence scanning optical system, provision of a multi-beam scanning device which enables uniform scanning line pitch and high precision image output is accomplished. Furthermore, the provision of a compact color LBP or digital color copying machine which enables high speed and high precision image output is accomplished.

Embodiment 3

Figure 27:
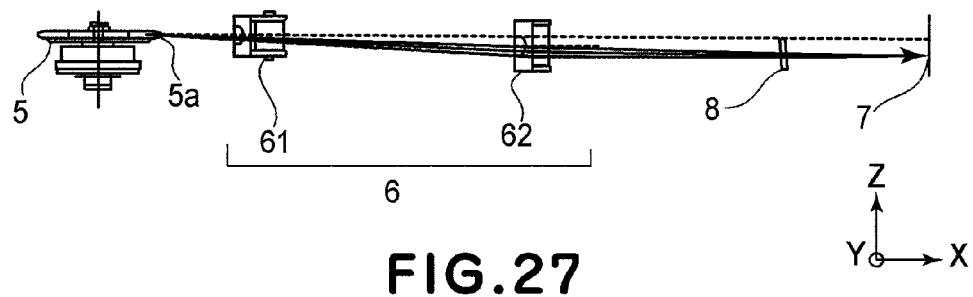
FIG. 27 is a section view in the sub-scan direction of an imaging optical system, from the deflecting surface to the scan surface, in a third embodiment of the present invention.
Figure 28:
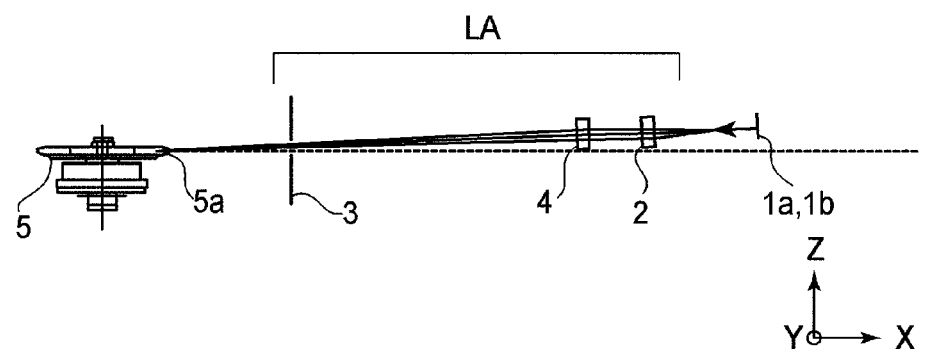
FIG. 28 is a section view in the sub-scan direction of an input optical system, from the light emitting member to the deflecting surface, in the third embodiment of the present invention.

FIG. 27 and FIG. 28 are sub-scan sectional views of a third embodiment of the present invention. Specifically, FIG. 27 is a sub-scan sectional view of an imaging optical system 6, from the deflecting surface 5a of the rotary polygonal mirror 5 to the scan surface 7, wherein deflection by the reflecting mirror B is omitted in illustration. FIG. 28 is a sub-scan sectional view of an input optical system LA, from the two light emitting members (light emission points) 1a and 1b to the deflecting surface 5a, and it illustrates that two light beams emitted from the two light emitting members 1a and 1b are incident on the deflecting surface 5a of the rotary polygonal mirror 5 in the sub-scan direction from obliquely below. In FIG. 27 and FIG. 28, the components corresponding to those of FIG. 7 and FIG. 4 are denoted by similar reference numerals.

The present embodiment differs from the abovementioned first embodiment in that the two light beams emitted from the two light emitting members 1a and 1b are incident from obliquely above in the sub-scan direction, while defining an angle of 2.5 deg. with the plane perpendicular to the pivotal axis of the deflecting surface 5a. The structure and optical function of the remaining portion are similar to those of the first embodiment, and similar advantageous results are obtained.

More specifically, in the present embodiment, the two light beams a and b emitted from the two light emitting members 1a and 1b are incident from obliquely above in the sub-scan direction, as contrast to the first embodiment, while defining an angle of 2.5 deg. with the plane perpendicular to the pivotal axis of the deflecting surface 5a.

It should be noted that the movement direction of the scan surface 7 in this embodiment is the same as the first embodiment.

Furthermore, the sectional view of the present embodiment in the main-scan direction has similar disposition as that of the sectional view of the first embodiment illustrated in FIG. 2.

Furthermore, the two light emitting members 1a and 1b have similar disposition as the first embodiment shown in FIG. 5.

Figure 29:
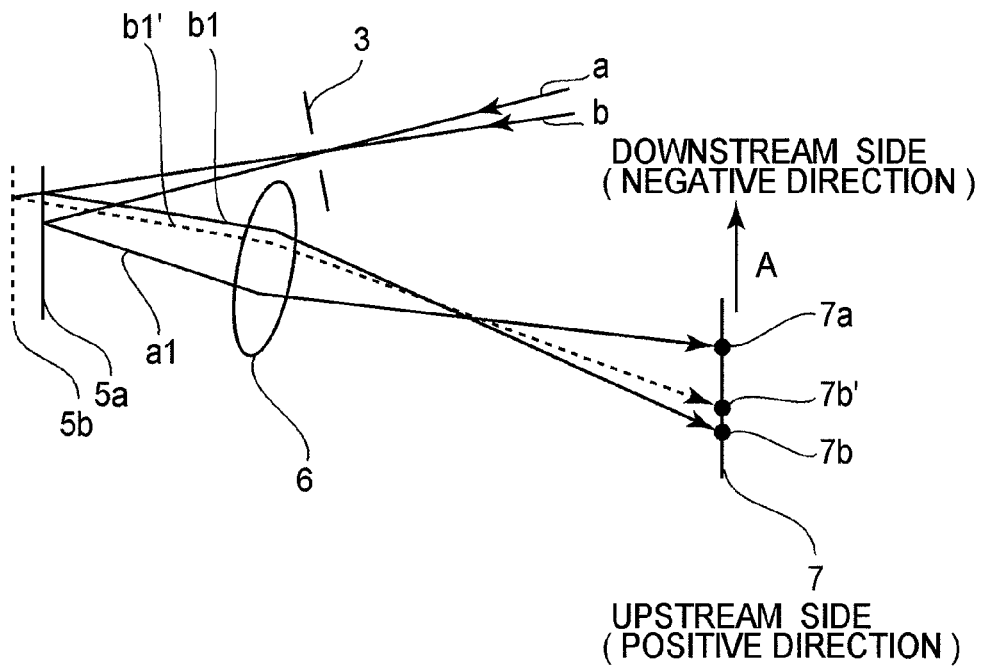
FIG. 29 is a sub-scan sectional view illustrating how two light beams are reflected by the deflecting surface, in the third embodiment of the present invention.

FIG. 29 is a sub-scan sectional view illustrating how the principal rays of the two light beams a and b are reflected by the deflecting surface 5a when the scan start side (upper side as viewed in FIG. 2) is being scanned in the third embodiment of the present invention. In FIG. 29, the components corresponding to those of FIG. 7 are denoted by similar reference numerals.

Here, the scan surface 7 is being moved in the direction of an arrow A from below to above in FIG. 29, and the scan surface 7 is first scanned along a line by the preceding light beam a and, thereafter, a zone of the scan surface just below the line scanned by the preceding light beam a is scanned along a line by the subsequent light beam b.

In FIG. 29, the direction toward the upstream side of the movement direction (upward in FIG. 2) is the plus direction, while the direction toward the downstream side of the movement direction (downward in FIG. 2) is the minus direction.

With regard to the spacing between the imaging positions 7a and 7b on the scan surface 7, if the resolution in the sub-scan direction is 600 DPI, generally the spacing will be $$25.4/600 = 0.04233 \text{ mm} = 42.33 \text{ μm}$$

This is determined by the resolution in the sub-scan direction.

However, if the timing is shifted by a predetermined time δT so that the imaging position of the subsequent light beam b is registered with the position where the light beam a which is preceding in the main-scan direction is imaged on the scan surface 7, the light beam b reflected by the deflecting surface 5b (shown by the broken line) at that time will be as follows. Namely, since the deflecting surface 5b at that time is deviated in the direction away from the fθ lens system 6, the light beam b is reflected at a position on the deflecting surface 5a which position is deviated downwardly in the sub-scan direction, and it is reflected in the direction toward b1'.

As a result, on the scan surface 7, the light beam b is imaged at a position 7b' which is deviated upwardly in sub-scan direction relative to the position 7b.

Figure 30:
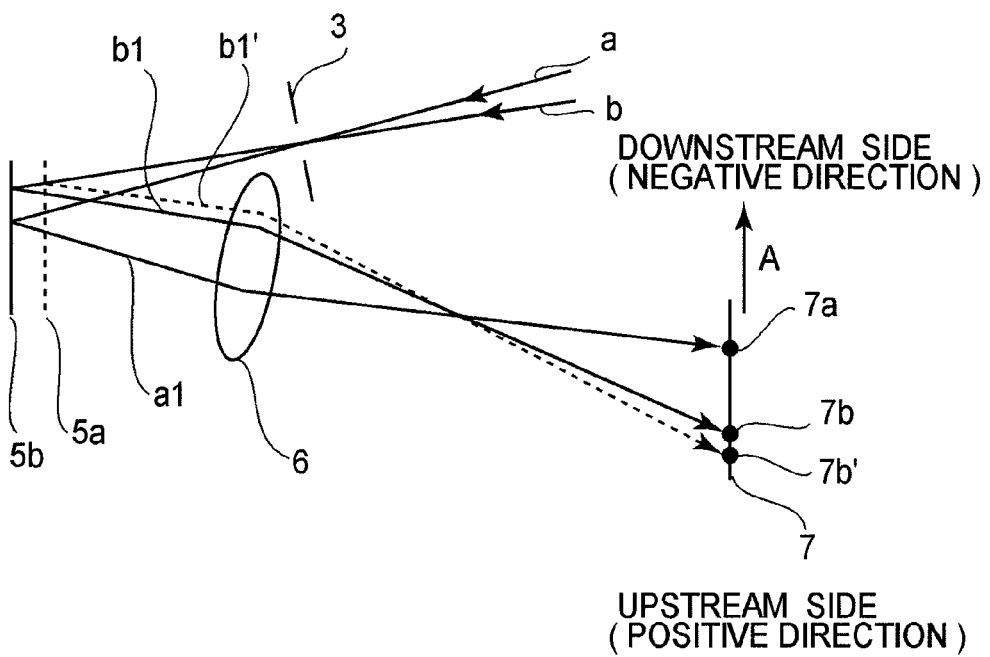
FIG. 30 is a sub-scan sectional view illustrating how two light beams are reflected by the deflecting surface, in the third embodiment of the present invention.

FIG. 30 is a sub-scan sectional view illustrating how the principal rays of the two light beams a and b are reflected by the deflecting surface 5a when the scan end side (lower side as viewed in FIG. 2) is being scanned in the third embodiment of the present invention. In FIG. 30, the components corresponding to those of FIG. 9 are denoted by similar reference numerals.

Here, the scan surface 7 is being moved in the direction of an arrow A from below to above in FIG. 30, and the scan surface 7 is first scanned along a line by the preceding light beam a and, thereafter, a zone of the scan surface just below the line scanned by the preceding light beam a is scanned along a line by the subsequent light beam b.

In FIG. 30, the direction toward the upstream side of the movement direction (upward in FIG. 2) is the plus direction, while the direction toward the downstream side of the movement direction (downward in FIG. 2) is the minus direction.

With regard to the spacing between the imaging positions 7a and 7b on the scan surface 7, if the resolution in the sub-scan direction is 600 DPI, generally the spacing will be 25.4/600=0.04233 mm=42.33 µm This is determined by the resolution in the sub-scan direction.

However, if the timing is shifted by a predetermined time δT so that the imaging position of the subsequent light beam b is registered with the position where the light beam a which is preceding in the main-scan direction is imaged on the scan surface 7, the light beam b reflected by the deflecting surface 5b (shown by the broken line) at that time will be as follows. Namely, since the deflecting surface 5b at that time is deviated in the direction approaching the fθ lens system 6, the light beam b is reflected at a position on the deflecting surface 5a which position is deviated upwardly in the sub-scan direction, and it is reflected in the direction toward b1'.

As a result, on the scan surface 7, the light beam b is imaged at a position 7b' which is deviated downwardly in sub-scan direction relative to the position 7b.

Figure 31:
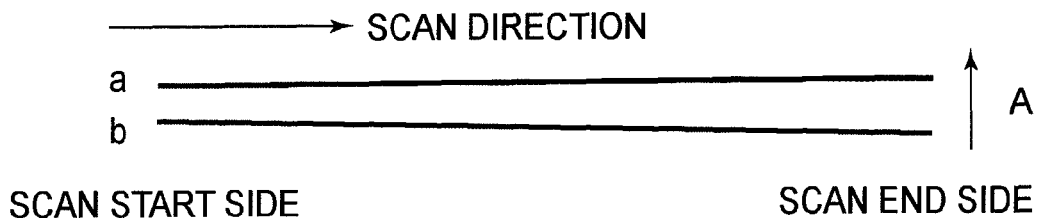
FIG. 31 is a diagram showing a change of spacing of the two scanning lines on the scan surface, in the third embodiment of the present invention.

This leads to that, if the imaging magnification in the sub-scan section of the fθ lens system 6 is constant throughout the whole effective scan region, pitch irregularity occurs as shown in FIG. 31. Namely, the spacing of the scanning lines on the scan surface 7 defined by the two light beam a and b emitted from the two light emitting members 1a and 1b becomes narrower than the predetermined spacing at the scan start side, whereas it becomes wider at the scan end side, thus causing pitch unevenness.

In FIG. 31, the scan surface 7 moves in the direction of an arrow A from below to above as viewed in the drawing.

Here, it is seen that, in the case of FIG. 21 having been explained with reference to the second embodiment and the case of FIG. 31, with regard to the two light emitting members 1a and 1b, the asymmetry of the scanning line spacings on the scan surface 7 is the same if the imaging magnification of the fθ lens system 6 in the sub-scan section is constant.

If the imaging magnification of the fθ lens system 6 in the sub-scan section is constant for both of them, the spacing of scanning lines defined by the light beams from the two light emitting members 1a and 1b becomes narrower than the predetermined spacing at the scan start side end portion, while it becomes wider at the scan end side end portion.

More specifically, in the second embodiment described hereinbefore, the light beam from the input optical system LA is incident from obliquely below in the sub-scan direction and the movement direction of the scan surface 7 is set from the above to below as viewed in the drawing. As compared therewith, in the present embodiment, the light beam from the input optical system LA is incident from obliquely above in the sub-scan direction and the movement direction of the scan surface 7 is set from the below to above as viewed in the drawing.

In this case, in both of the second embodiment and the present embodiment, the asymmetry of the scanning line spacings on the scan surface 7 of the two light emitting members 1a and 1b is the same if the imaging magnification of the fθ lens system 6 in the sub-scan section is constant.

Hence, in the present embodiment, the imaging magnification of the fθ lens system 6 in the sub-scan section is not held constant throughout the whole effective scan region, but rather the sub-scan magnification βs at the scan start side end portion is made large similarly to the second embodiment, and to the contrary, the sub-scan magnification βe at the scan end side end portion is made small.

Namely, in the present embodiment, there is a relation βe<βs.

Therefore, the multi-beam optical scanning device of the present embodiment can use just the structure of the multi-beam optical scanning device of the second embodiment.

Hence, the characteristics of the optical system of the multi-beam optical scanning device of the present embodiment are the same as shown in Tables 5 and 6 mentioned hereinbefore.

It is to be noted that the disposition of the two light emitting members 1a and 1b is the same as the first embodiment, and the disposition is such as shown in FIG. 5.

Figure 32:
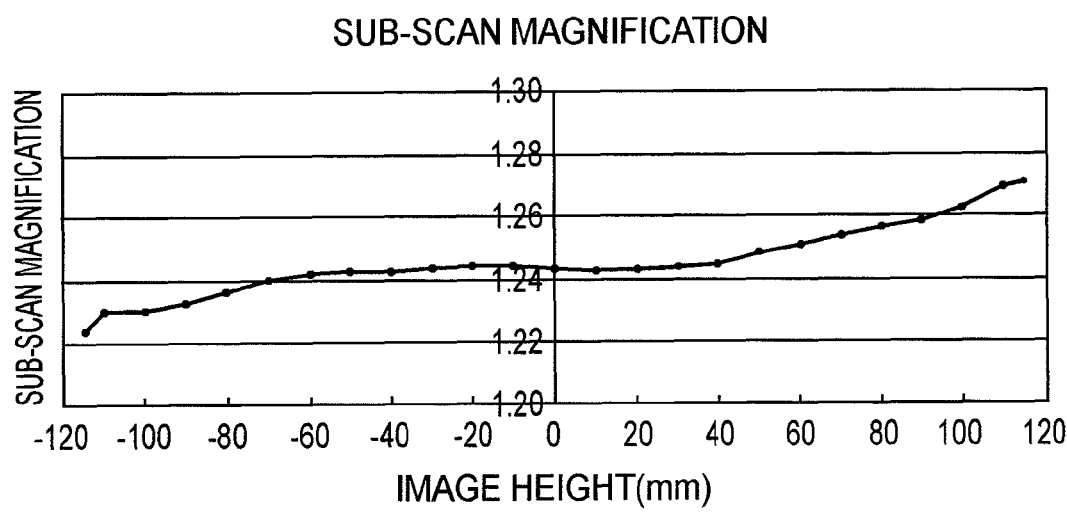
FIG. 32 is a graph showing the sub-scan magnification of the fθ lens between the deflecting surface and the scan surface in the third embodiment of the present invention.

FIG. 32 shows the sub-scan magnification of the fθ lens system 6, between the deflecting surface 5a and the scan surface 7, in the third embodiment of the present invention.

In FIG. 32, the axis of abscissas denotes the scan image height (mm) on the scan surface 7. The plus side of the image height corresponds to the scan start side (upper side of FIG. 2 and the scan start side in FIG. 31), while the minus side of the image height corresponds to the scan end side (lower side of FIG. 2 and the scan end side in FIG. 31).

As seen from FIG. 32, relative to the sub-scan magnification βc at the scan central portion, the sub-scan magnification βs at the scan start side end portion (plus side of the image height) is made large, whereas the sub-scan magnification βe at the scan end side end portion (minus side of the image height) is made small.

Namely, in present embodiment, there is a relation βe<βc<βs.

Figure 33:
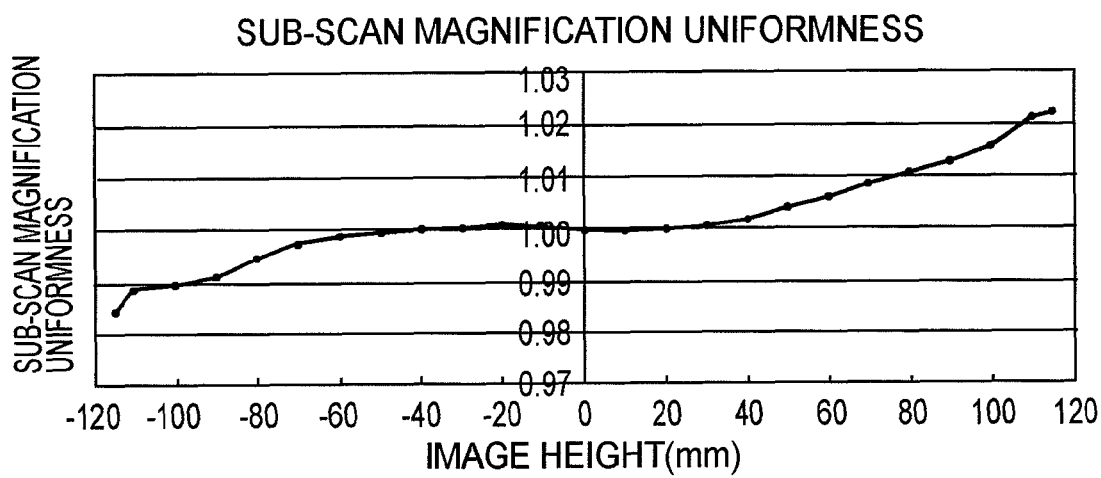
FIG. 33 is a graph showing uniformity of the sub-scan magnification in FIG. 32.

FIG. 33 illustrates the uniformity of the sub-scan magnification, with the sub-scan magnification βc at the scan central portion in FIG. 32 normalized to 1.

It is seen from FIG. 33 that, relative to the sub-scan magnification βc at the scan central portion, the sub-scan magnification is not made uniform throughout the whole scan region. Specifically, the uniformity of the sub-scan magnification is so pulled down that the sub-scan magnification βs at the scan start side (plus side of the image height) is made large and, on the contrary, the sub-scan magnification βe at the scan end side (minus side of the image height) is made small.

Figure 34:
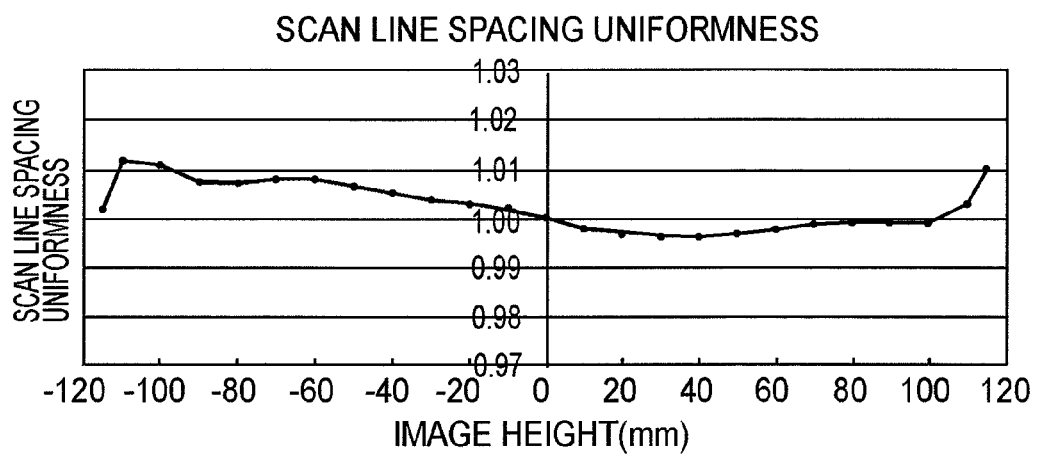
FIG. 34 is a graph showing the uniformity of the scanning line spacing in the sub-scan direction, in the third embodiment of the present invention.

FIG. 34 shows the uniformity of the scanning line spacing in the sub-scan direction.

In the present embodiment, the timing is shifted by a predetermined time δT so that the imaging positions of the light beam b emitted from the light emitting member 1b is registered with the position where the light beam emitted from the light emitting member 1a is imaged on the photosensitive drum surface 7. FIG. 34 shows the uniformity of the scanning line spacing in the sub-scan direction as the light beam a emitted from the light emitting member 1a and the light beam b emitted from the light emitting member 1b are imaged on the photosensitive drum surface 7 at that time (i.e., when the sub-scan magnification is made constant).

Here, the image resolution in the sub-scan direction was 600 DPI, aiming at 42.33 µm in the scan central portion, and 42.33 µm was normalized to 1.

It is seen that, as compared with FIG. 33, the uniformity of the scanning line spacing in the sub-scan direction shown in FIG. 34 is better.

Figure 35:
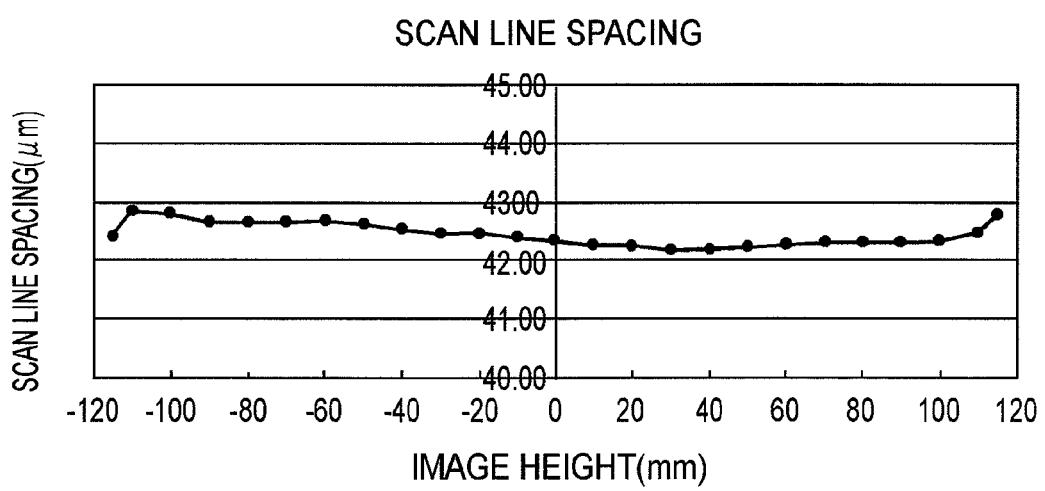
FIG. 35 is a graph showing the practical scanning line spacing in the sub-scan direction, in the third embodiment of the present invention.

FIG. 35 shows the practical scanning line spacing in the sub-scan direction of the present embodiment.

Specifically, the dispersion of scanning line spacing is from 42.20 µm to 42.85 µm, which is relatively small dispersion with reference to 42.33 µm of the image resolution 600 DPI. Thus, it is seen that good performance is accomplished.

In a multi-beam optical scanning device which uses a structure of oblique incidence scanning optical system of the present embodiment, if the imaging magnification of the fθ lens system 6 in the sub-scan section is made constant through the whole effective scan region, the following problem arises. Namely, the scanning line pitch in the sub-scan direction of plural beams on the scan surface 7 becomes different between the scan start side and the scan end side.

In consideration of this, in the present embodiment, the sub-scan magnification of the fθ lens system 6 within the effective scan region is intentionally made non-uniform as shown in FIG. 32, and specifically the sub-scan magnification $\beta s$ at the scan start side end portion is made large, while the sub-scan magnification $\beta e$ at the scan end side end portion is made small. By doing so, the scanning line spacing on the scan surface 7 in the sub-scan direction is assuredly made constant.

In FIG. 29 and FIG. 30, as described above, the downward direction as viewed in the drawing is defined as a plus direction (upstream side in the movement direction of the scan surface 7). Furthermore, the upward direction is defined as a minus direction (downstream side in the movement direction of the scan surface 7). Then, the input optical system LA is so disposed to define a particular angle, not zero, with the minus direction in the sub-scan section, relative to a plane perpendicular to the deflection axis of the deflecting surface.

Stating this more exactly, as shown in FIG. 29 and FIG. 30, the direction toward the upstream side in the movement direction of the scan surface 7 is defined as a plus direction in the sub-scan direction, while the direction toward the downstream side is defined as a minus direction in the sub-scan direction. In that case, the input optical system LA is so disposed to define a particular angle, not zero, with the minus direction in the sub-scan section, relative to a plane perpendicular to the deflection axis of the deflecting surface. Here, the imaging magnification $\beta$ of the fθ lens system 6 in the sub-scan section is made as follows. That is, the imaging magnification $\beta s$ at the scan start side end portion is made large as compared with the imaging magnification $\beta c$ on the optical axis of the fθ lens system 6, while the imaging magnification $\beta e$ at the scan end side end portion is made small. By doing so, the scanning line spacing on the scan surface 7 in the sub-scan direction is assuredly made constant.

Namely, in the present embodiment, there is a relation $\beta e < \beta c < \beta s$.

Hence, for a multi-beam scanning device having a structure of oblique incidence scanning optical system, provision of a multi-beam scanning device which enables uniform scanning line pitch and high precision image output is accomplished. Furthermore, the provision of a compact color LBP or digital color copying machine which enables high speed and high precision image output is accomplished.

Embodiment 4

A fourth embodiment of the present invention will be described below.

The present embodiment differs from the abovementioned first embodiment in that the two light beams emitted from the two light emitting members 1a and 1b are incident from obliquely above in the sub-scan direction, while defining an angle of 2.5 deg. with the plane perpendicular to the pivotal axis of the deflecting surface 5a. Additionally, the movement direction of the scan surface 7 is set reversely to that of the first embodiment. The structure and optical function of the remaining portion are similar to those of the first embodiment, and similar advantageous results are obtained.

More specifically, in the present embodiment, the two light beams a and b emitted from the two light emitting members 1a and 1b are incident on the deflecting surface 5a from obliquely above in the sub-scan direction, as contrast to the first embodiment, while defining an angle of 2.5 deg. with the plane perpendicular to the pivotal axis of the deflecting surface 5a. This is the same as the third embodiment described above.

Furthermore, in the present embodiment, the movement direction of the scan surface 7 is set reversely to that of the first embodiment. This is the same as the second embodiment described hereinbefore.

The sectional view of the present embodiment in the main-scan direction has similar disposition as that of the sectional view of the first embodiment illustrated in FIG. 2. Furthermore, the sectional view of the present embodiment in the sub-scan direction has similar disposition as that of the sectional view of the third embodiment illustrated in FIG. 27 and FIG. 28. The two light emitting members 1a and 1b have similar disposition as of the second embodiment, and the disposition is such as shown in FIG. 22.

Figure 36:
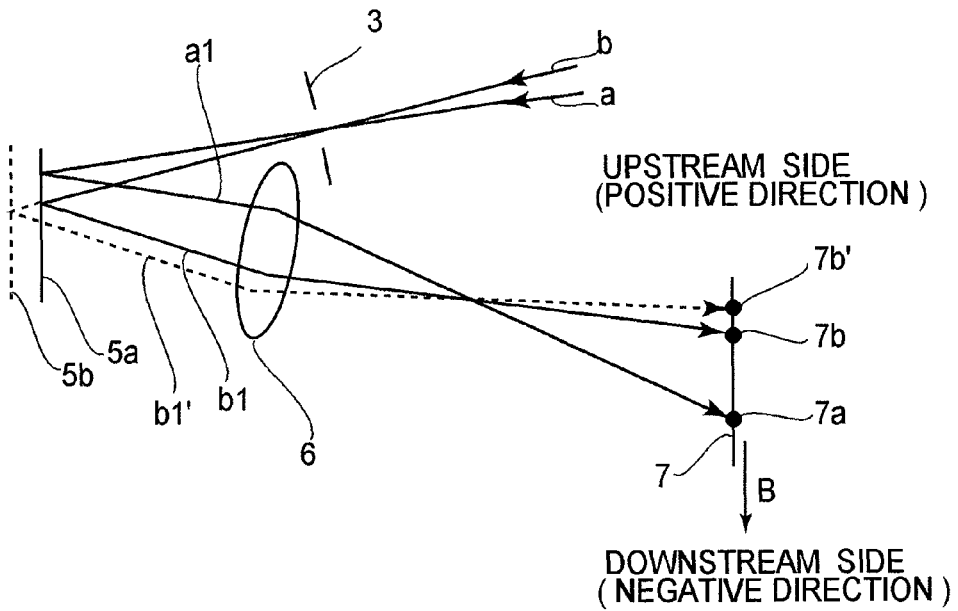
FIG. 36 is a sub-scan sectional view illustrating how two light beams are reflected by the deflecting surface, in a fourth embodiment of the present invention.

FIG. 36 is a sub-scan sectional view illustrating how the principal rays of the two light beams a and b are reflected by the deflecting surface 5a when the scan start side (upper side as viewed in FIG. 2) is being scanned in the fourth embodiment of the present invention. In FIG. 36, the components corresponding to those of FIG. 7 are denoted by similar reference numerals.

Here, the scan surface 7 is being moved in the direction of an arrow B from the above to below in FIG. 36, which is opposite to that of the first embodiment, and the scan surface 7 is first scanned along a line by the preceding light beam a and, thereafter, a zone of the scan surface just above the line scanned by the preceding light beam a is scanned along a line by the subsequent light beam b.

Hence, the vertical relationship of the two light beams a and b in the sub-scan direction emitted from the two light emitting members 1a and 1b is set reversely to the first embodiment.

In FIG. 36, the direction toward the upstream side of the movement direction (upward in the drawing) is the minus direction, while the direction toward the downstream side of the movement direction (downward in the drawing) is the plus direction.

With regard to the spacing between the imaging positions 7a and 7b on the scan surface 7, if the resolution in the sub-scan direction is 600 DPI, generally the spacing will be $$25.4/600 = 0.04233 \text{ mm} = 42.33 \text{ µm}$$

This is determined by the resolution in the sub-scan direction.

However, if the timing is shifted by a predetermined time $\delta T$ so that the imaging position of the subsequent light beam b is registered with the position where the light beam a which is preceding in the main-scan direction is imaged on the scan surface 7, the light beam b reflected by the deflecting surface 5b (shown by the broken line) at that time will be as follows. Namely, since the deflecting surface 5b at that time is deviated in the direction away from the fθ lens system 6, the light beam b is reflected at a position on the deflecting surface 5a which position is deviated downwardly in the sub-scan direction, and it is reflected in the direction toward b1'.

As a result, on the scan surface 7, the light beam b is imaged at a position 7b' which is deviated upwardly in sub-scan direction relative to the position 7b.

Figure 37:
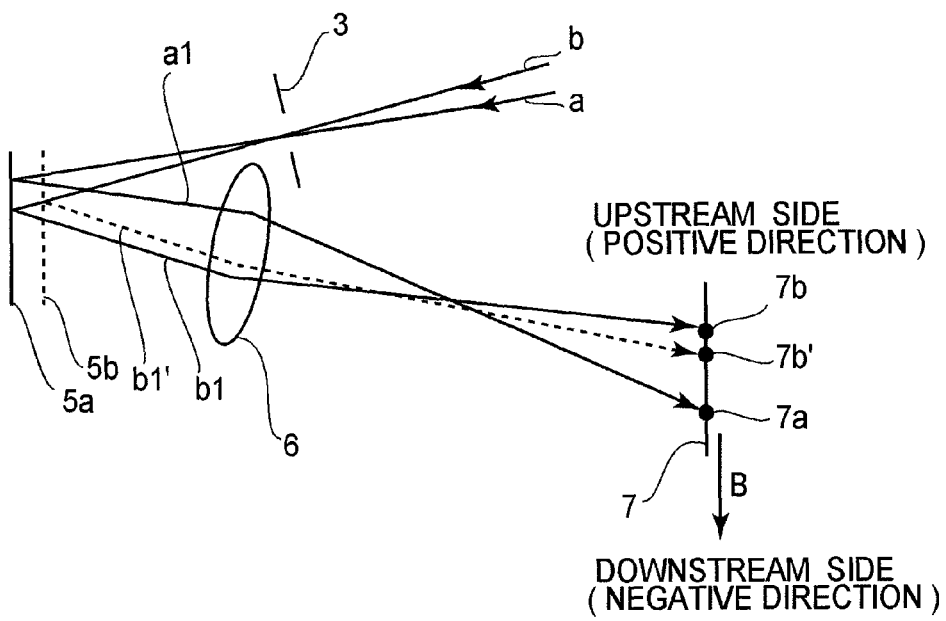
FIG. 37 is a sub-scan sectional view illustrating how two light beams are reflected by the deflecting surface, in the fourth embodiment of the present invention.

FIG. 37 is a sub-scan sectional view illustrating how the principal rays of the two light beams a and b are reflected by the deflecting surface 5a when the scan end side (lower side as viewed in FIG. 2) is being scanned in the fourth embodiment of the present invention. In FIG. 37, the components corresponding to those of FIG. 9 are denoted by similar reference numerals.

In FIG. 37, the scan surface 7 is being moved in the direction of an arrow B from the above to below in FIG. 37, like the case of FIG. 36, and the scan surface 7 is first scanned along a line by the preceding light beam a and, thereafter, a zone of the scan surface just above the line scanned by the preceding light beam a is scanned along a line by the subsequent light beam b.

Hence, the vertical relationship of the two light beams a and b in the sub-scan direction emitted from the two light emitting members 1a and 1b is set reversely to the first embodiment.

Hence, the vertical relationship of the two light beams a and b in the sub-scan direction emitted from the two light emitting members 1a and 1b is set reversely to the first embodiment.

In FIG. 37, the direction toward the upstream side of the movement direction (upward in the drawing) is the minus direction, while the direction toward the downstream side of the movement direction (downward in the drawing) is the plus direction.

With regard to the spacing between the imaging positions 7a and 7b on the scan surface 7, if the resolution in the sub-scan direction is 600 DPI, generally the spacing will be 25.4/600=0.04233 mm=42.33 µm This is determined by the resolution in the sub-scan direction.

However, if the timing is shifted by a predetermined time δT so that the imaging position of the subsequent light beam b is registered with the position where the light beam a which is preceding in the main-scan direction is imaged on the scan surface 7, the light beam b reflected by the deflecting surface 5b (shown by the broken line) at that time will be as follows. Namely, since the deflecting surface 5b at that time is deviated in the direction approaching the fθ lens system 6, the light beam b is reflected at a position on the deflecting surface 5a which position is deviated upwardly in the sub-scan direction, and it is reflected in the direction toward b1'.

As a result, on the scan surface 7, the light beam b is imaged at a position 7b' which is deviated downwardly in sub-scan direction relative to the position 7b.

Figure 38:
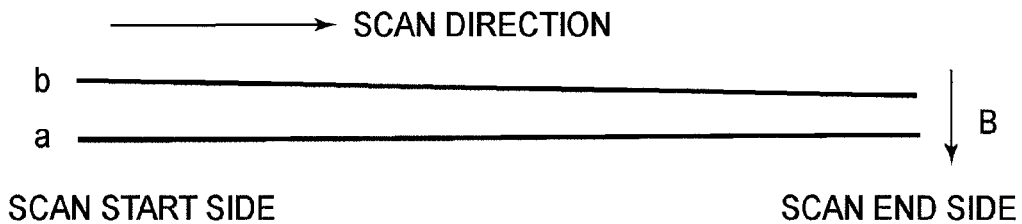
FIG. 38 is a diagram showing a change of spacing of the two scanning lines on the scan surface, in the fourth embodiment of the present invention.

This leads to that, if the imaging magnification in the sub-scan section of the fθ lens system 6 is constant throughout the whole effective scan region, pitch irregularity occurs as shown in FIG. 38. Namely, the spacing of the scanning lines on the scan surface 7 defined by the two light beam a and b emitted from the two light emitting members 1a and 1b becomes wider than the predetermined spacing at the scan start side, whereas it becomes narrower at the scan end side, thus causing pitch unevenness.

In FIG. 38, the scan surface 7 moves in the direction of an arrow B from the above to below as viewed in the drawing.

Here, it is seen that, in the case of FIG. 10 having been explained with reference to the first embodiment and the case of FIG. 38, with regard to the two light emitting members 1a and 1b, the asymmetry of the scanning line spacings on the scan surface 7 is the same if the imaging magnification of the fθ lens system 6 in the sub-scan section is constant.

If the imaging magnification of the fθ lens system 6 in the sub-scan section is constant for both of them, the spacing of scanning lines defined by the light beams from the two light emitting members 1a and 1b becomes wider than the predetermined spacing at the scan start side end portion, while it becomes narrower at the scan end side end portion.

More specifically, in the first embodiment described hereinbefore, the light beam from the input optical system LA is incident from obliquely below in the sub-scan direction and the movement direction of the scan surface 7 is set from the below to above as viewed in the drawing. As compared therewith, in the present embodiment, the light beam from the input optical system LA is incident from obliquely above in the sub-scan direction and the movement direction of the scan surface 7 is set from the above to below as viewed in the drawing.

In this case, in both of the first embodiment and the present embodiment, the asymmetry of the scanning line spacings on the scan surface 7 of the two light emitting members 1a and 1b is the same if the imaging magnification of the fθ lens system 6 in the sub-scan section is constant.

Hence, in the present embodiment, the imaging magnification of the fθ lens system 6 in the sub-scan section is not held constant throughout the whole effective scan region, but rather the sub-scan magnification $\beta s$ at the scan start side end portion is made small as in the first embodiment and, to the contrary, the sub-scan magnification $\beta e$ at the scan end side end portion is made large.

Namely, in the present embodiment, there is a relation $\beta s < \beta e$.

Therefore, the multi-beam optical scanning device of the present embodiment can use just the structure of the multi-beam optical scanning device of the first embodiment.

Hence, the characteristics of the optical system of the multi-beam optical scanning device of the present embodiment are the same as shown in Tables 1 and 2 mentioned hereinbefore.

It is to be noted that the disposition of the two light emitting members 1a and 1b is the same as the second embodiment, and the disposition is such as shown in FIG. 22.

Figure 39:
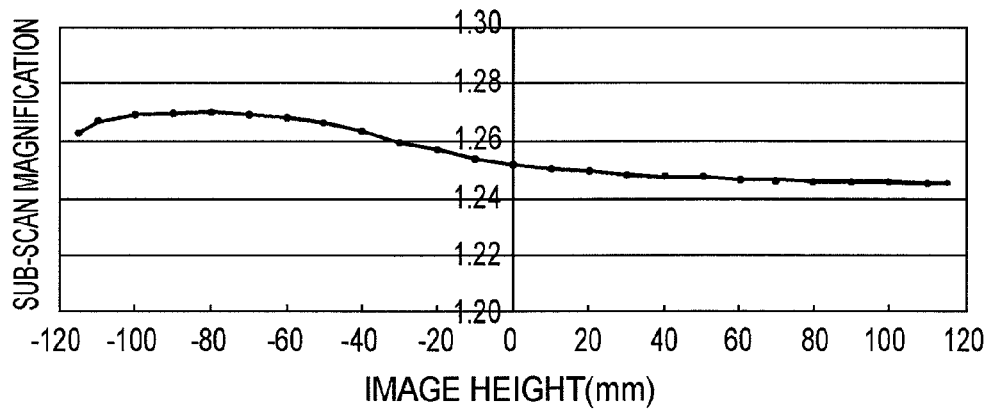
FIG. 39 is a graph showing the sub-scan magnification of the fθ lens between the deflecting surface and the scan surface in the fourth embodiment of the present invention.

FIG. 39 shows the sub-scan magnification of the fθ lens system 6, between the deflecting surface 5a and the scan surface 7, in the fourth embodiment of the present invention.

In FIG. 39, the axis of abscissas denotes the scan image height (mm) on the scan surface 7. The plus side of the image height corresponds to the scan start side (upper side of FIG. 2 and the scan start side in FIG. 38), while the minus side of the image height corresponds to the scan end side (lower side of FIG. 2 and the scan end side in FIG. 38).

As seen from FIG. 39, relative to the sub-scan magnification $\beta c$ at the scan central portion, the sub-scan magnification $\beta s$ at the scan start side end portion (plus side of the image height) is made small, whereas the sub-scan magnification $\beta e$ at the scan end side end portion (minus side of the image height) is made large.

Namely, in present embodiment, there is a relation $\beta s < \beta c < \beta e$.

Figure 40:
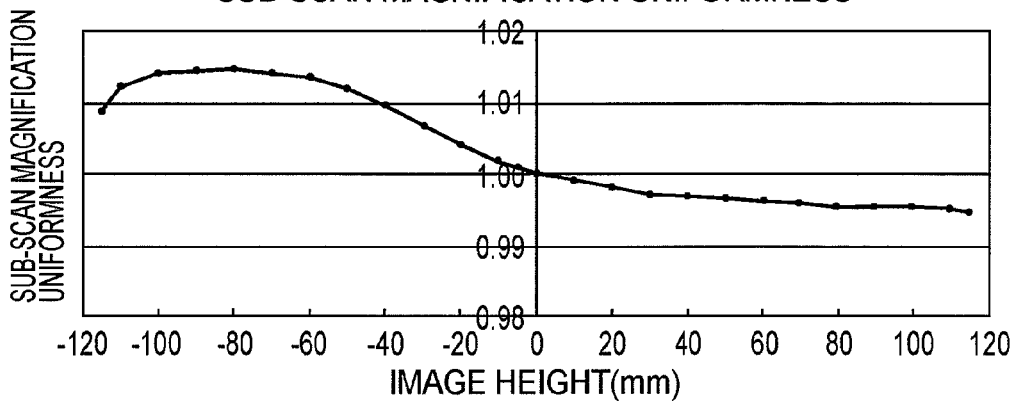
FIG. 40 is a graph showing uniformity of the sub-scan magnification in FIG. 39.

FIG. 40 illustrates the uniformity of the sub-scan magnification, with the sub-scan magnification $\beta c$ on the optical axis (scan central portion) in FIG. 39 normalized to 1.

It is seen from FIG. 40 that, relative to the sub-scan magnification $\beta c$ at the scan central portion, the sub-scan magnification is not made uniform throughout the whole scan region. Specifically, the uniformity of the sub-scan magnification is so pulled down that the sub-scan magnification βs at the scan start side (plus side of the image height) is made small and, on the contrary, the sub-scan magnification βe at the scan end side (minus side of the image height) is made large.

Figure 41:
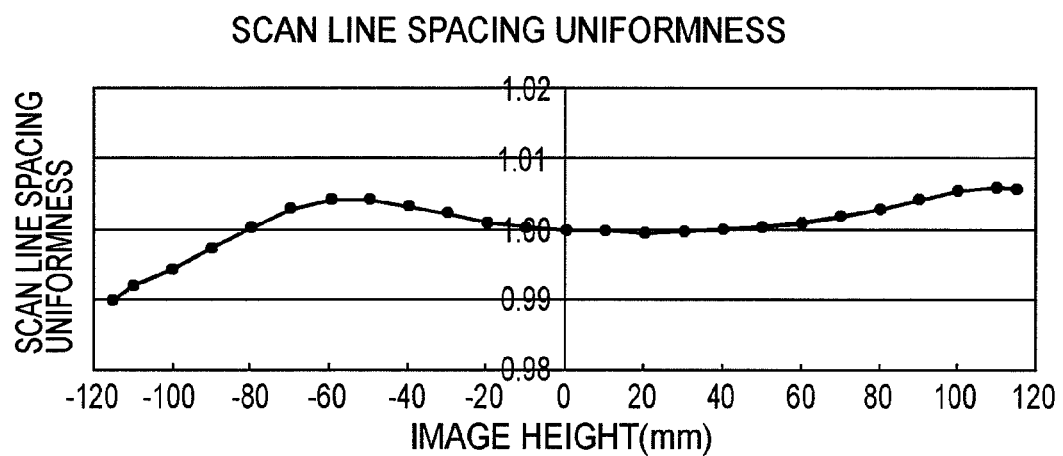
FIG. 41 is a graph showing the uniformity of the scanning line spacing in the sub-scan direction, in the fourth embodiment of the present invention.

FIG. 41 shows the uniformity of the scanning line spacing in the sub-scan direction.

In the present embodiment, the timing is shifted by a predetermined time δT so that the imaging positions of the light beam b emitted from the light emitting member 1b is registered with the position where the light beam emitted from the light emitting member 1a is imaged on the photosensitive drum surface 7. FIG. 41 shows the uniformity of the scanning line spacing in the sub-scan direction as the light beam a emitted from the light emitting member 1a and the light beam b emitted from the light emitting member 1b are imaged on the photosensitive drum surface 7 at that time (i.e., when the sub-scan magnification is made constant).

Here, the image resolution in the sub-scan direction was 600 DPI, aiming at 42.33 μm in the scan central portion, and 42.33 μm was normalized to 1.

It is seen that, as compared with FIG. 40, the uniformity of the scanning line spacing in the sub-scan direction in FIG. 41 is better.

Figure 42:
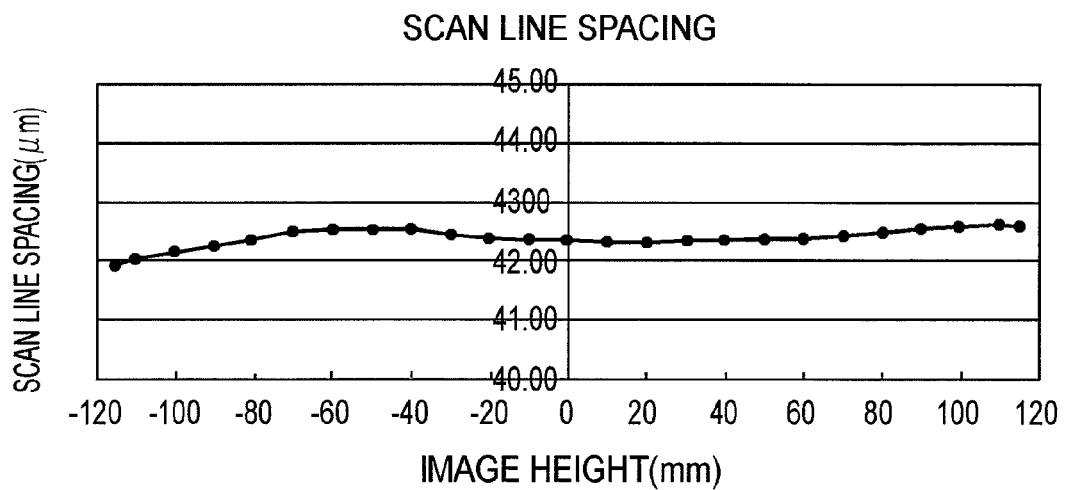
FIG. 42 is a graph showing the practical scanning line spacing in the sub-scan direction, in the fourth embodiment of the present invention.

FIG. 42 shows the practical scanning line spacing in the sub-scan direction of the present embodiment.

Specifically, the dispersion of scanning line spacing is from 42.20 μm to 42.85 μm, which is relatively small dispersion with reference to 42.33 μm of the image resolution 600 DPI. Thus, it is seen that good performance is accomplished.

In a multi-beam optical scanning device which uses a structure of oblique incidence scanning optical system of the present embodiment, if the imaging magnification of the fθ lens system 6 in the sub-scan section is made constant through the whole effective scan region, the following problem arises. Namely, the scanning line pitch in the sub-scan direction of plural beams on the scan surface 7 becomes different between the scan start side and the scan end side.

In consideration of this, in the present embodiment, the sub-scan magnification of the fθ lens system 6 within the effective scan region is intentionally made non-uniform as shown in FIG. 39, and specifically the sub-scan magnification βs at the scan start side end portion is made small, while the sub-scan magnification βe at the scan end side end portion is made large. By doing so, the scanning line spacing on the scan surface 7 in the sub-scan direction is assuredly made constant.

In FIG. 36 and FIG. 37, as described above, the downward direction as viewed in the drawing is defined as a plus direction (upstream side in the movement direction of the scan surface 7). Furthermore, the upward direction is defined as a minus direction (downstream side in the movement direction of the scan surface 7). Then, the input optical system LA is so disposed to define a particular angle, not zero, with the minus direction in the sub-scan section, relative to a plane perpendicular to the deflection axis of the deflecting surface.

Stating this more exactly, as shown in FIG. 36 and FIG. 37, the direction toward the downstream side in the movement direction of the scan surface 7 is defined as a plus direction in the sub-scan direction, while the direction toward the upstream side is defined as a minus direction in the sub-scan direction.

In that case, the input optical system LA is so disposed to define a particular angle, not zero, with the minus direction in the sub-scan section, relative to a plane perpendicular to the deflection axis of the deflecting surface.

Here, the imaging magnification of the fθ lens system 6 in the sub-scan section is made as follows. That is, the imaging magnification βs at the scan start side end portion is made small as compared with the imaging magnification βc on the optical axis of the fθ lens system 6, while the imaging magnification βe at the scan end side end portion is made large.

By doing so, the scanning line spacing on the scan surface 7 in the sub-scan direction is assuredly made constant.

Namely, in the present embodiment, there is a relation βs<βc<βe.

Hence, for a multi-beam scanning device having a structure of oblique incidence scanning optical system, provision of a multi-beam scanning device which enables uniform scanning line pitch and high precision image output is accomplished. Furthermore, the provision of a compact color LBP or digital color copying machine which enables high speed and high precision image output is accomplished.

Although several preferred embodiments of the present invention have been described above, the present invention is not limited to them. Various changes and modifications are possible within the scope of the present invention.

Embodiment of Image Forming Apparatus

Figure 43:
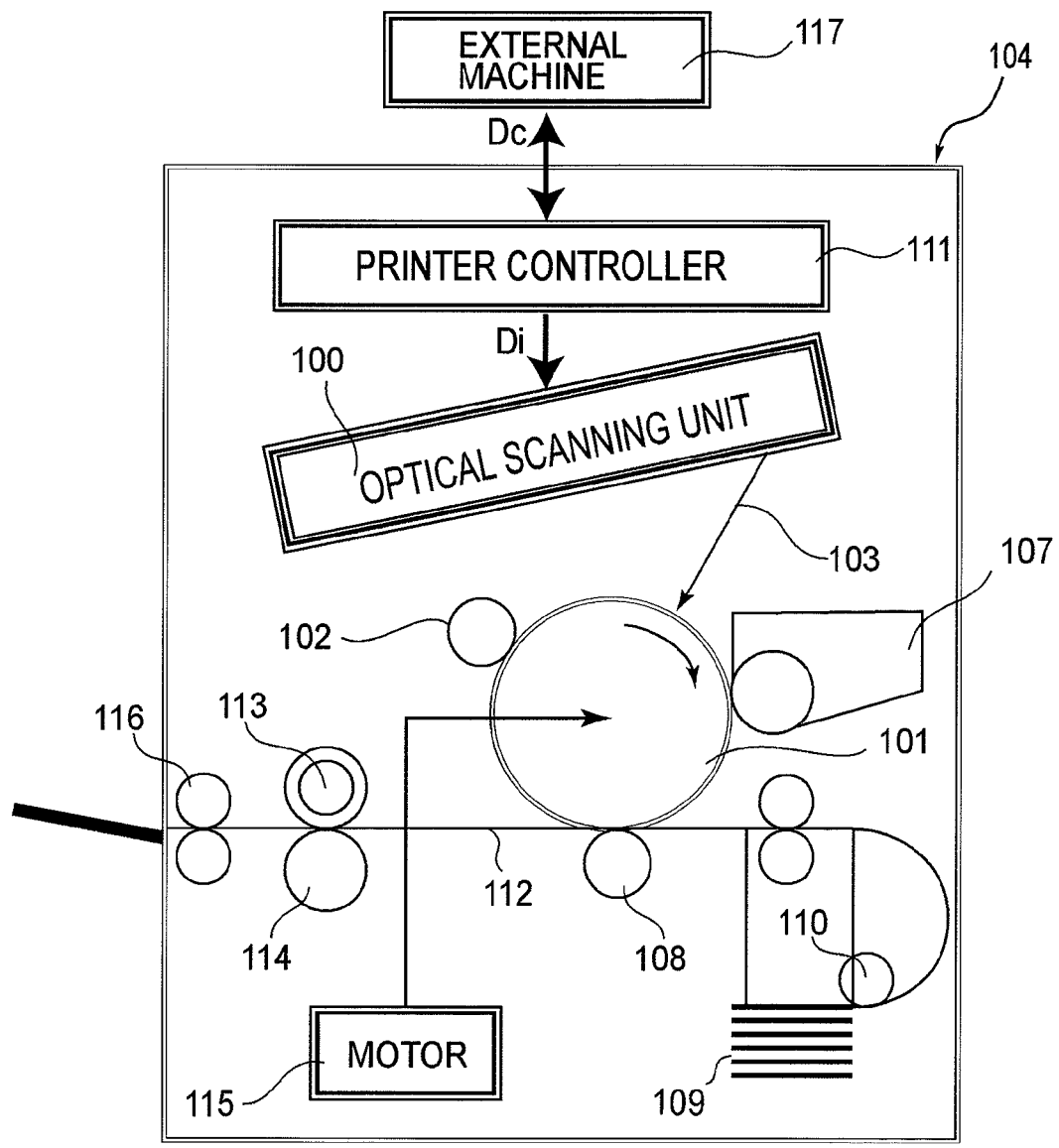
FIG. 43 is a sectional view in the sub-scan direction of a main portion of an image forming apparatus according to an embodiment of the present invention.

FIG. 43 is a schematic and sectional view, in the sub-scan direction, of a main portion of an image forming apparatus according to an embodiment of the present invention. Denoted generally at 104 in the drawing is the image forming apparatus.

The image forming apparatus 104 receives code data Dc supplied thereto from an external machine 117 such as a personal computer, for example. The code data Dc is then transformed by a printer controller 111 inside the apparatus, into imagewise data (dot data) Di.

The imagewise data Di is then inputted into an optical scanning unit (multi-beam optical scanning device) 100 which is configured in accordance with any one of the preceding embodiments described hereinbefore. The optical scanning unit 100 produces a light beam 103 having been modulated in accordance with the imagewise data Di, and with this light beam 103, the photosensitive surface of a photosensitive drum 101 is scanned in the main-scan direction.

The photosensitive drum 101 which is an electrostatic latent image bearing member (photosensitive member) is rotated clockwise by means of a motor 115. Through this rotation, the photosensitive surface of the photosensitive drum 101 is moved relatively to the light beam 103, in the sub-scan direction which is orthogonal to the main-scan direction.

Disposed just above the photosensitive drum 101 is a charging roller 102 which is in contact with the photosensitive drum surface to electrically charge the drum surface uniformly. Onto the photosensitive drum 101 surface having been electrically charged by the charging roller 102, the light beam 103 being scanned by the optical scanning unit 100 is projected.

As described above, the light beam 103 has been modulated in accordance with the imagewise data Di. By irradiating the photosensitive drum 101 with this light beam 103, an electrostatic latent image is formed on the photosensitive drum 101 surface. The electrostatic latent image thus formed is then developed into a toner image, by means of a developing device 107 which is provided at a position downstream of the irradiation position of the light beam 103 with respect to the rotational direction of the photosensitive drum 101 and which is in contact with the photosensitive drum 101.

The toner image thus developed by the developing device 107 is transferred onto a transfer sheet (transfer material) 112 below the photosensitive drum 101, by means of a transfer roller 108 which is disposed opposed to the photosensitive drum 101.

Transfer sheets 112 are stored in a sheet cassette 109 in front of (at the right-hand side as viewed in FIG. 43) the photosensitive drum, but these can be supplied manually. There is a sheet supplying roller 110 at an end portion of the sheet cassette 109, for supplying each sheet 112 in the cassette 109 into a sheet supply path.

The paper sheet 112 having an unfixed toner image transferred thereto in the manner described above is conveyed to a fixing device behind (at the left-hand side as viewed in FIG. 15) the photosensitive drum 101. The fixing device comprises a fixing roller 113 having a built-in fixing heater (not shown) and a pressing roller 114 disposed to be press-contacted to the fixing roller 113. The transfer sheet 112 supplied from the image transfer station is heated under pressure at the press contact area between the fixing roller 113 and the pressing roller 114, whereby the unfixed toner image on the transfer sheet 112 is fixed thereon.

Behind the fixing roller 113, there are sheet discharging rollers 116 which function to discharge the image-fixed sheet 112 out of the image forming apparatus.

While not shown in FIG. 43, the print controller 111 has various functions in addition to the data conversion function described hereinbefore, such as for controlling a motor 115 or any other components inside the image forming apparatus as well as a polygon motor inside the optical scanning unit (to be described later).

Embodiment of Color Image Forming Apparatus

Figure 44:
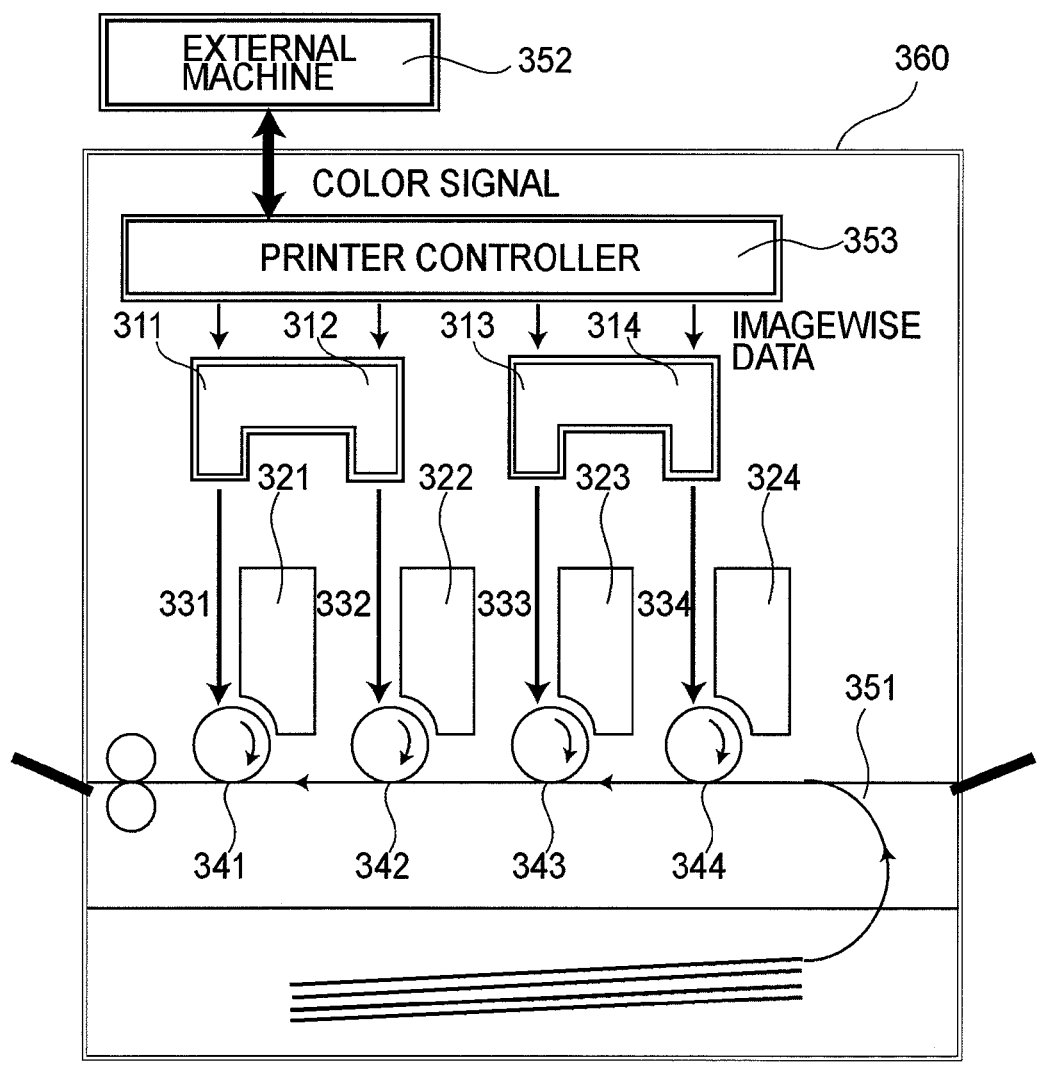
FIG. 44 is a schematic diagram of a main portion of a color image forming apparatus according to an embodiment of the present invention.
Figure 45:
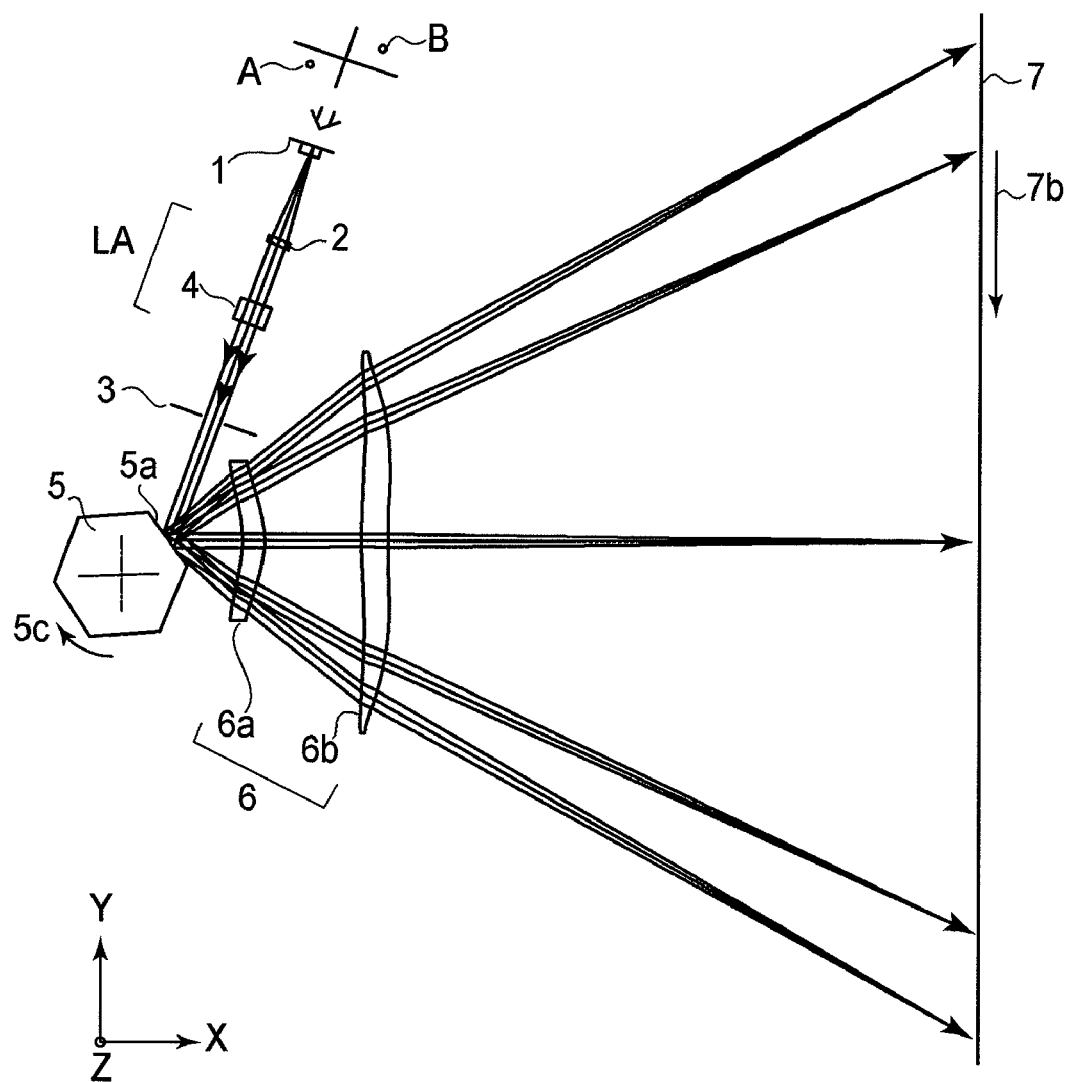
FIG. 45 is a sectional view in the main-scan direction of a conventional multi-beam optical scanning device with plural light sources.
Figure 46:
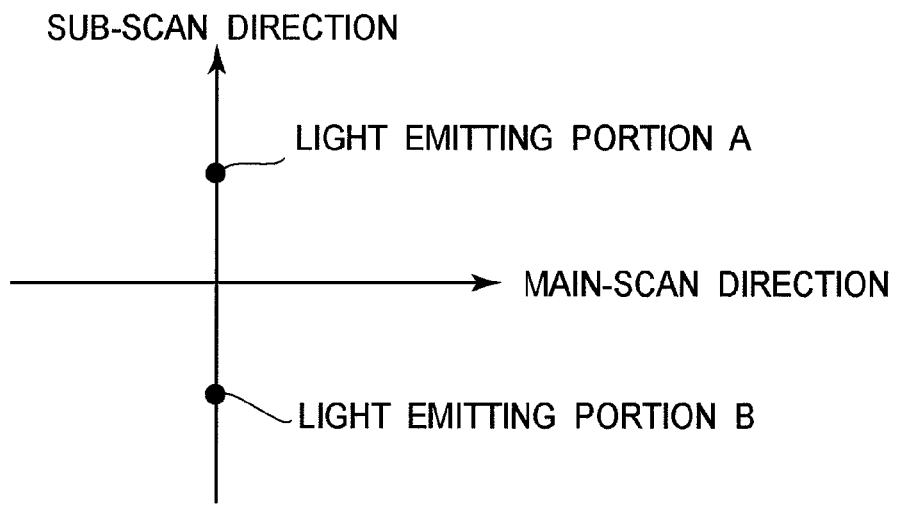
FIG. 46 is a diagram illustrating disposition of a plurality of light emitting members when they are arrayed vertically along the sub-scan direction.
Figure 47:
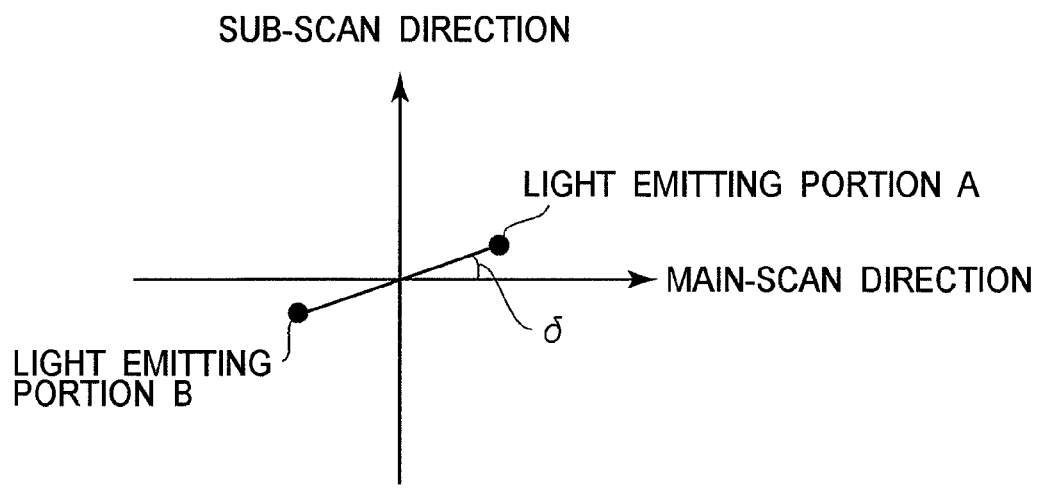
FIG. 47 is a diagram illustrating the disposition of light emitting members when plural light sources are disposed diagonally.
Figure 48:
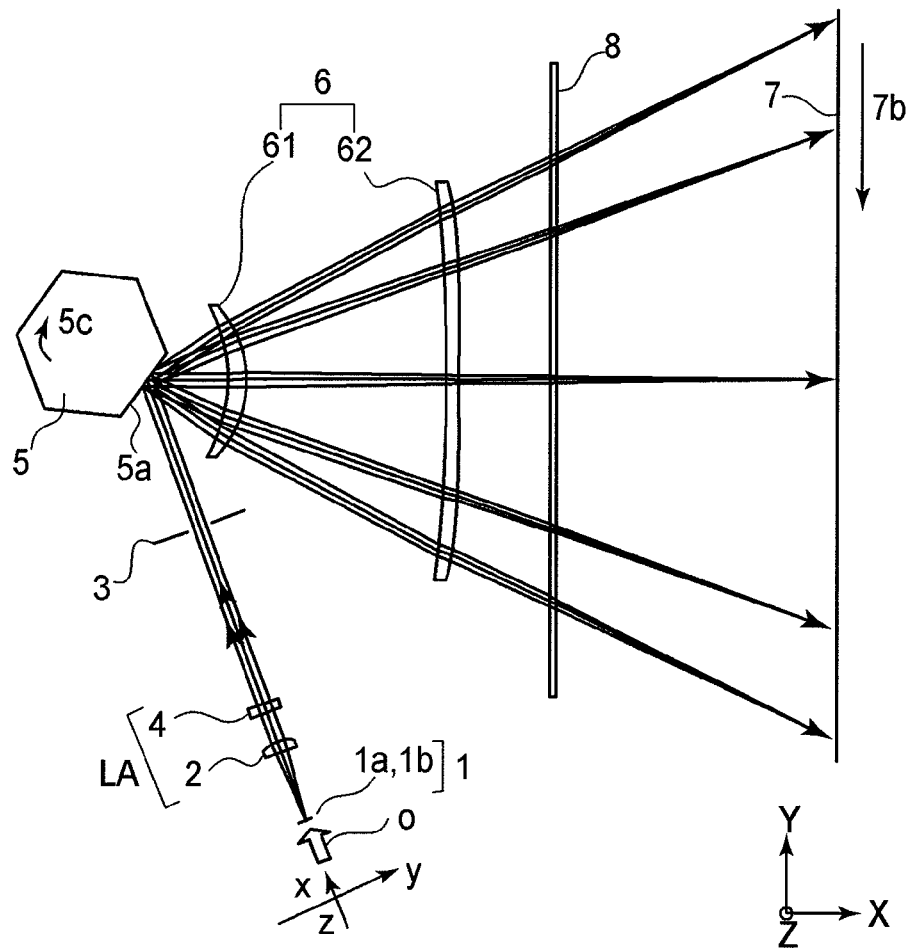
FIG. 48 is a schematic diagram of a main portion of an oblique incidence scanning optical system using a multi-beam light source, as viewed from the main-scan direction.
Figure 49:
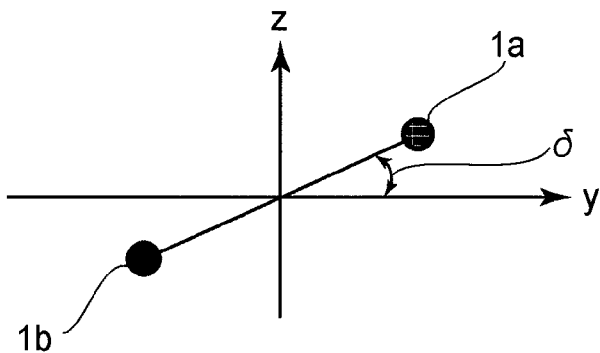
FIG. 49 is a diagram illustrating disposition of light emitting members when two light sources are disposed diagonally.
Figure 50:
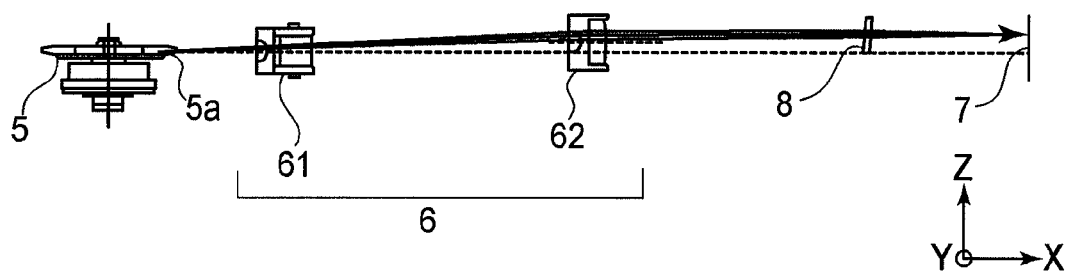
FIG. 50 is a schematic diagram of a main portion of an oblique incidence scanning optical system using a multi-beam light source, as viewed from the sub-scan direction.
Figure 51:
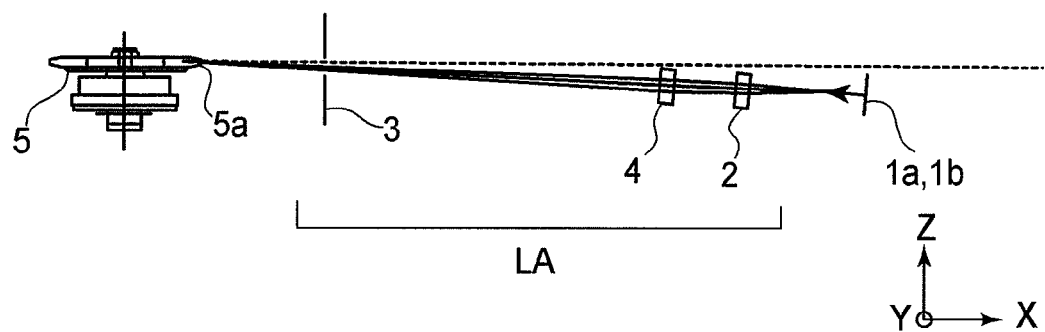
FIG. 51 is a schematic diagram of a main portion of an oblique incidence scanning optical system using a multi-beam light source, as viewed from the sub-scan direction.
Figure 52:
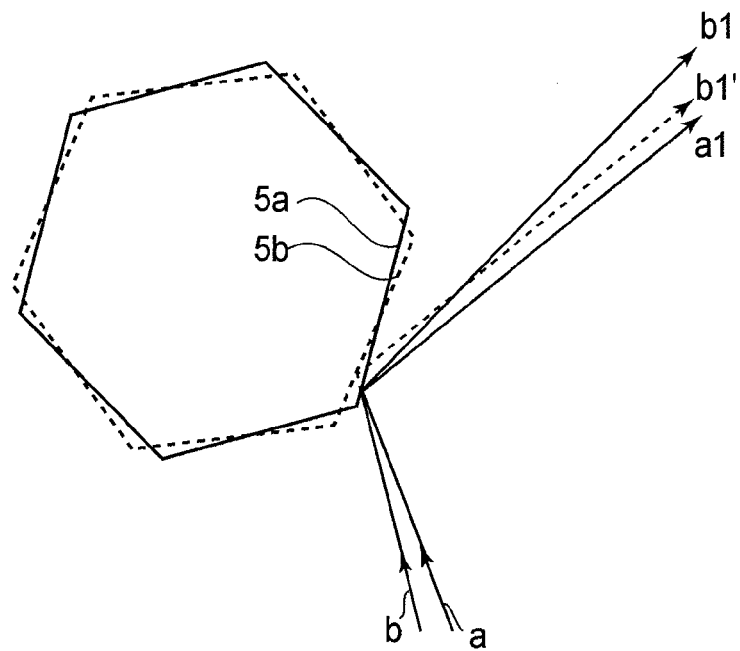
FIG. 52 is a main-scan sectional view illustrating how two light beams are reflected by the deflecting surface, in FIG. 48.
Figure 53:
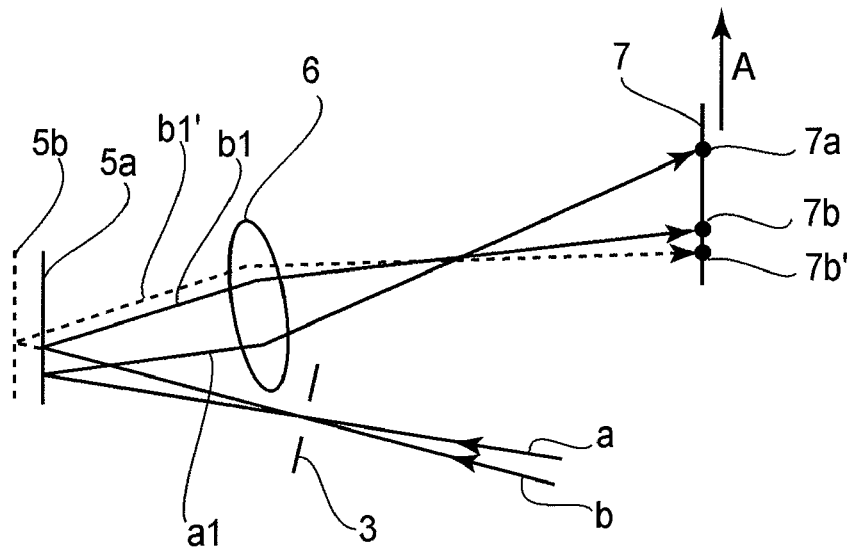
FIG. 53 is a main-scan sectional view illustrating how two light beams are reflected by the deflecting surface, in FIG. 48.
Figure 54:
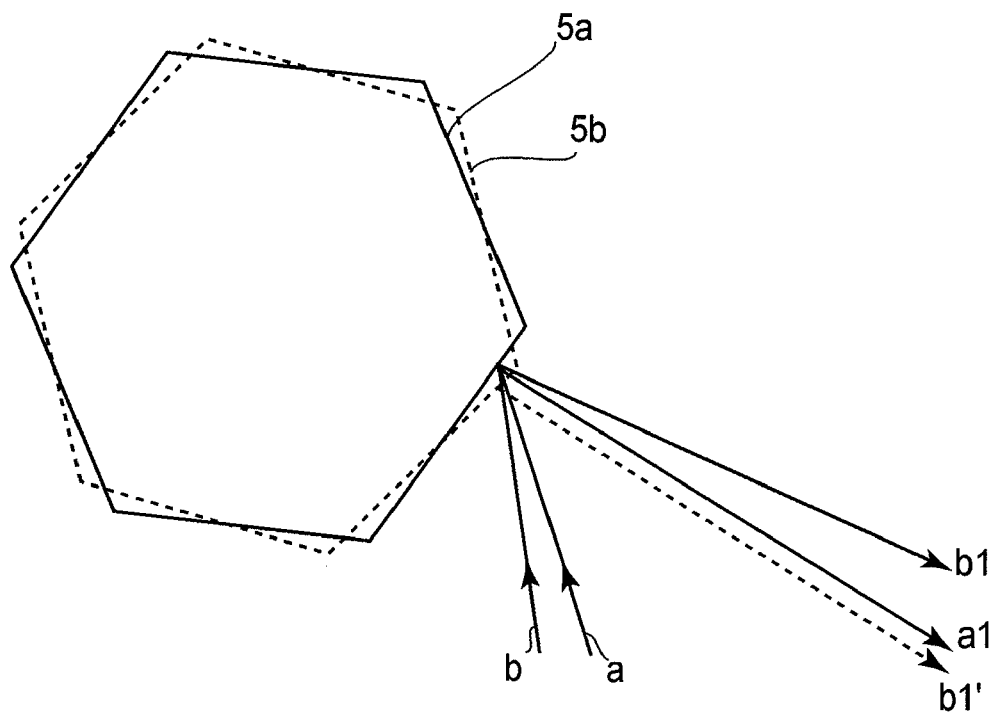
FIG. 54 is a main-scan sectional view illustrating how two light beams are reflected by the deflecting surface, in FIG. 48.
Figure 55:
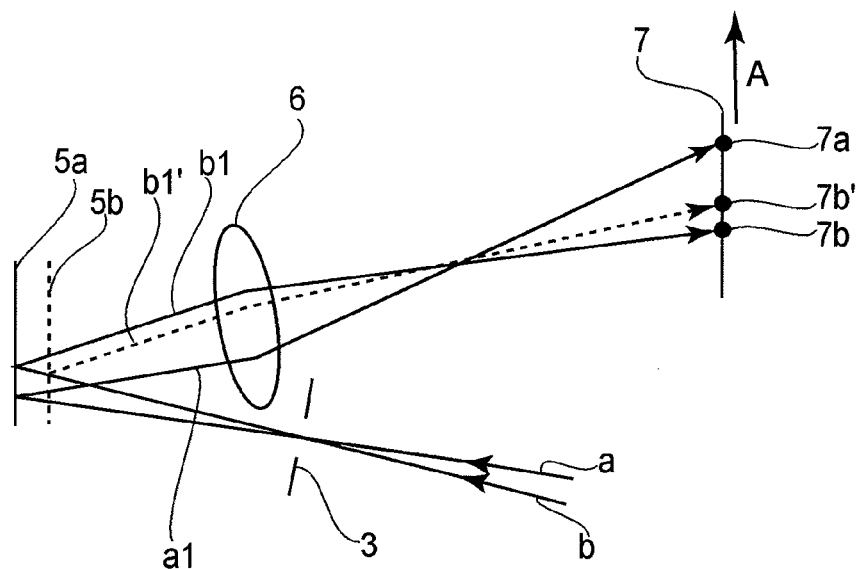
FIG. 55 is a main-scan sectional view illustrating how two light beams are reflected by the deflecting surface, in FIG. 48.
Figure 56:
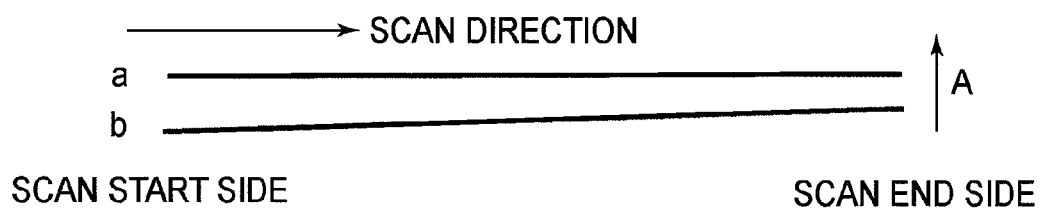
FIG. 56 is a diagram illustrating a change of scanning line spacing of two light beams on the scan surface.

FIG. 44 is a schematic view of a main portion of a color image forming apparatus according to an embodiment of the present invention. This embodiment is directed to a tandem type color image forming apparatus in which four optical scanning devices (multi-beam optical scanning devices) are provided so as to record imagewise data upon the surfaces of corresponding photosensitive drums (image bearing members) in parallel to each other.

In FIG. 44, denoted generally at 360 is a color image forming apparatus, and denoted at 311, 312, 313 and 314 are optical scanning devices having a structure according to any one of the preceding embodiments. Denoted at 341, 342, 343 and 344 are photosensitive drums (image bearing members), and denoted at 321, 322, 323 and 324 are developing devices, respectively. Denoted at 351 is a conveyance belt.

In FIG. 44, the color image forming apparatus 360 receives color signals of R (red), G (green) and B (blue) supplied thereto from an outside machine 352 such as a personal computer, for example. These color signals are transformed by means of a printer controller 353 inside the image forming apparatus, into imagewise data (dot data) corresponding to C (cyan), M (magenta), Y (yellow) and B (black).

These imagewise data are inputted into the optical scanning devices 311, 312, 313 and 314, respectively. In response, these optical scanning devices produce light beams 331, 332, 333 and 334 having been modulated in accordance with the associated imagewise data. Through these light beams, the photosensitive surfaces of the photosensitive drums 341, 342, 343 and 344 are scanned in the main-scan direction.

In the color image forming apparatus of this embodiment, two pairs of optical scanning devices (311, 312) and (313, 314) are provided and these correspond to colors of C (cyan), M (magenta), Y (yellow) and B (black), respectively. These scanning devices are operable in parallel to each other to record imagewise signals upon the surfaces of the photosensitive drums 341, 342, 343 and 344, respectively, so that a color image can be printed at high speed.

As described, the color image forming apparatus of this embodiment uses four optical scanning devices 311, 312, 313 and 314 to produce latent images for different colors upon the surfaces of corresponding photosensitive drums 341, 342, 343 and 344, respectively, by use of light beams based on respective image data. After that, these images are superposedly transferred onto a recording sheet, whereby a single full-color image is produced thereon.

As regards the outside machine 352, a color image reading machine having a CCD sensor, for example, may be used. In that occasion, this color image reading machine and the color image forming apparatus 360 will provide a color digital copying machine.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2007-170252 filed Jun. 28, 2007, for which is hereby incorporated by reference.

What is claimed is:

1. A multi-beam optical scanning device, comprising:
a light source device including a plurality of light emitting members having a spacing in a main-scan direction;
a rotary polygonal mirror configured to scanningly deflect a plurality of light beams emitted from said light emitting members;
a first optical system configured to image, in a sub-scan section, the plurality of light beams from said plurality of light emitting members on a deflecting surface of said rotary polygonal mirror; and
a second optical system configured to image the plurality of light beams scanningly deflected by the deflecting surface of said rotary polygonal mirror on a surface to be scanned,
wherein, in the sub-scan section, the deflecting surface of said rotary polygonal mirror and the surface to be scanned are in a conjugate relationship with each other,
wherein each of the plurality of light beams incident on the deflecting surface of said rotary polygonal mirror is incident from an oblique direction in the sub-scan section, relative to a plane perpendicular to a rotational axis of said rotary polygonal mirror,
wherein, when a direction toward a downstream side in a movement direction of the surface to be scanned is defined as a plus direction in the sub-scan direction while a direction toward an upstream side in the movement direction of the surface to be scanned is defined as a minus direction in the sub-scan direction, each of the plurality of light beams incident on the deflecting surface of said rotary polygonal mirror is incident from an oblique minus direction in the sub-scan direction relative to a plane perpendicular to the rotational axis of said rotary polygonal mirror,
wherein, under the above condition, the imaging magnification in the sub-scan section of said second optical system on an optical axis, between the deflecting surface of said rotary polygonal mirror and the surface to be scanned, is larger than the imaging magnification in the sub-scan section of said second optical system between the deflecting surface of said rotary polygonal mirror and the surface to be scanned in the end portion at the scan start side of the light beam scanning the surface to be scanned, and wherein the imaging magnification in the sub-scan section of said second optical system on the optical axis, between the deflecting surface of said rotary polygon mirror and the surface to be scanned, is smaller than the imaging magnification in the sub-scan section of said second optical system between the deflecting surface of said rotary polygonal mirror and the surface to be scanned in the end portion at the scan end side of the light beam scanning the surface to be scanned.

2. A multi-beam optical scanning device according to claim 1, wherein said light source device comprises a monolithic multi-beam semiconductor laser having a plurality of light emitting members formed on the same base member.

3. A multi-beam optical scanning device according to claim 1, wherein said light source device comprises a plurality of light source units each having one or more light emitting members, and wherein said first optical system includes a beam combining member configured to direct one or more light beams emitted from said plurality of light source units in the same direction.

4. An image forming apparatus, comprising:
a multi-beam optical scanning device according to claim 1;
a photosensitive member disposed at the surface to be scanned;
a developing device for developing an electrostatic latent image formed on said photosensitive member with a light beam scanningly deflected by said optical scanning device, to produce a toner image;
a transferring device for transferring the developed toner image onto a transfer material; and
a fixing device for fixing the transferred toner image, on the transfer material.

5. An image forming apparatus, comprising:
a multi-beam optical scanning device according to claim 1; and
a printer controller for converting code data supplied from an outside machine into an imagewise signal and for inputting the imagewise signal into said optical scanning device.

6. A multi-beam optical scanning device, comprising:
a light source device including a plurality of light emitting members having a spacing in a main-scan direction;
a rotary polygonal mirror configured to scanningly deflect a plurality of light beams emitted from said light emitting members;
a first optical system configured to image, in a sub-scan section, the plurality of light beams from said plurality of light emitting members on a deflecting surface of said rotary polygonal mirror; and
a second optical system configured to image the plurality of light beams scanningly deflected by the deflecting surface of said rotary polygonal mirror on a surface to be scanned,
wherein, in the sub-scan section, the deflecting surface of said rotary polygonal mirror and the surface to be scanned are in a conjugate relationship with each other,
wherein each of the plurality of light beams incident on the deflecting surface of said rotary polygonal mirror is incident from an oblique direction in the sub-scan section, relative to a plane perpendicular to a rotational axis of said rotary polygonal mirror,
wherein, when a direction toward an upstream side in a movement direction of the surface to be scanned is defined as a plus direction in the sub-scan direction while a direction toward a downstream side in the movement direction of the surface to be scanned is defined as a minus direction in the sub-scan direction, each of the plurality of light beams incident on the deflecting surface of said rotary polygonal mirror is incident from an oblique minus direction in the sub-scan direction relative to a plane perpendicular to the rotational axis of said rotary polygonal mirror,
wherein, under the above condition, the imaging magnification in the sub-scan section of said second optical system on an optical axis, between the deflecting surface of said rotary polygonal mirror and the surface to be scanned, is smaller than the imaging magnification in the sub-scan section of said second optical system between the deflecting surface of said rotary polygonal mirror and the surface to be scanned in the end portion at the scan start side of the light beam scanning the surface to be scanned, and
wherein the imaging magnification in the sub-scan section of said second optical system on the optical axis, between the deflecting surface of said rotary polygonal mirror and the surface to be scanned, is larger than the imaging magnification in the sub-scan section of said second optical system between the deflecting surface of said rotary polygonal mirror and the surface to be scanned in the end portion at the scan end side of the light beam scanning the surface to be scanned.

7. A multi-beam optical scanning device according to claim 6, wherein said light source device comprises a monolithic multi-beam semiconductor laser having a plurality of light emitting members formed on the same base member.

8. A multi-beam optical scanning device according to claim 6, wherein said light source device comprises a plurality of light source units each having one or more light emitting members, and wherein said first optical system includes a beam combining member configured to direct one or more light beams emitted from said plurality of light source units in the same direction.

9. An image forming apparatus, comprising:
a multi-beam optical scanning device according to claim 6;
a photosensitive member disposed at the surface to be scanned;
a developing device for developing an electrostatic latent image formed on said photosensitive member with a light beam scanningly deflected by said optical scanning device, to produce a toner image;
a transferring device for transferring the developed toner image onto a transfer material; and
a fixing device for fixing the transferred toner image, on the transfer material.

10. An image forming apparatus, comprising:
a multi-beam optical scanning device according to claim 6; and
a printer controller for converting code data supplied from an outside machine into an imagewise signal and for inputting the imagewise signal into said optical scanning device.

* * * * *